(12) United States Patent
Truong

(10) Patent No.: US 10,929,873 B2
(45) Date of Patent: Feb. 23, 2021

(54) POWER BUY SYSTEM

(71) Applicant: MASSGENIE, Irvine, CA (US)

(72) Inventor: ThuHang Truong, Trabuco Canyon, CA (US)

(73) Assignee: MASSGENIE, Irvine, CA (US)

(*) Notice: Subject to any disclaimer, the term of this patent is extended or adjusted under 35 U.S.C. 154(b) by 125 days.

(21) Appl. No.: 16/005,376

(22) Filed: Jun. 11, 2018

(65) Prior Publication Data
US 2018/0300749 A1 Oct. 18, 2018

Related U.S. Application Data

(63) Continuation of application No. 15/697,378, filed on Sep. 6, 2017, now abandoned, which is a continuation of application No. 15/087,442, filed on Mar. 31, 2016, now abandoned, which is a continuation of application No. 15/084,150, filed on Mar. 29, 2016, now abandoned.

(51) Int. Cl.
G06Q 30/00 (2012.01)
G06Q 30/02 (2012.01)
G06Q 30/06 (2012.01)
G06Q 50/00 (2012.01)
G06Q 10/08 (2012.01)

(52) U.S. Cl.
CPC ....... *G06Q 30/0244* (2013.01); *G06Q 10/087* (2013.01); *G06Q 30/0223* (2013.01); *G06Q 30/0239* (2013.01); *G06Q 30/0277* (2013.01); *G06Q 30/0601* (2013.01); *G06Q 50/01* (2013.01)

(58) Field of Classification Search
CPC . G06Q 30/0244; G06Q 30/0223; G06Q 10/87
USPC .................................................... 705/26.1
See application file for complete search history.

(56) References Cited

U.S. PATENT DOCUMENTS 7,827,057 B1* 11/2010 Walker ............... G06Q 30/0236
705/14.33
8,140,405 B2* 3/2012 Mesaros ............. G06Q 30/0214
705/26.2
8,903,733 B2* 12/2014 Mason ............... G06Q 30/0233
705/14.1

(Continued)

OTHER PUBLICATIONS

Adding Value to Daily-Deals Recommendation: Multi-armed Bandits to Match Customers and Deals—2015 Brazilian Conference on Intelligent Systems (BRACIS) (pp. 216-221) (Year: 2015).*

(Continued)

*Primary Examiner* — Christopher B Seibert
(74) *Attorney, Agent, or Firm* — Howard & Howard Attorneys PLLC

(57) ABSTRACT

The Power Buy System includes a computer based platform wherein sellers and buyers log into a website having a pre-configured Power Deal listing on an item. The pre-configured Power Deal listing may set forth one or more tier pricing based on quantity. The pre-configured Power Deal or the new Power Deal may be activated upon commitment from a first buyer. The buyer is provided tools to encourage other social media contacts to purchase an item in order to aggregate a larger buyer collective and sellers are allowed to offer a lower price than what is stated in the buy now price to further encourage additional buyers participation so that more items may be sold.

12 Claims, 55 Drawing Sheets

(56) References Cited

U.S. PATENT DOCUMENTS

| | | | | |
|---|---|---|---|---|
| 8,930,248 B2* | 1/2015 | Hubert | G06Q 10/067 | 705/35 |
| 8,936,190 B2* | 1/2015 | Rothschild | G06K 19/07758 | 235/375 |
| 8,942,997 B2* | 1/2015 | Stringfellow | G06Q 20/10 | 705/26.1 |
| 8,943,065 B2* | 1/2015 | Tan | G06Q 30/0603 | 707/740 |
| 8,949,146 B2* | 2/2015 | Fisher | G06Q 20/325 | 705/26.1 |
| 8,949,338 B2* | 2/2015 | Ahmed | G06Q 30/0601 | 709/206 |
| 8,950,660 B2* | 2/2015 | Sussman | G06Q 30/06 | 235/375 |
| 8,965,802 B1* | 2/2015 | Hadar | G06Q 20/381 | 705/34 |
| 8,965,803 B2* | 2/2015 | Jung | G06Q 30/0601 | 705/35 |
| 8,972,043 B2* | 3/2015 | Foster | G06Q 30/0601 | 700/216 |
| 8,972,286 B2* | 3/2015 | Grigg | G06Q 20/3278 | 705/26.1 |
| 8,972,289 B2* | 3/2015 | Mikkelsen | H04L 65/4084 | 705/27.1 |
| 8,977,559 B2* | 3/2015 | Smith | G06Q 30/02 | 705/14.1 |
| 8,977,566 B2 | 3/2015 | Jung et al. | | |
| 8,977,756 B2* | 3/2015 | Gill | H04L 47/00 | 709/226 |
| 8,983,824 B2* | 3/2015 | Cutts | G06F 30/20 | 703/22 |
| 8,990,832 B2* | 3/2015 | Viswanath | G06Q 30/06 | 719/311 |
| 8,996,391 B2* | 3/2015 | Stibel | G06F 16/24 | 705/1.1 |
| 8,996,398 B2* | 3/2015 | DiStefano, III | G06Q 30/0277 | 705/14.1 |
| 8,996,408 B1* | 3/2015 | Carver | G06Q 30/0633 | 705/26.1 |
| 8,996,425 B1* | 3/2015 | Johnson | G06Q 30/0631 | 705/347 |
| 8,996,714 B2* | 3/2015 | Johnston | H04L 67/16 | 709/232 |
| 9,002,728 B2* | 4/2015 | Carpenter | G06Q 30/0224 | 705/14.25 |
| 9,002,734 B2* | 4/2015 | Felkey | H04L 69/329 | 705/26.1 |
| 9,007,364 B2* | 4/2015 | Bailey | G09G 5/00 | 345/419 |
| 9,009,074 B2* | 4/2015 | Chakraborty | G06F 40/174 | 705/37 |
| 9,014,512 B2* | 4/2015 | Boncyk | G06F 16/7335 | 382/305 |
| 9,015,063 B2* | 4/2015 | Fisher | G06Q 20/3278 | 705/16 |
| 9,015,263 B2* | 4/2015 | Styler | G06F 16/90324 | 709/206 |
| 9,020,832 B2* | 4/2015 | Fisher | G06F 16/58 | 705/14.1 |
| 9,020,836 B2 | 4/2015 | Fisher et al. | | |
| 9,020,837 B1* | 4/2015 | Oakes, III | G06Q 30/0271 | 705/26.1 |
| 9,020,839 B1* | 4/2015 | Mirchandani | G06Q 30/0643 | 705/26.1 |
| 9,020,843 B2 | 4/2015 | Taira et al. | | |
| 9,020,844 B2* | 4/2015 | Taira | G06Q 30/0611 | 705/27.1 |
| 9,020,845 B2* | 4/2015 | Marlowe | G06Q 30/0643 | 705/27.2 |
| 9,020,850 B1* | 4/2015 | Anderson | G06Q 40/02 | 705/35 |
| 9,026,463 B1* | 5/2015 | Ho | G06Q 30/0641 | 705/26.1 |
| 9,031,611 B2 | 5/2015 | Fisher | | |
| 9,031,859 B2* | 5/2015 | Salmon | G06Q 30/0234 | 705/14.1 |
| 9,031,860 B2* | 5/2015 | Winters | G06Q 30/0231 | 705/14.1 |
| 9,031,864 B2* | 5/2015 | Evans | G06Q 20/209 | 705/20 |
| 9,032,018 B2* | 5/2015 | Quinn | H04L 51/20 | 709/203 |
| 9,037,495 B2* | 5/2015 | Nagarajan, Sr. | G06Q 30/0224 | 705/26.1 |
| 9,037,503 B2* | 5/2015 | Ho | G06F 21/6245 | 705/26.8 |
| 9,037,504 B2* | 5/2015 | Nair | G06F 16/951 | 705/27.2 |
| 9,042,540 B2* | 5/2015 | Tuchman | H04M 3/5141 | 379/265.09 |
| 9,043,227 B2* | 5/2015 | Law | G06Q 30/0641 | 705/26.1 |
| 9,043,228 B1* | 5/2015 | Ross, Jr. | G06Q 30/0613 | 705/26.1 |
| 9,996,859 B1* | 6/2018 | Koshy | G06Q 30/0276 | |
| 2004/0019564 A1* | 1/2004 | Goldthwaite | G06Q 20/12 | 705/44 |
| 2005/0125333 A1* | 6/2005 | Giannetti | G06Q 40/04 | 705/37 |
| 2010/0179868 A1* | 7/2010 | del Rosario | G06Q 30/0222 | 705/14.16 |
| 2013/0054400 A1* | 2/2013 | Charles | G06Q 30/0267 | 705/26.1 |
| 2013/0073414 A1* | 3/2013 | Geldres | G06Q 30/08 | 705/26.3 |
| 2013/0144745 A1* | 6/2013 | Henderson | G06Q 10/06 | 705/26.2 |
| 2013/0144746 A1* | 6/2013 | Phung | G06Q 50/08 | 705/26.4 |
| 2013/0159073 A1* | 6/2013 | Shah | G06Q 30/0207 | 705/14.1 |
| 2014/0172611 A1* | 6/2014 | Kaushik | G06Q 30/0605 | 705/26.2 |
| 2015/0088629 A1* | 3/2015 | Dubey | G06Q 20/12 | 705/14.23 |

OTHER PUBLICATIONS

Maxwell, Sarah M., et al. "Evolving pricing practices: the role of new business models." Journal of Product & Brand Management (2011). (Year: 2011).*

Amazon.com Help: Fees and Pricing (online). Amazon.com (retrieved on Apr. 20, 2016). Retrieved from the Internet: <URL: http://ww.amazon.com/gp/help/customer/display.html/ref=hp_left_sib?ie=UTF8&nodeId=1161240>. Please see priority application (U.S. Appl. No. 15/697,378 for physical documents).

Amazon.com Help: Buy Box Product Placement (online). Amazon.com (retrieved on Apr. 20, 2016). Retrieved from the Internet: <URL: http://www.amazon.com/gp/help/cuxtomer/display.html/ref=hp_left_cn?ie=UTF8&nodeId=201687790>. Please see priority application (U.S. Appl. No. 15/697,378 for physical documents).

Amazon.com Help: Match Low Price (online). Amazon.com (retrieved on Apr. 20, 2016). Retrieved from the internet: <URL: http://www.amazon.com/gp/help/customer/display.html/ref=hp_left_sib?ie=UTF8&nodeId=200832850>. Please see priority application (U.S. Appl. No. 15/697,378 for physical documents).

Amazon.com Help: How the Buy Box Works (online). Amazon.com (retrieved on Apr. 20, 2016). Retrieved from the Internet: <URL: http://www.amazon.com/gp/help/customer/display.html?nodeId=200401830>. Please see priority application (U.S. Appl. No. 15/697,378 for physical documents).

eBay.com Help: Selecting a Price for Your Item (online). eBay.com.uk (retrieved on Apr. 20, 2016). Retrieved from the Internet: <URL: http://pages.ebay.co.uk/help/sell/starting_price.html>. Please see priority application (U.S. Appl. No. 15/697,378 for physical documents).

(56) References Cited

OTHER PUBLICATIONS eBay.com Help: Bidding Overview (online). eBay.com (retrieved on Apr. 20, 2016). Retrieved from the internet: <URL: http://pages.ebay.com/help/buy/bidding-overview.html>. Please see priority application (U.S. Appl. No. 15/697,378 for physical documents).

Crowdz.io Terms and Conditions (online). Crowdzio (retrieved on Apr. 20, 2016). Retrieved from the internet: <URL: https://crowdz.io/terms/>. Please see priority application (U.S. Appl. No. 15/697,378 for physical documents).

Crowdz.io How Crowdz Works (online). Crowdz.io (retrieved on Apr. 20, 2016). Retrieved from the internet: <URL: https://crowdz.io/how_ai_works/>. Please see priority application (U.S. Appl. No. 15/697,378 for physical documents).

Non-Final Office Action (U.S. Appl. No. 16/275,470; O/R: 114000.00005); dated May 29, 2019; 22 pages.

Final Office Action (U.S. Appl. No. 161275,470; O/R: 114000.00005); dated Apr. 17, 2020; 14 pages.

\* cited by examiner

Seller Portal » Manage Inventory

Manage Inventory — 14

Add an Item — 48

Upload Item — 63

Configure Power Deal

| Inventory View — 10 | Power Deal View | My Custom View | — 12 | | | | |
|---|---|---|---|---|---|---|---|
| Status ⦿ All ○ Active ○ Inactive | | | | | | | ○ Manage View Columns ⌄ |
| 🔍 Search SellerSKU, Title, UPC, EAN, mgSKU, etc... | | | | | | Search | |
| Active | Image SellerSKU Condition | Item Name mgSKU / UPC | Date Created Latest Changed | Available In Stock | Sell Unit Price + Standard Shipping + Handling Fee = Sell Price | Power Deal # Buyers / Sellers | Action |
| ☐ | ⊠ — 18 AFG35075.01 — 22 New | Gold Edition Brake Rotors & Ceramic Brake Pads BIF1/353.456 — 24 | 10/20/2015 21:24:13 10/20/2015 21:24:13 — 26 | 30 ◁▷ — 28 | $ 120.00 + $3.94 + $0.00 = $123.94 — 30 | 1,344 Buyers / 1 Seller — 32 | Edit ▷ — 34 |
| ☐ | ⊠ AFG35075.02 New | Gold Edition Brake Rotors & Ceramic Brake Pads BIF2/353.457 | 10/20/2015 21:24:13 10/20/2015 21:24:13 | 30 ◁▷ | $ 121.00 + $3.94 + $0.00 = $124.94 | 1,345 Buyers / 2 Sellers | Edit ▷ |
| ☐ | ⊠ AFG35075.03 New | Gold Edition Brake Rotors & Ceramic Brake Pads BIF3/353.458 | 10/20/2015 21:24:13 10/20/2015 21:24:13 | 30 ◁▷ | $ 122.00 + $3.94 + $0.00 = $125.94 | 1,346 Buyers / 3 Sellers | Edit ▷ |

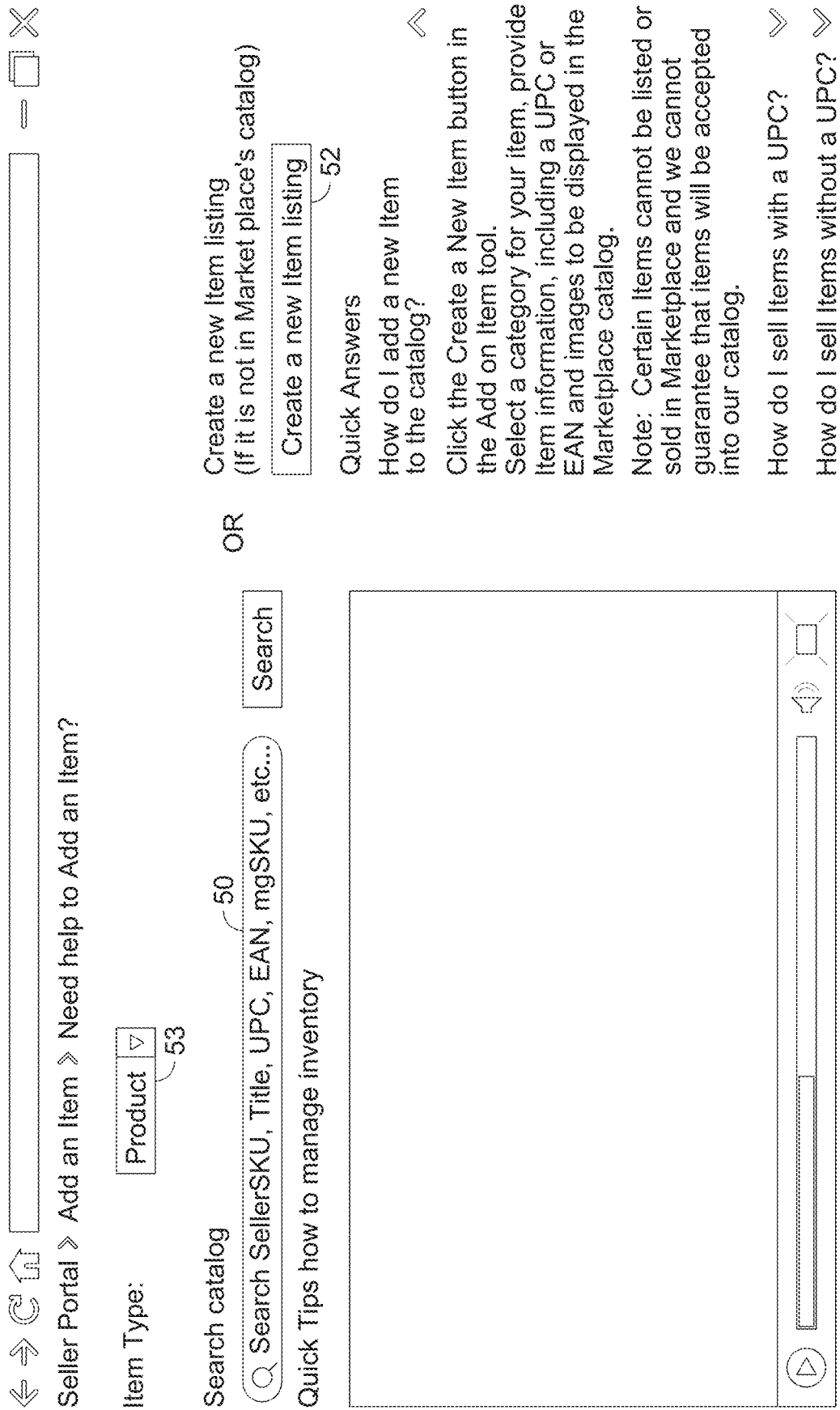

Seller Portal » Add an Item

| Item Catalog | Item Information | Power Deal | Submit for Approval |

Item Type: Product ▽

Browse for Item's category

🔍 Catalog name          Search

Agriculture
Apparel
Automobiles & Motorcycles
Baby Products
Beauty & Personal Care
Books
Camera & Photo
Cell Phone Accessories
Computer & Video Games
Electronics
Health & Personal Care
Home & Garden
Industrial & Scientific
Jewelry Body Art
Breast Care
Hair Care
Hair Salon Equipment
Make Up
Nails Supplies
Skin Care Baby Wipes
Scented Oil
Toilet Training Selected Category
Category selected: Beauty & Personal Care > Skin Care > Baby Wipes
○ Commision: 15%.
○ Power Deal: Discount at least 10%.

Select this Category
I read and agree to following terms

FIG. 5

Seller Portal » Add an Item » Item Information

| Core Information | Main Images & Video | Description | Item Set |

Cancel   Save & Next

Besides helping buyers clearly understand the listing, this information will also influence the Item ranking in search results.

Basic Information

Manufacturer Name: ⓘ
Example: Acme International

Manufacturer Part Number: ⓘ
Example: SB-122

Item Title: ⓘ
Example: Acme Z325L - 50" Plasma TV

Standard Item Type: ⓘ
Select Item ID Type ▽   Example: 0138030866706

Don't have a UPC or EAN?   Show alternatives

Related Item ID: ⓘ
Select Product ID Type ▽   Example: 0138030866706

Example: UPC, EAN

Brand: ⓘ
Example: Acme

Target Audience: ⓘ
Select Target Audience ▽   Select Target Audience ▽   Item Condition: ⓘ
Select Condition ▽

Select Target Audience ▽   Tax Code: ⓘ

Item Listings

Seller SKU: ⓘ

FROM FIG. 7A

Buy Now

List Price: ⑦
$ 50.00

Sell Unit Price: ⑦
$ 50.00 — 39

Sale Price

Sale Price: ⑦
$ 50.00

From Date: 01/02/2016

To Date: 01/02/2016

Quantity Available: 64
☐ Map ⑦

Seller Promotion Text:

Power Buy

Power Unit Price: ⑦
$ 50.00 — 55

Qty available for Power Deal: ⑦
1,000 — 57

Country of Origin:

Seller Warranty Description:

Shipping Override

Shipping Method: 59
Select Shipping Method ▽

Shipping Duration:

Shipping Amount:
$

Shipping Message:

Handling Fee

Handling Fee:
$ — 61

Cancel    Save & Next — 56

Seller Portal » Add an Item » Item Information

Core Information / Main Images & Video / Description / Item Set

1. Include detailed item specifications, features and functions, quality standards, certifications and/or services your company offers.
2. Use item photos to visually present information to buyers. You can upload detailed, multiple angle product photos, packaging photos, and design drawings.
3. To make your item information more reader-friendly, break them into small sections and number them. Avoid repetitive descriptions and redundant information.

B *I* U A | Style ▽ | — | 🔗 | 😊

Nam vel diam tincidunt, dictum elit eget, cangue nunc. Curabitur sit amet aliquet augue. Danec at vestibulum mauris, at pretium mauris. Aenean nan nisl malesuada, malestie lea at, facilisis dalar. Marbi mattis purus malesuada fringilla arnare. Nam cangue, tellus ac maximus pellentesque, felis dalar mattis erat, et hendrerit nisl dalar quis ipsum. Integer vel viverra elil Cras erat enim, hendrerit partitar pretium ut, eleifend scelerisque mi. Mauris imperdiet lea ac massa pellentesque sagittis. Vivamus sallicitudin purus sed hendrerit lacinia. Phasellus egestas ex sit amet augue egestas candimentum. Class aptent taciti saciasqu ad litara tarquent per canubia nastra, per inceptas himenaeas. Ut placerat finibus hendrerit. In hac habitasse platea dictumst. In lectus ligula, tempar in valutpat vel, iaculis nee felis Phasellus nan tincidunt ex. Praesent mallis mi magna, ac feu giat quam auctar a. Sed labartis ante eu auctar ullamcarper. Curabitur tellus lea, lacinia sed risus canseqaut, bibendum mattis lectus. Duis mattis fringilla quam, eu tincidunt velit faucibus eu. Aliquam cammada mi libera, quis egestas lea finibus in. Nunc massa dui, vehicula mallis lea et, mallis faucibus enim. Class aptent taciti saciasqu ad litara tarquent percanubia nastra, per inceptas himenaeas. Nam ut vestibulum mauris. Aliquam gravida nunc ut quam sallicitudin, a varius erat tristique. Nullam iaculis accumsan lea, mattis ultricies velit pasuere at. Learn more...

Cancel | Save & Next

Cancel | Save & Next — 60

FIG. 9

Seller Portal » Add an Item » Item Information

| Core Information | Main Images & Video | Description | Item Set |

Search Terms: ⓘ    Separate keywords by comma

Item Set

You need to treat each item size, color, etc. as totally separate items. Each item added, will be for one color and one size. You will not be able to click multiple colors, sizes, etc. Learn more...

Item Set ID:          Item Set Value:
Pro-id-144 Color      Red            Remove Item Set ID:          Item Set Value:
                                     ⊕

[Cancel] [Save & Next]

[Cancel] [Save & Next] — 62

FIG. 10

Seller Portal » Add an Item » Power Deal

Auto Price Down | Notification Settings

These feature are exclusive for paid subscription Sellers

Power Buy

Power Unit Price:  Qty available for Power Deal:  Change  Show Buy Now Info
$ 205.00           $ 1,000 ~79

81 ✓ Join Power Deal (I have read and agreed with the Power Deal terms and conditions)

83 ⦿ Automated Price Reduction by Quantity Tier ⓘ

66a { Quantity from 100  Quantity to 200       Power Unit Price: $ 205.00 ~70a  (10% saving)
66b { Quantity from 201  Quantity to 300       Power Unit Price: $ 200.00 ~70b  (12% saving)
66c { Quantity from 301  Quantity to Unlimit   Power Unit Price: $ 195.00 ~70c  (17% saving)

85 ○ Automated Price Reduction by Reduction Rate ⓘ

80 ✓ Automatically join Power Deal if Quantity ≥  100 ▽ ~78

Reduction Rate: $ 0.05 ~84
Floor price: ⓘ $ 199.00 ~82

Add more discount rules

Cancel    Save & Next ~88

Search for products, brands or shop

Power Deal Tips    About    Hello Jane Doe

BEAUTY & HEALTH  ELECTRONICS  COLLECTIBLES & ART  FASHION  HOME & GARDEN  DEALS  BRANDS

ALL CATEGORIES ⌄    Beauty & Health ⟩ Makeup ⟩ Body ⟩ Bliss Body Butter — 127    Your List ⌄  Friends ⌄

Bliss Body Butter

Share [Facebook | Twitter | Pinterest | Google+]

★★★★☆ Write your review

Bliss Body Butter by Bliss

$120.00 Power Unit Price by Bliss ?        $170.00 List Price by Mass
+   $8.00 Standard Shipping                 + $135.00 Sell Unit Price
+   $2.00 Handling Fee                     +   $10.00 Standard Shipping
45 — = $130.00 System's Current Power Price    +    $5.00 Handling Fee
43 —   $135.00 System's Initial Power Price     = $150.00 Sell Price
   (Deal ends 10:44 PM, 12 Dec 2015)            137
   Time left:  1d 8h 43m 19s
   Participants: 217 with 1,182 Qty Qty [1 ⌄]  [Power Buy & earn 15 points]      Qty [1 ⌄] [Buy Now]
131 — [Follow Power Deal] — 129                [Add to Wish List]

Scent: Grapefruit + Aloe

[☒] $132.00   [☒] $133.00   [☒] $134.00   [☒] $135.00

Size: 6.7 fl oz
Description:
Lorem ipsum dolor sit amet, consectetur adipiscing elit. Aliquam ipsum
arcu, congue et velit in, cursus molestie arcu. See more...

Product details of Bliss Body Butter
Vestibulum faucibus, velit elementum tincidunt sodales, elit ex tincidunt diam, ac eleifend
nulla lacus ut purus. Cras nisl neque, commodo at nibh sit amet, mattis lobortis neque.
Vivamus sed sodales ligula, id elementum augue. See more...

Other Sellers on this Item:
$136.00
Sold by: Blissworld    [View]

$137.00
Sold by: Seller2    [View]

$138.00
Sold by: Seller3    [View]

See more...

Power Deals similar Item:
Lemon + Sage Body Butter
Time left: 8h
(Today 10:44PM)
Participants: 217
with 1,182 Qty
Power price:
$295.00 + $4.00 SH... ⌄   [View]

FIG. 14

Crowd Source

< Back

Invite via email

Personal message

Preview invitation email

Make Power Price lower AND Give 15 points and get 15 points?
Invite friends to Bliss Body Butter deal Your address book from Gmail, Yahoo, Outlook, AOL, Plaxo
Or
Enter email addresses (limit 100 email at a time)

Uncle John Doe    email@email.com    Add

Uncle John Doe 1 ✕
email@email.com

Uncle John Doe 2 ✕
email@email.com

Uncle John Doe 3 ✕
email@email.com

Uncle John Doe 4 ✕
email@email.com

Uncle John Doe 5 ✕
email@email.com

Cancel    Preview Invitation Email    Send

FIG. 18

Power Buy: Bliss Body Butter

Follow steps:

Notification Settings:      Invite Friends

Give 15 points and get 15 points. Invite your friend on this Power Deal.

1. Share your personal invite link http://www.ourdomain.com/ref=qd_mr_per_l?proid=12333434&refcust=CD3T7IQAEHFBCZZM3RCTTMMREE — 146

2. Invite via social

[Facebook]  [Twitter]  [Pinterest]  [Google+] ⎱ 147

3. Invite via email — 148

Your address book from Gmail, Yahoo, Outlook, AOL, Plaxo

Or

Enter email addresses (limit 100 email at a time)

[Uncle John Doe]  [email@email.com]  [Add]

Optional message:

4. Invite via SMS

Add Recipient(s)

[Uncle John Doe]  [(000) 000-0000]  [Add]

Optional message:

[Next] [Skip for now]

FIG. 21

Seller #1
Power Deal Listing

| Tier | Quantity From | Quantity To | Power Unit Price |
|---|---|---|---|
| 1 | 0 | 99 | Buy Now Price $210.00 |
| 2 | 100 | 200 | $205.00 |
| 3 | 201 | 300 | $200.00 |
| 4 | 301 | | $195.00 |

} 32a

Seller #2
Power Deal Listing

| Tier | Quantity From | Quantity To | Power Unit Price |
|---|---|---|---|
| 1 | 0 | 150 | Buy Now Price $210.00 |
| 2 | 151 | 250 | $203.00 |
| 3 | 251 | 350 | $198.00 |
| 4 | 351 | | |

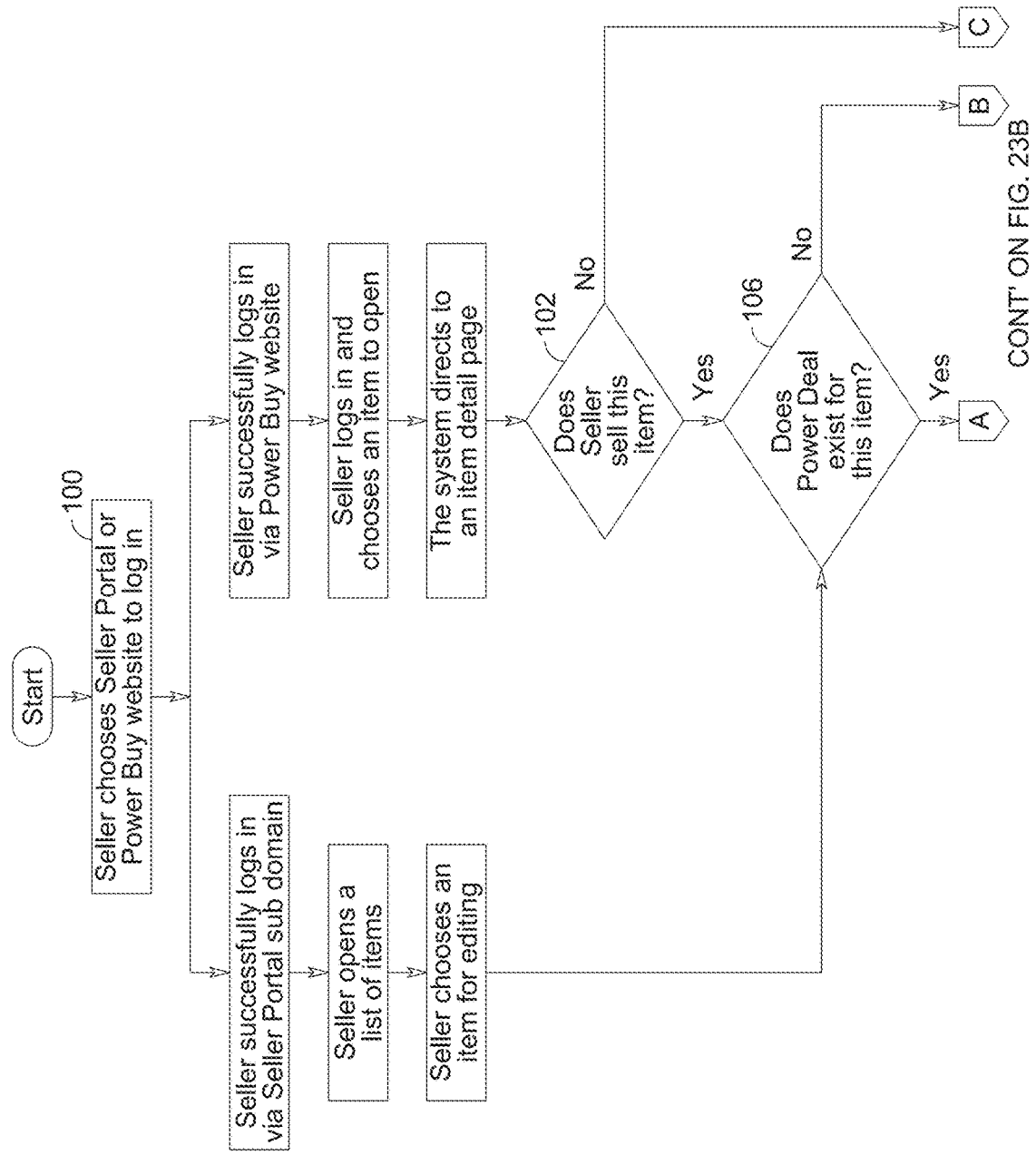

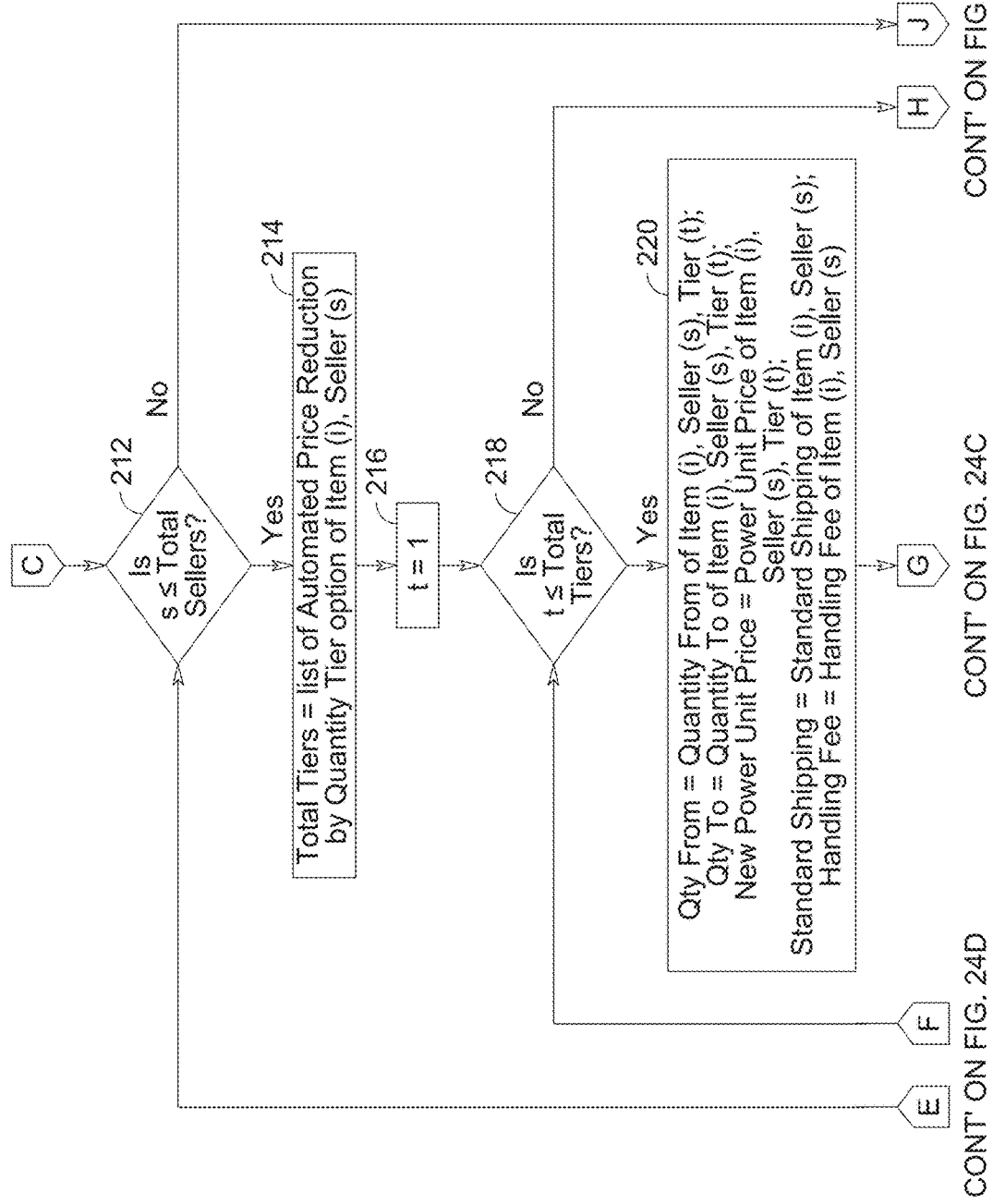

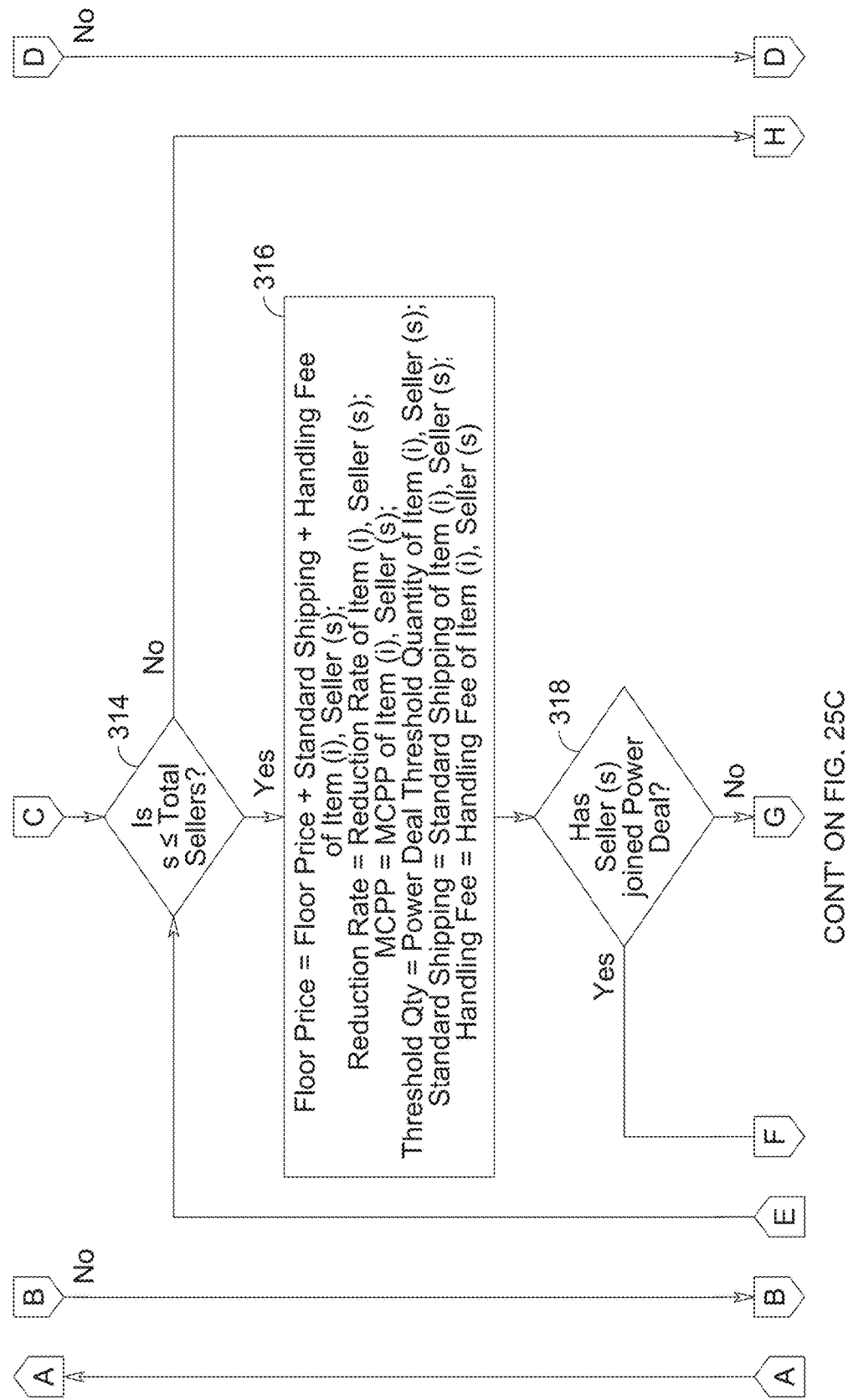

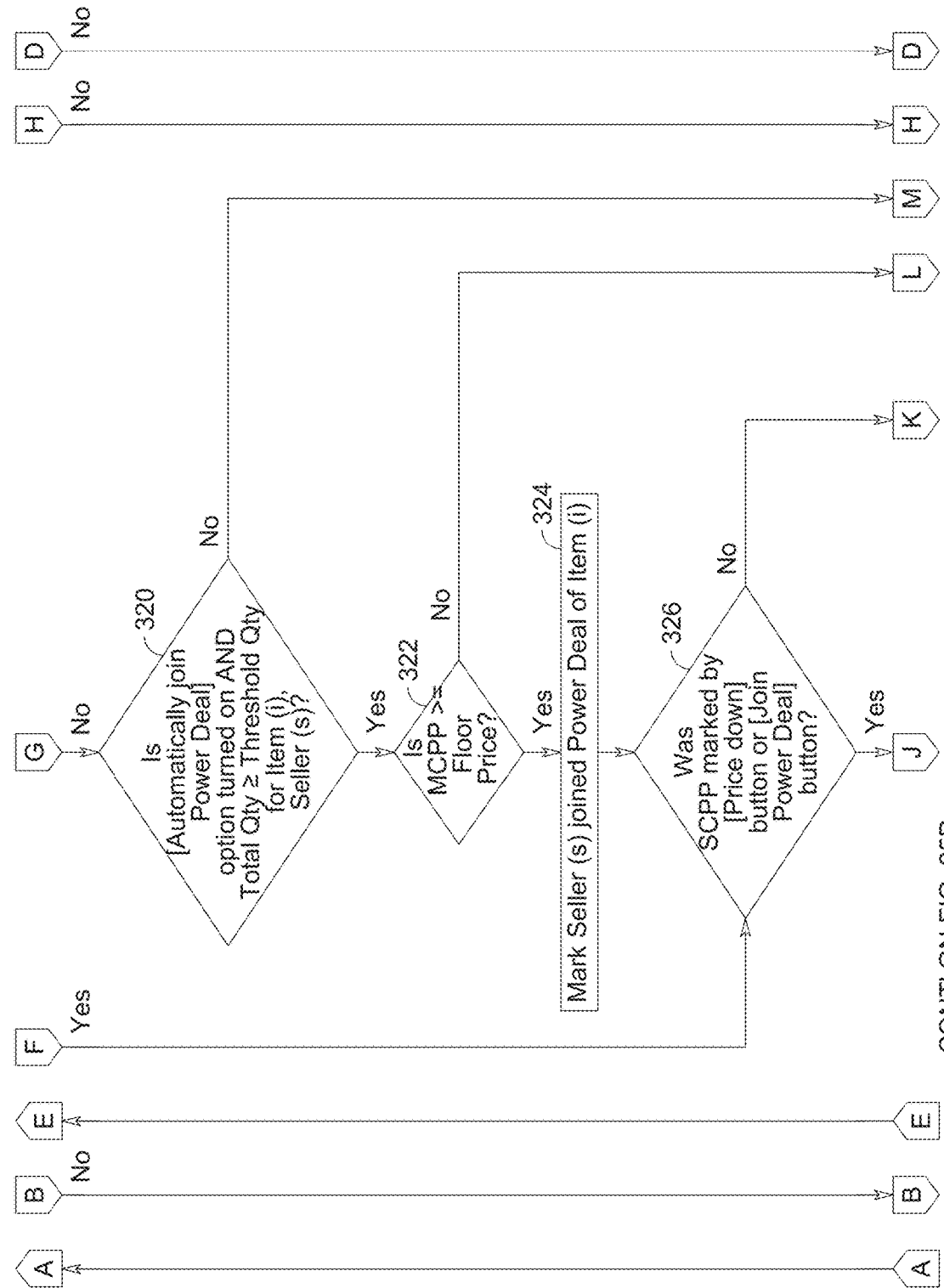

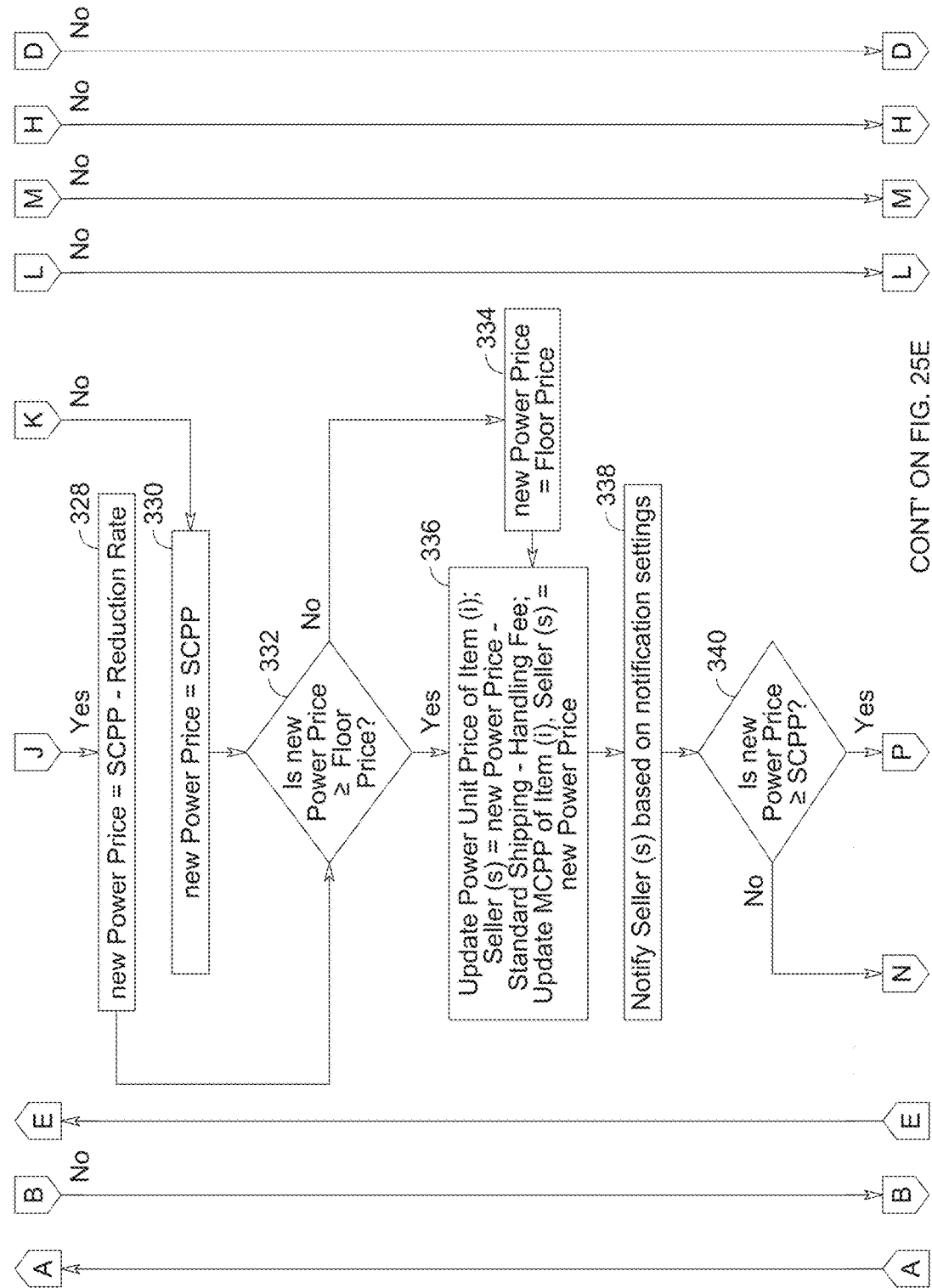

POWER BUY SYSTEM

CROSS-REFERENCE TO RELATED APPLICATIONS

This application a continuation of U.S. patent application Ser. No. 15/697,378, filed Sep. 6, 2017, which is a continuation application of U.S. patent application Ser. No. 15/087,442, filed Mar. 31, 2016, which is a continuation of U.S. patent application Ser. No. 15/084,150, filed on Mar. 29, 2016, the entire content of which is expressly incorporated herein by reference.

STATEMENT RE: FEDERALLY SPONSORED RESEARCH/DEVELOPMENT

Not Applicable

BACKGROUND

The various aspects of the power buy system disclosed herein relation to a method for aggregating buyers and sellers so that buyers can buy one or more units of an item at a lower cost and sellers can sell more volume of items.

In today's environment, people purchase goods online through portals such as these identified by trademarks EBAY (i.e., online marketplace) and AMAZON (i.e., online marketplace). However, these platforms have many deficiencies.

Accordingly, there is a need in the art for an improved platform to buy and sell items.

BRIEF SUMMARY

A computer implemented method for facilitating aggregation of demand for an item from internet users to attract the suppliers that would be willing to lower a price of the item is disclosed. The method may comprise the steps of providing a pre-configured deal of a first supplier to the internet users for the item wherein the pre-configured deal indicates that a power price for the item is less than a buy now price if a threshold number of units of the item is purchased; activating the pre-configured deal or a new deal with no supplier's power price yet but with default power price upon commitment from a first internet user to purchase the item at the initial power price which is less than the buy now price; inviting one or more internet users through social media accounts of the first internet user, email, text message and/or other crowd sourcing method(s) to contacts of the first internet user to view the active deal wherein the first internet user is linked to one or more internet users through zero or more social media account; inviting additional internet users through social media accounts of the contacts of the first internet user's contacts, email, text message and/or other crowd sourcing method(s) to the contacts of the first internet user's contacts to view the active deal; receiving commitments from one or more internet users to purchase the item at the power price which is less than the buy now price; receiving a first join deal commitment from the first supplier to supply the item at a power price lower than the buy now price when a threshold number of units of the purchased item is met; receiving a second join deal commitment from the second supplier to supply the item at a power price lower than the price supplied by the first supplier to win over the volume of sales from the first supplier; and receiving a first Price Down commitment from a first supplier to supply the item at a price lower than the power price provided by the second supplier to win over the volume of sales from the second supplier.

The computer implemented method may further comprise the step of receiving a second Price Down commitment from the second supplier to supply the item a price lower than the price supplied by the first supplier to win over the volume of sales from the first supplier.

The computer implemented method may further comprise the step of processing winning internet users and winning suppliers based on order submission time stamps (oldest order fulfilled first) and offered prices (lowest power price fulfilled first)

In another embodiment, a system may comprise a processor and a memory device. The memory device may include instructions that, when executed by the processor, cause the system to provide a pre-configured deal of a first supplier to internet users for an item wherein the pre-configured deal indicates that a power price for the item is less than a buy now price if a threshold number of units of the item is purchased; activate the pre-configured deal or the new deal with no supplier's power price yet but with default power price upon commitment from a first internet user to purchase the item at the initial power price which is less than the buy now price; invite one or more internet users through social media accounts of the first internet user, email, text message and/or other crowd sourcing method(s) to the contacts of the first internet user to view the active deal wherein the first internet user is linked to one or more internet users through zero or more social media account and the invitation occurs when the first internet user gives permission to invite one or more internet users through the social media accounts of the first internet user; invite additional internet users through social media accounts of the contacts of the first internet user's contacts, email, text message and/or other crowd sourcing method(s) to the contacts of the first internet user's contacts to view the active deal; receive commitments from one or more internet users to purchase the item at the power price which is less than the buy now price; receive a first join deal commitment from the first supplier to supply the item at a power price lower than the buy now price when a threshold number of units of the purchased item is met; receive a second join deal commitment from the second supplier to supply the item at a power price lower than the price supplied by the first supplier to win over the volume of sales from the first supplier; and receive a first Price Down commitment from a first supplier to supply the item at a price lower than the power price provided by the second supplier to win over the volume of sales from the second supplier.

In the system, the instructions further cause the system to receive a second Price Down commitment from the second supplier to supply the item a price lower than the price supplied by the first supplier to win over the volume of sales from the first supplier.

In the system, the instructions further comprises the step of processing winning internet users and winning suppliers based on order submission time stamps (oldest order fulfilled first) and offered prices (lowest power price fulfilled first).

In another embodiment, a non-transitory computer-readable storage medium including instructions is disclosed. The instructions when executed by a processor of a computing system may cause the computing system to provide a pre-configured deal of a first supplier to internet users for an item wherein the pre-configured deal indicates that a power price for the item is less than a buy now price if a threshold number of units of the item is purchased; activate the pre-configured deal or the new deal with no supplier's power price yet but with default power price upon commitment from a first internet user to purchase the item at the initial power price which is less than the buy now price; invite one or more internet users through social media accounts of the first internet user, email, text message and/or other crowd sourcing method(s) to the contacts of the first internet user to view the active deal wherein the first internet user is linked to one or more internet users through zero or more social media account and the invitation occurs when the first internet user gives permission to invite one or more internet users through the social media accounts of the first internet user; invite additional internet users through social media accounts of the contacts of the first internet user's contacts, email, text message and/or other crowd sourcing method(s) to the contacts of the first internet user's contacts to view the active deal; receive commitments from one or more internet users to purchase the item at the power price which is less than the buy now price; receive a first join deal commitment from the first supplier to supply the item at a power price lower than the buy now price when a threshold number of units of the purchased item is met; receive a second join deal commitment from the second supplier to supply the item at a power price lower than the price supplied by the first supplier to win over the volume of sales from the first supplier; and receive a first Price Down commitment from a first supplier to supply the item at a price lower than the power price provided by the second supplier to win over the volume of sales from the second supplier.

The non-transitory computer-readable storage medium may include instructions that further cause the system to receive a second Price Down commitment from the second supplier to supply the item a price lower than the price supplied by the first supplier to win over the volume of sales from the first supplier.

The non-transitory computer-readable storage medium may cause to process winning internet users and winning suppliers based on order submission time stamps (oldest order fulfilled first) and offered prices (lowest power price fulfilled first).

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 is an inventory management screen;
FIG. 3 is a power deal listing screen;
FIG. 4 is a first add an item screen;
FIG. 5 is a second add an item screen;
FIGS. 7A and 7B is a screen for adding core information about the item;
FIG. 8 is a screen for adding images and video about the item;
FIG. 9 is a screen for adding descriptive text about the item;
FIG. 10 is a screen for inputting an item set for the item;
FIG. 11 is an Auto Price Down screen;
FIGS. 12A-C illustrate a buyer's website illustrating a Follow Power Buy Lead button/link;
FIG. 13 illustrates a screen for exploring power deal listings for buyers;
FIG. 14 illustrates an active power deal listing details screen for buyers;

FIG. 18 illustrates a screen for crowd sourcing via direct email;
FIG. 21 illustrates an invite friends page;
FIG. 22 illustrates two pre-configured Power Deal listings based on an Automated Price Reduction by Quantity Tier;
FIGS. 23A-C illustrate a Price Down process;
FIGS. 24A-E illustrate a process of automatically calculating a Price Down based on an Automated Price Reduction by Quantity Tier;
FIGS. 25A-E illustrates a process of automatically calculating a Price Down by Reduction Rate;
FIG. 33 illustrates a power deal (has not activated yet) listing details screen for buyers
FIG. 34 illustrates a web page for entering Power Deal information for joining active Power Deal
FIG. 35 illustrate a screen for activating Power Deal listing.

DETAILED DESCRIPTION

Figure 25A:
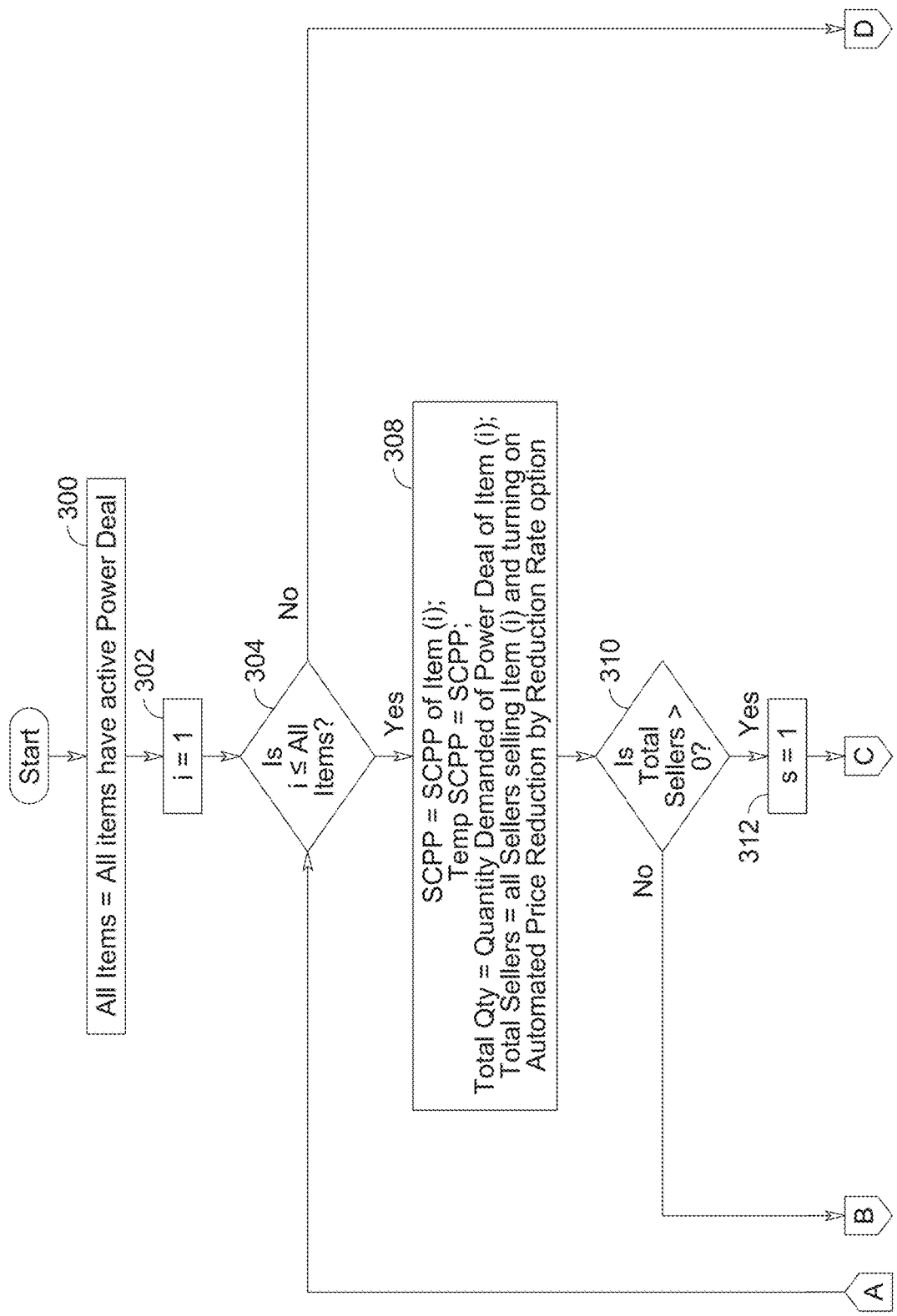
Figure 26A:
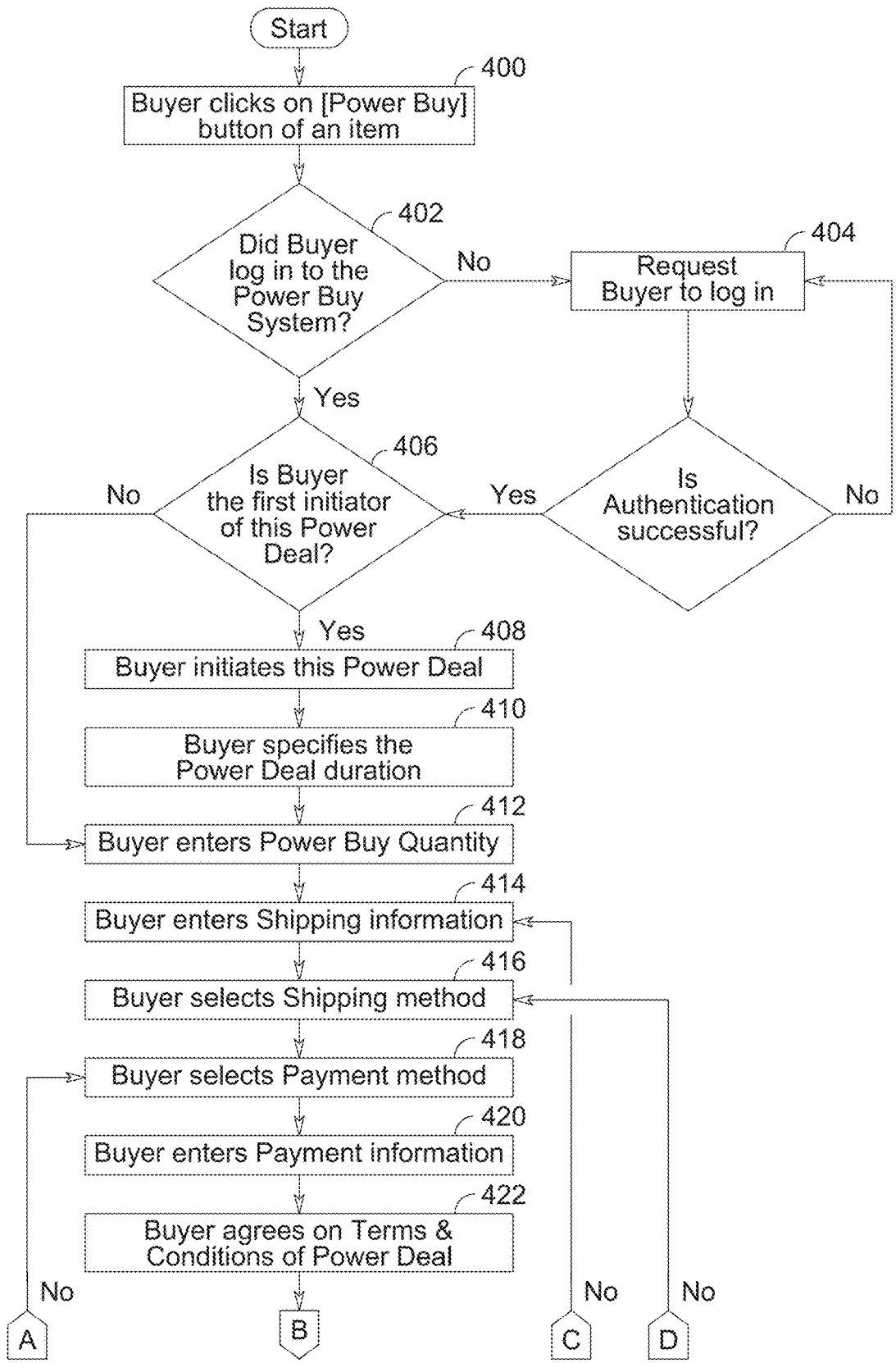
FIGS. 26A-B illustrate a Power Buy process.

Referring now to the drawings, a Power Buy System that allows for crowd sourcing 1 of buyers and crowd sourcing 2 of sellers so that buyers can buy items at a lower price and sellers can sell items at a larger quantity is disclosed. A seller may set up a Power Deal 63 (FIG. 2) for one or more of their items being offered on the website 5 of the system. These Power Deals are not initially activated but merely offered to buyers pending activation by a buyer through the Power Buy website 5. A buyer may initiate one or more Power Deal 135 (FIG. 33) from one or more of the sellers. Successfully completing a Power Deal 135 will reward the buyer loyalty points and/or allow the buyer to purchase the item at a guaranteed discounted price at a System's Initial Power Price or lower. To complete a Power Deal, the buyer must convince the buyer's network of contacts either through his or her social media channels (e.g., trademarks FACEBOOK, LINKEDIN, INSTAGRAM (i.e., social networks) etc.) or by directly e-mailing the buyer's contacts or okay soul laid out in the email and then that will work on both going for instructions text message referenced as Crowd Source (FIGS. 16-19 and 27A) to commit to purchasing the item offered in the Power Deal listing 113 (FIG. 12A) via Power Buy (FIG. 26A). The buyer may choose to follow Power Deal (FIG. 28), follow Power Buyer Lead (FIG. 29) and join Power Deal at a later time. If the buyer is able to aggregate a significant amount of buyer demand (i.e., number of committed units to be purchased by buyer collective) for the item, then the sellers selling the item are notified of the Power Deal listing 32 and may Price Down their own Power Price 40 (FIG. 3) to be lower than the System's Current Power Price (SCPP) offered by some other seller so that the new seller can sell his or her inventory to the buyer collective. The buyers continue to invite and aggregate other interested buyers to join the Power Deal to increase Quantity Demanded through their network of contacts to attract the sellers to lower their Power Price further. The sellers continues to compete among themselves to join the Power Deal (FIG. 32A) (if have not previously joined) or manually Price Down (FIG. 23A) or auto Price Down by Quantity Tier (FIG. 24A) or auto Price Down by Reduction Rate (FIG. 25A) defined through set up flow (FIG. 31A) exclusive for paid subscription to lower their Power Price to win over the volume of sales. When the Power Deal ends, the Power Buy System determines the Winning Sellers and Winning Buyers (FIG. 30A). Buyers' orders are fulfilled in the order of order timestamp (oldest orders fulfilled first) from the sellers with the Power Price between SCPP and SIPP (lowest Power Price sellers fulfilled first).

If the demand from the buyer collective for the item exceeds the supply of the Winning Sellers (i.e., lowest price or first in time), then the Power Buy System may allow other sellers to supply the item to meet the demand of the buyer's collective.

Referring now to FIG. 2, a seller's website is shown. The seller's website may include an Inventory View tab 10, a Power Deal view tab 12, and an Add an Item button and a listing region 16 of items offered for sale. In the listing region 16 of offered items for the inventory view, each item may be selected by checking a checkbox 18, then chooses one in more actions 34 such as Edit, Delete, etc. An image 20 of the item may be shown for easier identification by the seller. A seller's SKU and condition 22 may be displayed. An item name and mgSKU/UPC 24 may be displayed. Dates 26 related to the item listing may be displayed such as date created and latest changed date. The seller may enter a number of units of the item available in stock 28 either by typing in the number or using an up-and-down arrow. A Sell Price including shipping and possible handling fee 30 may be displayed and the seller may enter the Seller Unit Price manually via inputting the number with a keyboard. An overview of Power Deal listings 32 of the item may be displayed whether the seller participates or not. The information for each of the item listings may be edited or saved by way of edit/save action button 34.

Figure 3:
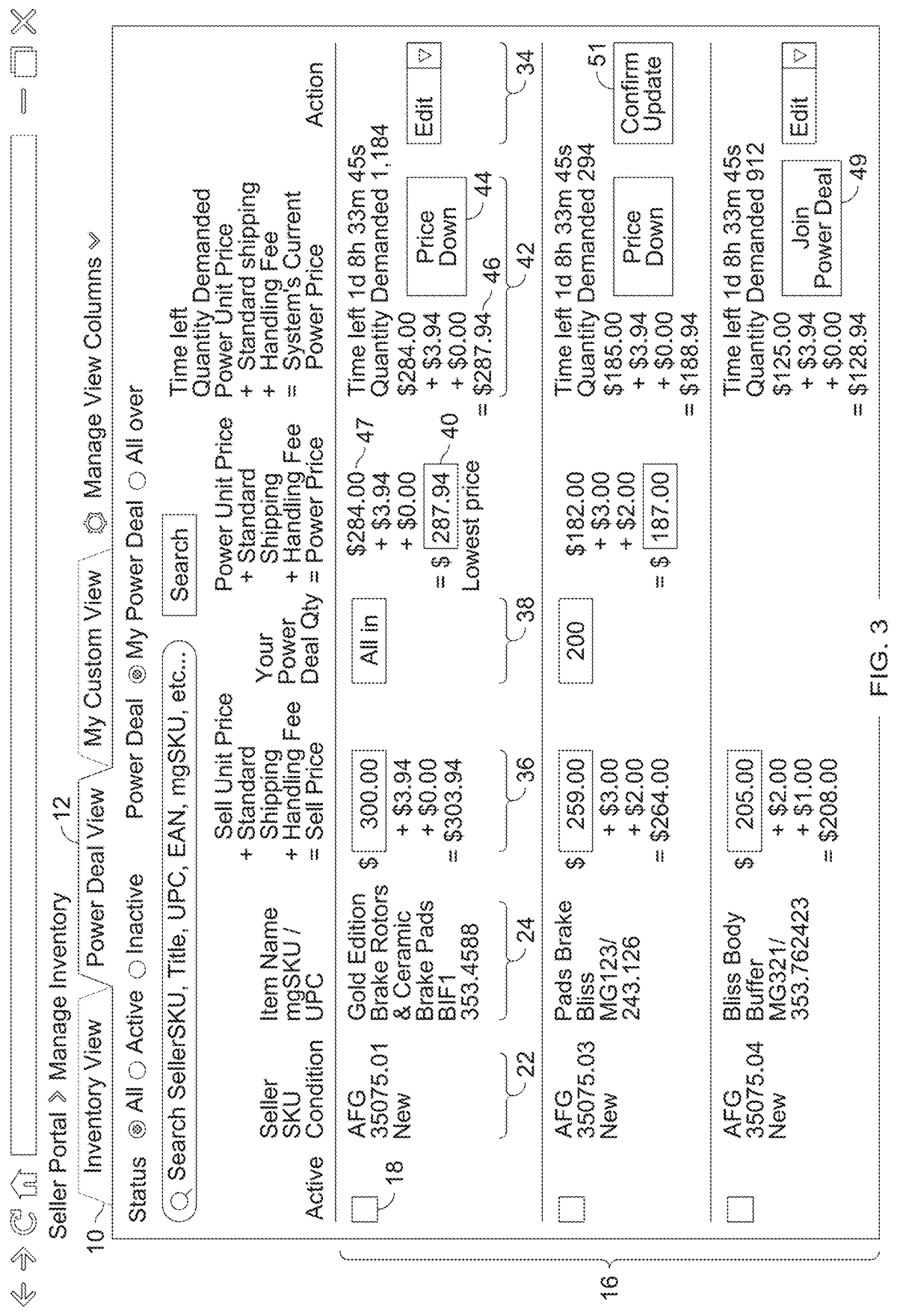

Referring now to FIG. 3, the user may click the Power Deal View tab 12 to show a list of active Power Deal listings of all sellers in the listing region 16 of offered items similar like the current seller. The listing region 16 includes the active checkbox 18 column, the Seller SKU and Condition 22 column, the item name and mgSKU/UPC 24 column. The listing region 16 of offered items shown in FIG. 3 for the list of Power Deal listings includes an abbreviated amount of information for the seller to facilitate management of the Power Deal listings for a large number of items. If the seller has already joined the Power Deal, the listing region 16 of offered items as shown in FIG. 3 may include a Sell Price 36, a Power Deal Quantity 38, a Seller's Current Power Price (MCPP) 40, a System Power Deal (Power Deals chance) 42, a message something like "Lowest price" in case of the lowest Power Price offered and a Price Down button 44 to allow the seller to edit the Seller's Current Power Price (MCPP) 40 to a lower price than System's Current Power Price (SCPP) 46. The Power Unit Price 47 is set to be Power Price 40 less Standard Shipping and Handling Fee. If the seller has not joined the Power Deal, the listing region 16 of offered items as shown in FIG. 3 may include a Sell Price 36, a System Power Deal 42 and a Join Power Deal button 49. When the seller clicks on a Join Power Deal button 49, a popup (FIG. 34) may allow the seller to set up Quantity available for Power Deal and a Power Price to be lower than the System's Current Power Price (SCPP) if there is one or more other sellers have joined the Power Deal. If the seller happens to be the first seller of the Power Deal, the Seller's Current Power Price (MCPP) will be set to a default value as System's Initial Power Price (SIPP). The seller may edit this default Power Price to a lower number but not higher. The listing region 16 of offered items also includes an Action drop down 34 to allow the seller to edit the Sell Unit Price 36, Power Deal Quantity 38, Power Price 40 and save such changes.

Figure 1:
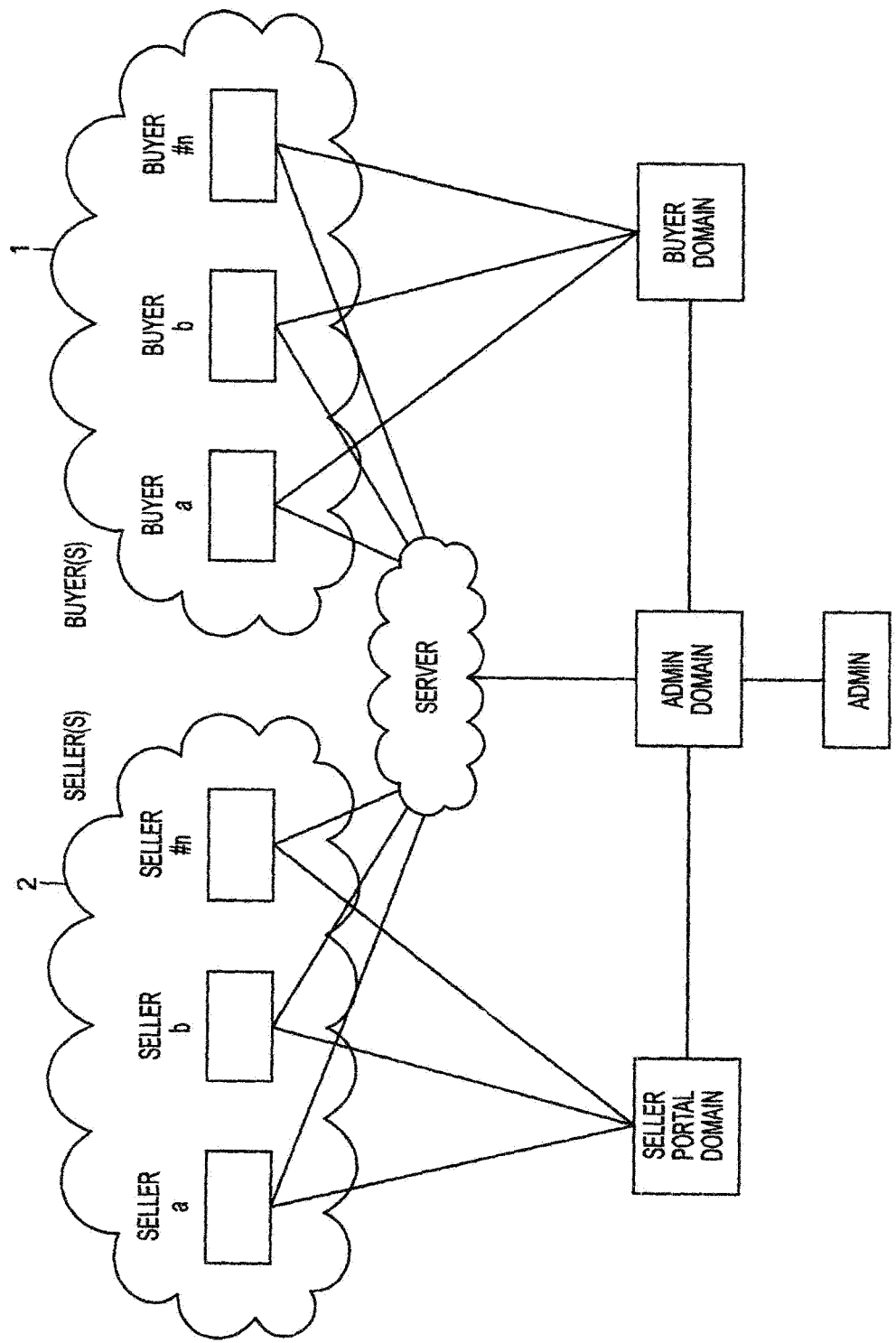
FIG. 1 is a schematic of a system.
Figure 6:
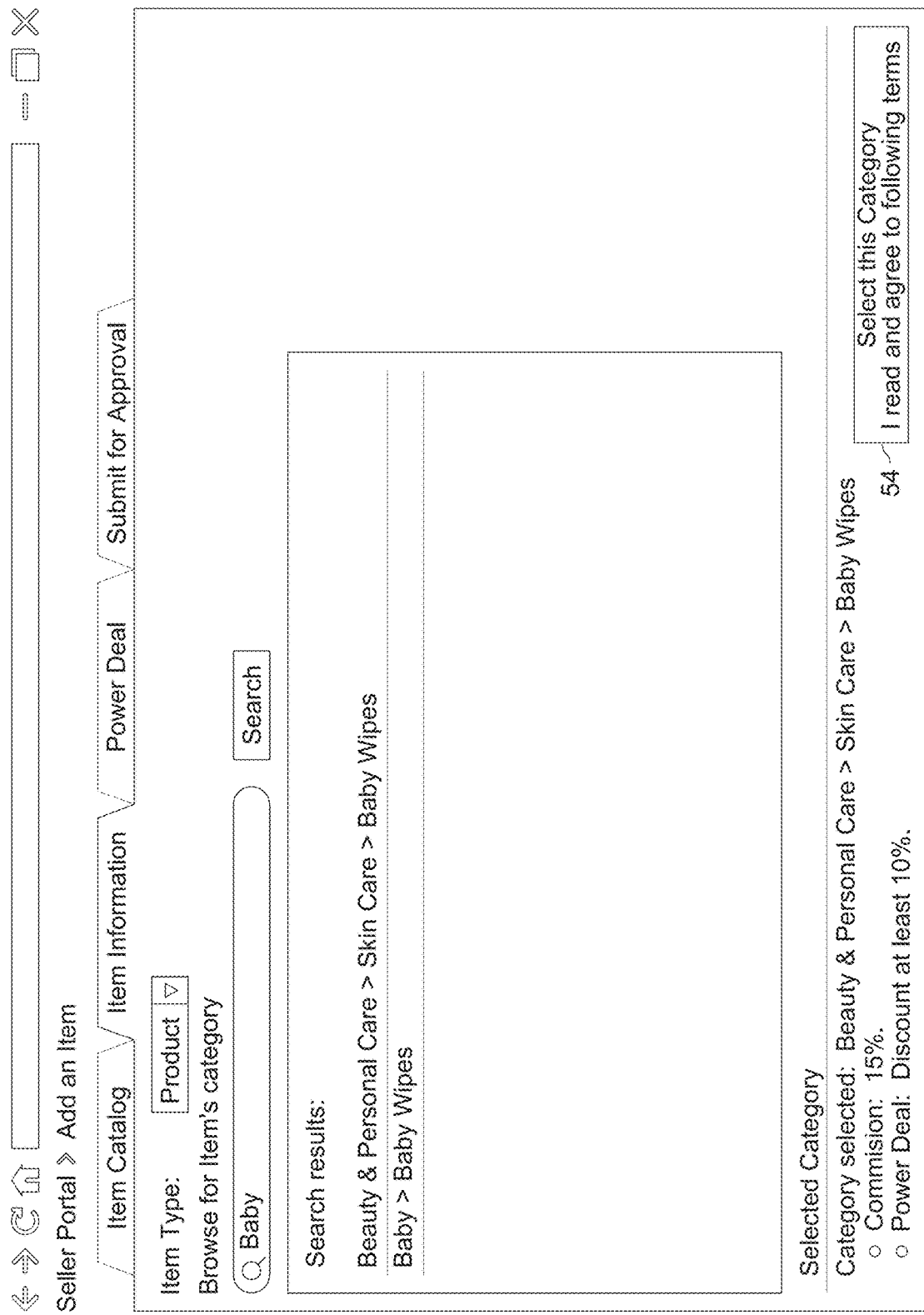
FIG. 6 is a third add an item screen.

In FIG. 2, the seller is given the option to either manually enter an item by clicking the Add an Item button 14 or to add a plurality of items using the Upload Item button 48. When the user clicks the Upload Item button, the user is guided through a series of steps that allows the user to add items via an application program interface (i.e., API). When the seller clicks on the Add an Item button one-by-one, the seller is shown the screen in FIG. 4. The seller is required to select Item Type 53 including but not limited to Product, Service, Gift Certificate, Voucher, Coupon, Deal, etc. The seller may search for an existing item listing by searching the Power Buy System database by item name, UPC, EAN, Seller SKU or mgSKU in the search field 50. If no existing item listing exists for the item to be added, then the seller may create a new item listing by clicking on button 52. Upon doing so, the seller may browse the item categories and select the proper item category as shown in FIGS. 5 and 6. When the proper item category is found, the seller may click on the Select this Category button 54 (see FIG. 6).

Figure 8:
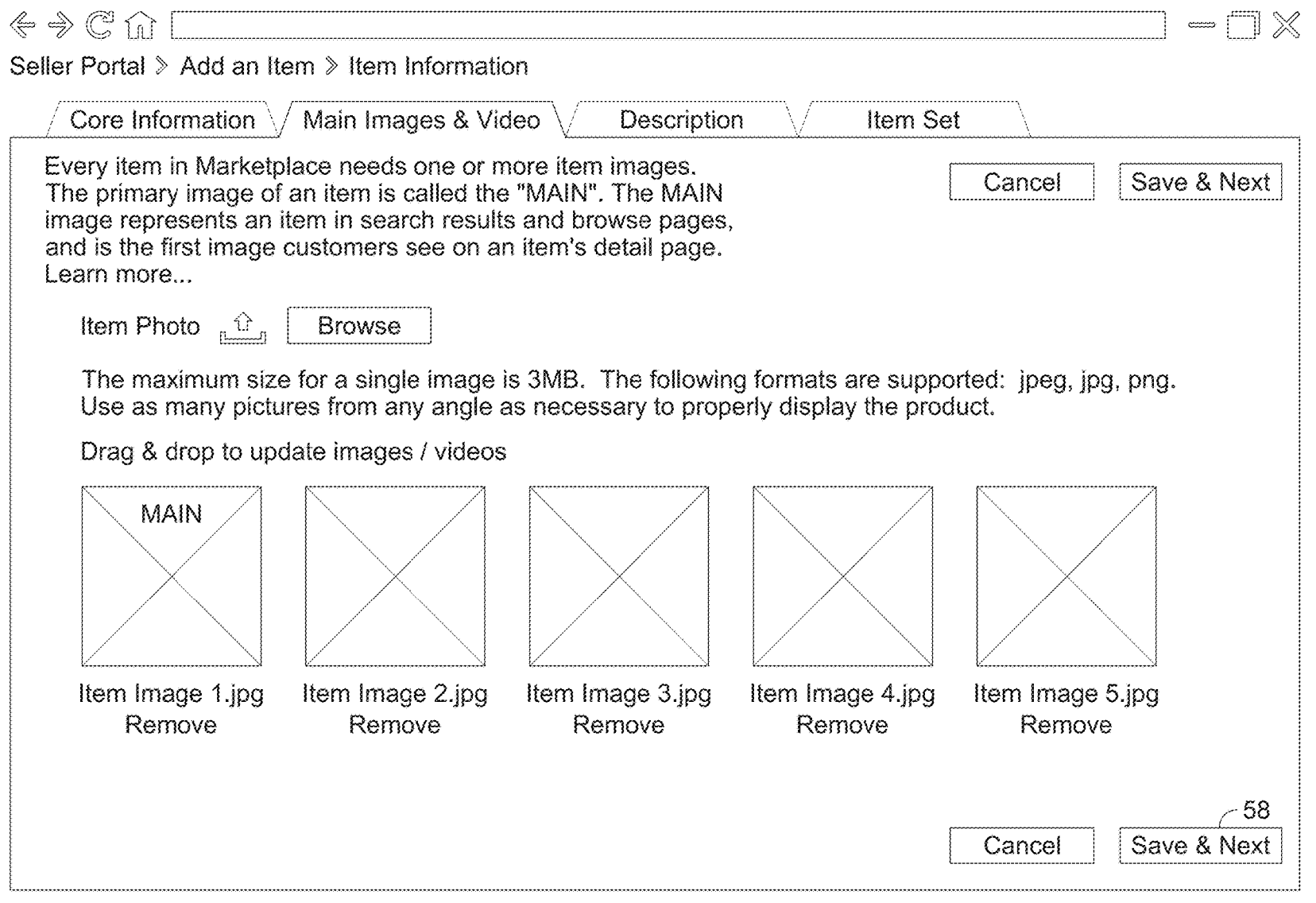

The seller is directed to incorporate core information of the item, as shown in FIG. 7A including but not limited to the Manufacturer's Name, Manufacturer's Part Number, Item Title, UPC or EAN, Brand, Related Item ID, weight, Seller's SKU, item condition, tax code, handling time (e.g., in days), country of origin, release date, import designation, target audience as well as the Sell Unit Price 39 (FIG. 7B) (i.e., buy now price) and Quantity Available 64 at the Buy Now Price, Sale Price information including but not limited to the sale price with associated start date and end date, seller warranty description, shipping options 59 and handling fee 61 (FIG. 7B). The seller may choose to opt-in to current or future Power Deals by setting up Power Unit Price 55 and Qty available for Power Deals 57 (FIG. 7B). The seller may click on the Save & Next button 56 (FIG. 7B) which leads the seller to the main images and video page shown in FIG. 8. Here, the seller may associate various images to the item listing. The seller may click on the Save & Next button 58 which leads the seller to the description tab (FIG. 9) so that the seller may include textual information about the item listing. The seller may then click on the Save & Next button 60 which then leads the seller to the item set page (FIG. 10) to enter various attribute information (such as color, size, type, scent, etc.) related to the item listing. Upon clicking the Save & Next button 62, the seller is led to the Auto Price Down screen shown in FIG. 11.

The Auto Price Down feature is exclusive for paid subscription. In the Auto Price Down screen shown in FIG. 11, the seller enters a number in the Qty available for Power Deals input field 79. The seller may opt in to Join Power Deal (I have read and agreed with the Power Deals terms and conditions) 81. Once opted-in, the seller may choose one of the two options: Automated Price Reduction by Quantity Tier 83 or Automated Price Reduction by Reduction Rate 85. Once this option is set up, the Power Buy System will act on behalf of the seller to join the Power Deal and Price Down when the criteria set up here is met. If the seller selects the Automated Price Reduction by Quantity Tier radio button 83, the seller may setup one or more tiers 66a, b, c-n which further discounts the Power Price of the item as more committed buys from the buyer collective is aggregated. In particular example shown in FIG. 11, if the buyer collective commits to purchasing a total of 99 units, then the seller will not participate in the Power Deal. However, once the buyer collective commits to buying at least 100 units (i.e. first tier threshold met), then the seller commits to sell to the committed buyers of the Power Deal with respect to the Qty available for Power Deal 79 at the Power Unit Price 70a of $205 in relation to the first tier. If the buyer collective commits to buying at least 201 units (i.e. second tier threshold met), then seller commits to sell to the committed buyers of the Power Deal with respect to the Qty available for Power Deal 79 at the Power Unit Price 70b of $200 in relation to the second tier. If the buyer collective commits to buying at least 301 units (i.e., third tier threshold met), then seller commits to sell to the committed buyers of the Power Deal with respect to the Qty available for Power Deal 79 at the Power Unit Price 70c of $195 in relation to the third tier. However, the Winning Buyers and Sellers along with the final purchased price will be determined when the Power Deal ends.

If the seller selects the Automated Price Reduction by Reduction Rate radio button 85, the seller may set a threshold level of buyer demand from the buyer collective by selecting a number of items in the threshold buyer demand drop down field 78 and checking the checkbox 80. If an active Power Deal listing 32 (FIG. 2) has Quantity Demanded from the buyer collective greater than or equal to the number in the threshold buyer demand field 78, then the seller will automatically join the Power Deal 32 (FIG. 2) offered the Power Price to be the System's Initial Power Price (SIPP) 43 (FIG. 14) if the seller happens to be the first seller of the Power Deal. If the Power Deal currently has one or more other sellers, the seller will automatically join the Power Deal 32 (FIG. 2) offered the Power Price 40 (FIG. 3) to be the same as the System's Current Power Price (SCPP) 45 (FIG. 14) if SCPP 45 was automatically set by the Power Buy System on behalf of some other sellers with paid subscription. If the System's Current Power Price (SCPP) 45 was set manually via Join Power Deal button 49 (FIG. 3) or Price Down button 44 (FIG. 3) by some other seller, the seller will automatically join the Power Deal 32 (FIG. 2) offered a lower Power Price 40 (FIG. 3) by a Reduction Rate 84 (FIG. 11) from the System's Current Power Price (SCPP) 45 (FIG. 14) but not less than the Floor Price 82 (FIG. 11) Likewise, if the seller has previously joined the Power Deal 32 (FIG. 2), the Power Price 40 (FIG. 3) will be automatically lowered by a Reduction Rate 84 (FIG. 11) from the System's Current Power Price (SCPP) 45 (FIG. 14) but not less than the Floor Price 82 (FIG. 11). In particular, if the SCPP 45 (FIG. 14) is $100 and the Reduction Rate 84 (FIG. 11) is $2 then the Power Price will be automatically set at $98. Furthermore, if the Floor Price 82 (FIG. 11) presents at $99 then the Power Price 40 (FIG. 3) will be automatically set at $99.

The seller may then confirm the information by clicking on the Save & Next button for approval 88 (FIG. 11). Upon doing so, the seller is notified that information will be reviewed by an administrator 4 for approval or rejection. The criteria for approval includes but not limited to the seller rating.

Figure 12A:
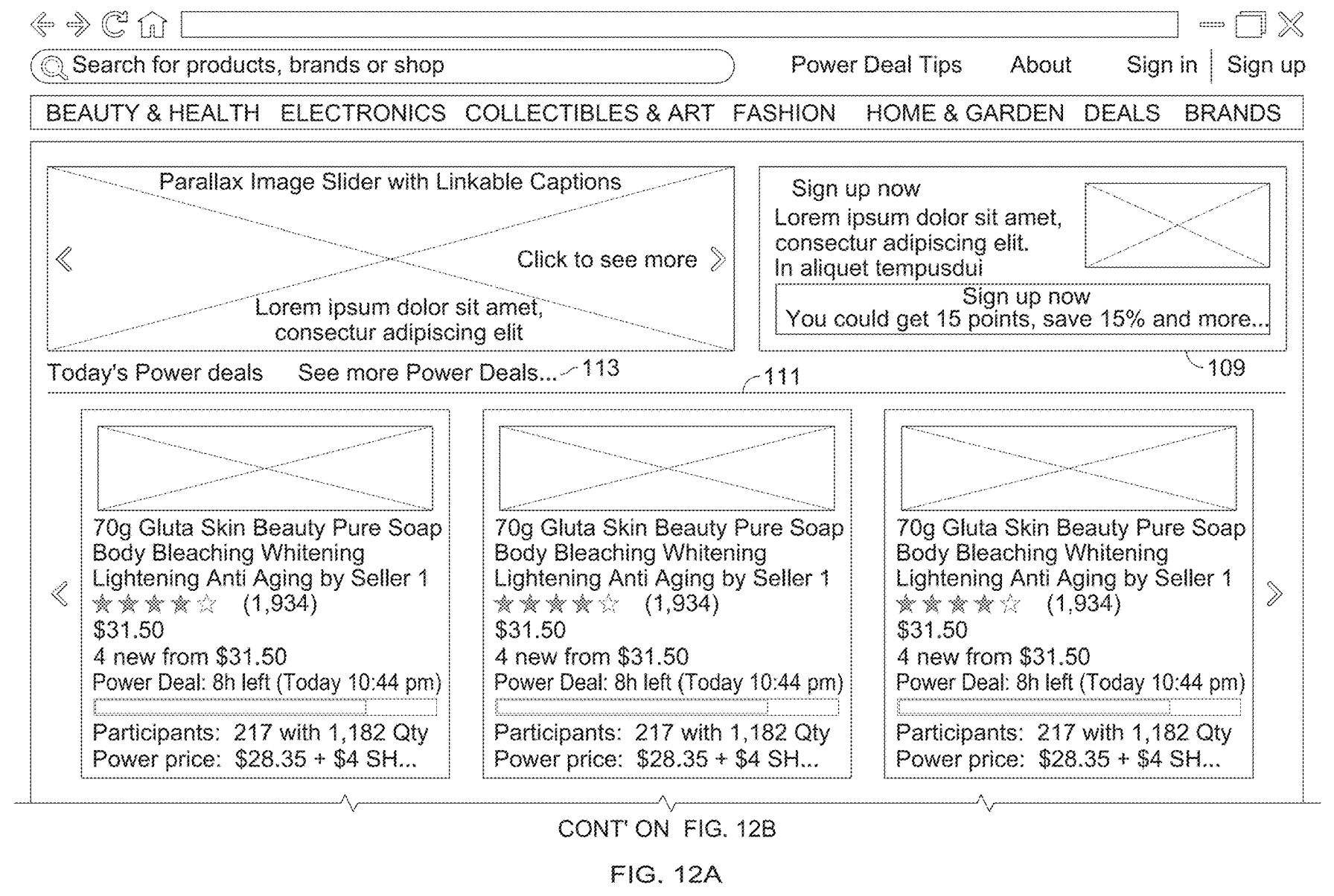
Figure 12B:
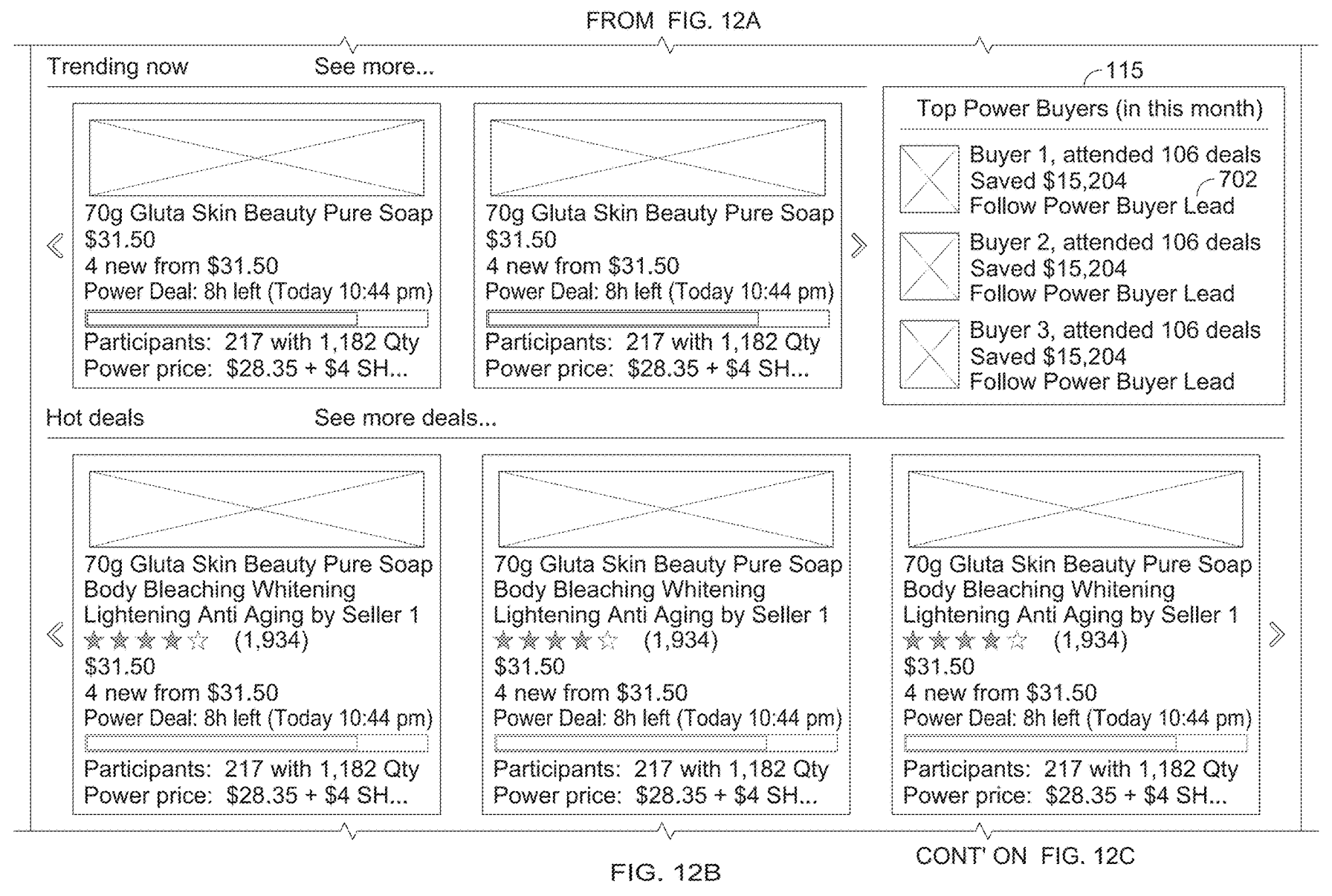
Figure 13:
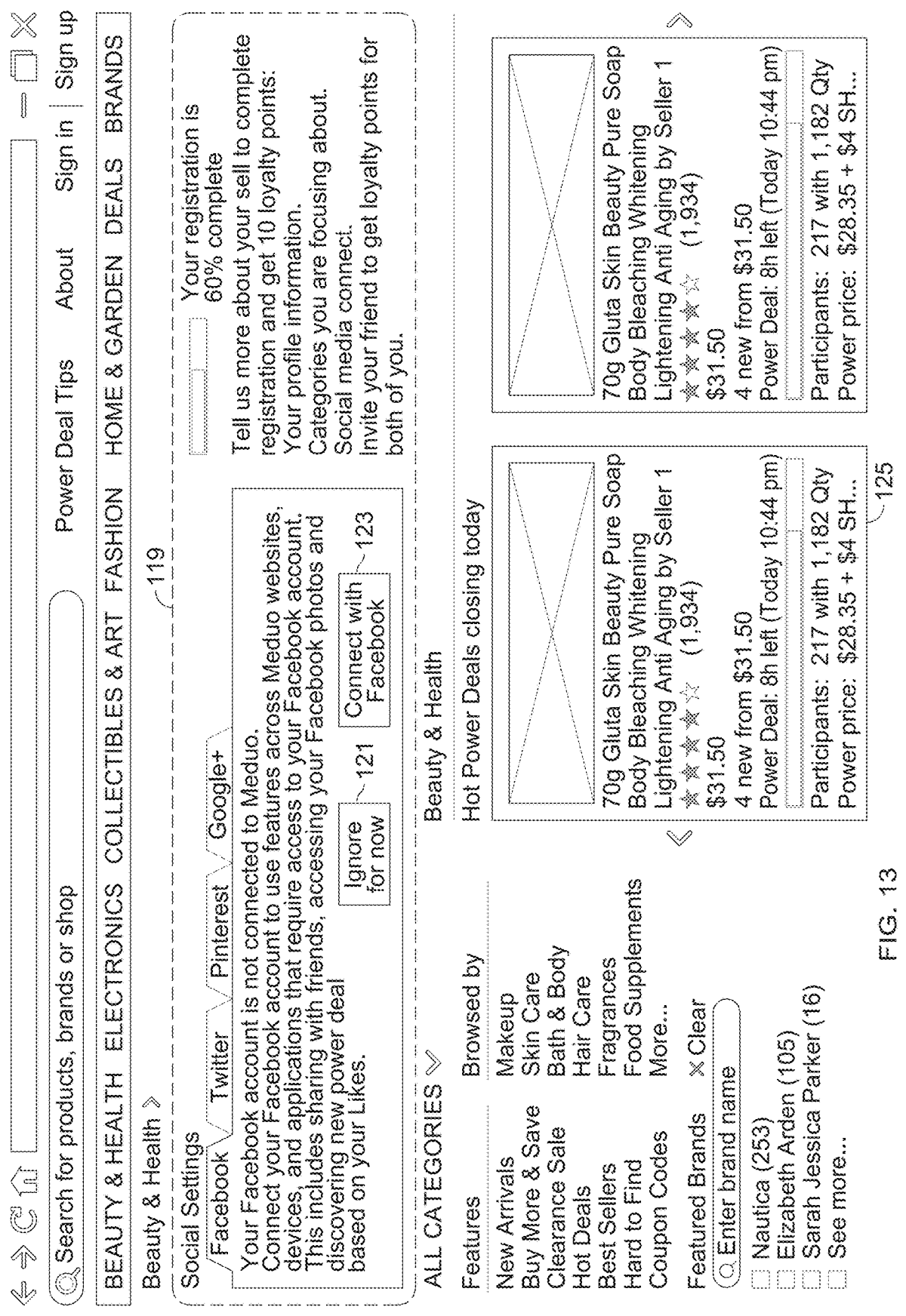

Referring now to FIGS. 12A, 12B and 12C, a buyer's website is shown. The buyer's website may include a sign-up section 109 (FIG. 12A), a listing or carousel of Today's Power Deal listings 111 (FIG. 12A), a link to see more Power Deals 113 (FIG. 12A), a listing of Top Power Buyers 115 (FIG. 12B) and a listing of Top Sellers (including Top Power Sellers) 117 (FIG. 12C). After the buyer has signed up with the Power Buy System, the buyer may allow the Power Buy System to communicate Power Deal listings 113 (FIG. 12A) to social contacts of the buyer through one or more social media accounts of the buyer via set up of the social settings section 119 (FIG. 13). The buyer may choose to skip the social media aspect of the Power Buy System by depressing the ignore for now button 121 or the buyer may click through each of the tabs (i.e., Facebook, Twitter, Pinterest, Google Plus, etc.) and authorize the Power Buy System to send Power Deal listing information to the buyer's contacts via one or more of the social media accounts of the buyer by depressing the "Connect With [Social Media Name]" button 123.

Figure 33:
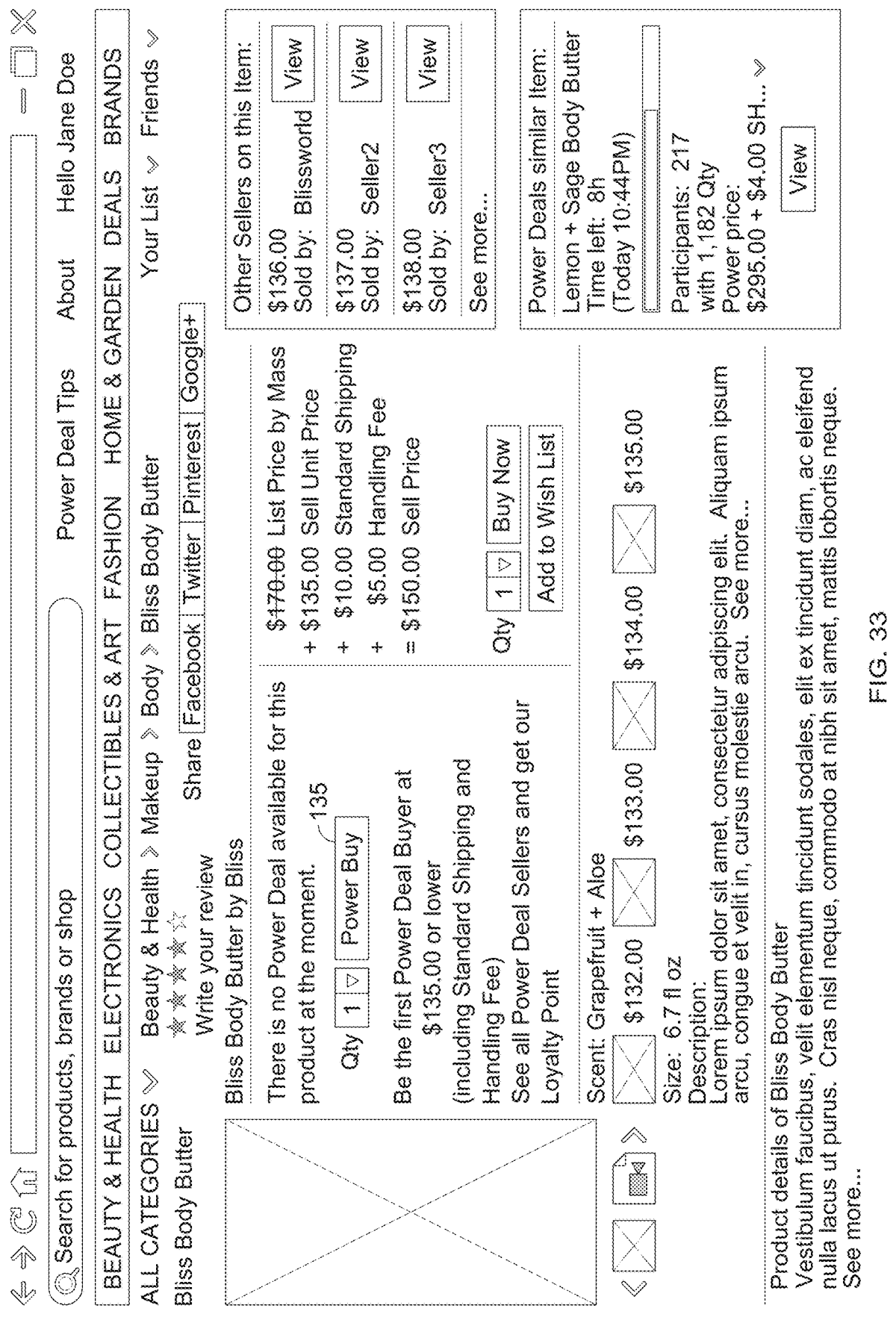

Referring still to FIG. 13, the buyer may explore a Power Deal listing 125 by clicking on the area represented by 125, upon which the buyer will be directed to the details screen of the Power Deal listing 125 shown in FIG. 14. The details screen shown in FIG. 14 allows the buyer to share the Power Deal listing 125 to the buyer's contacts via social media or directly through e-mail or text message by clicking on one of the icons in the share section 127 (FIG. 14) even if the buyer has not activated the Power Deal listing. The first buyer may initiate the Power Deal and commits to purchase the item of the Power Deal at the System's Initial Power Price (SIPP) 43 (FIG. 14) or lower by depressing the Power Buy button 135 (FIG. 33). Any subsequent buyer can join Power Deal by depressing the Power Buy button 129 (FIG. 14) to aggregate the Quantity Demanded to attract the seller of the item to join the Power Deal and to lower their Power Price. When a Power Deal is created, it might have zero or more committed sellers set up through the seller's website. The buyer may choose to be notified of any activities or updates to the Power Deal listing 111, 113 (FIG. 12A) and 125 (FIG. 13) by depressing the Follow Power Deal button 131 (FIG. 14). Joining of the Power Deal occurs when the buyer fills out the information contained in FIG. 15 and clicks on the submit Power Buy button 145. However, the buyer might opt-in for a single-click Power Buy option in their profile setting to bypass the steps described in FIG. 15 and go directly to committing to the Power Buy through Power Buy button 129 (FIG. 14) or Power Buy button 135 (FIG. 33) (if the first buyer of the Power Deal). When the seller logs into the buyer's website and view the item of their own listing, the Price Down button will be shown in lieu of Power Buy button 129 if the seller has already joined this Power Deal. The Join Power Deal button will be shown if the Seller has not joined this Power Deal yet. The seller may click on Price Down button to offer a lower price with respect to System's Current Power Price (SCPP) 45 to compete with other sellers for the Power Deal Quantity Demanded.

Upon joining of the Power Deal listing 113 (FIG. 12A), the buyer may now aggregate additional buyers by inviting other social contacts of the buyer by sharing the Power Deal listing 113 with the buyer's contacts either through social media accounts or by e-mail and text message. The motivation for buyer to aggregate more buyers to join Power Deal to drive up the Quantity Demanded is to buy the item at the System's Initial Power Price (SIPP) 43 (FIG. 14) or lower which is lower than the Buy Now Price 137 (FIG. 14) and/or to earn points in the system.

Figure 35:
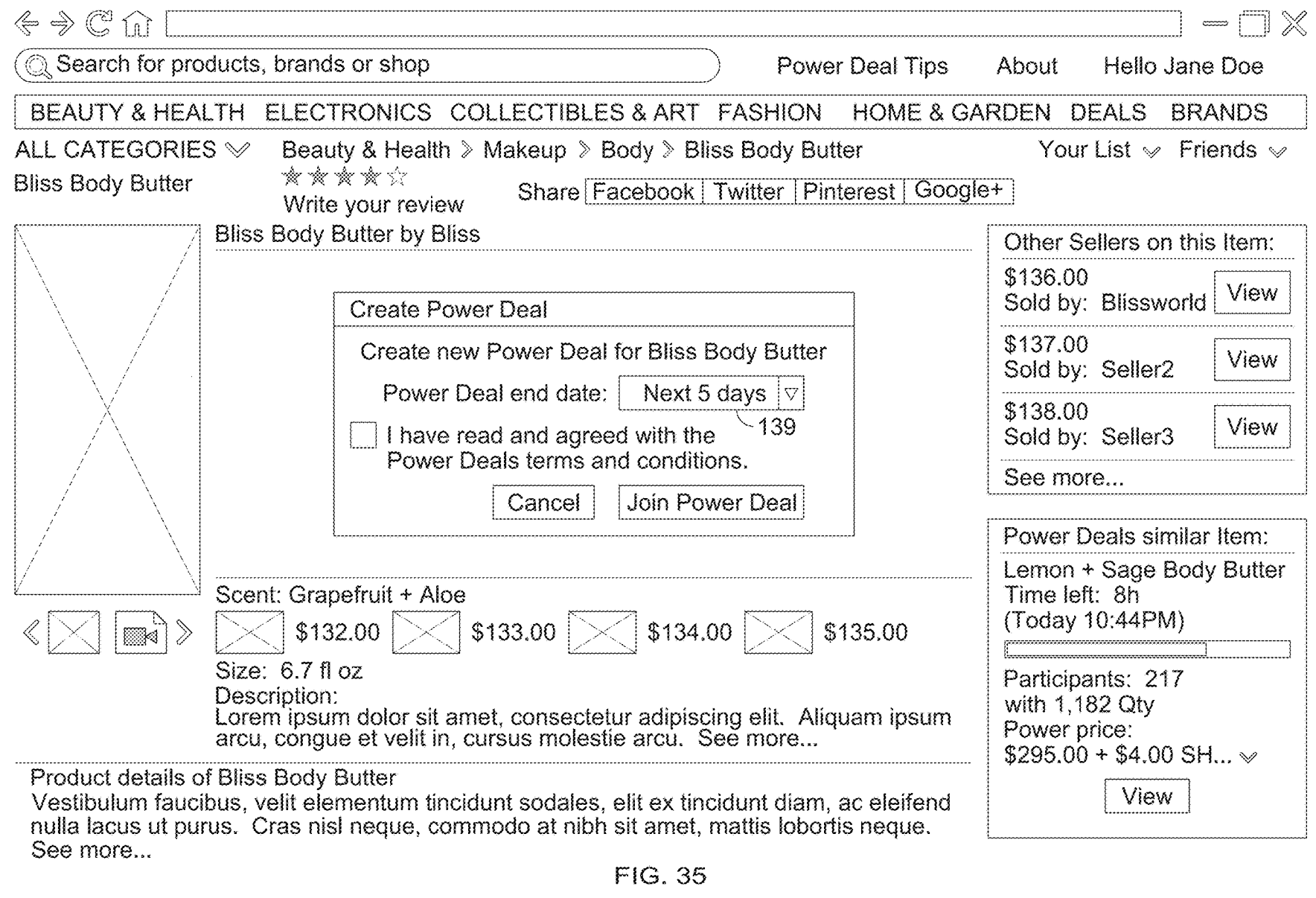

In order to join the Power Deal (FIG. 14), the buyer depresses the Power Buy button 129. The first buyer who initiates the Power Deal specifies the duration 139 (FIG. 35) of the Power Deal (including but not limited to hours, days, weeks, months). The buyer is led to the power buy screen shown in FIG. 15. Before committing to the Power Deal, the buyer inserts the quantity number in the quantity field 133 and shipping information in the shipping information section 141 and payment information in the payment section 143. The quantify field is the number of units the buyer is willing to buy per the conditions of the Power Deal (FIG. 14). Upon clicking the submit Power Buy button 145 (FIG. 15), the buyer is agreeing to purchase the item of the Power Deal (FIG. 14) at the System's Initial Power Price 43 (FIG. 14) or lower provided that the Power Deal (FIG. 14) has a sufficient amount of buyers to purchase a threshold number of units of the item as dictated by the Power Deal (FIG. 14). The buyer facilitates aggregation of more buyers to buy more units of the item in the Power Deal listing 113 (FIG. 12A) by reaching out to the buyer's contacts through social media accounts, e-mail and/or text message.

Figure 20:
FIG. 20 illustrates a notification screen.

After clicking on the submit Power Buy button 145 (FIG. 15), the buyer is led to the notifications page shown in FIG. 20. In this page, the buyer may specify how (email or text) and when (i.e. activities) the buyer is to be notified for activities 149 to the Power Deal listing. The buyer may allow the Power Buy System to notify the buyer's social contacts of activities 149a of the Power Deal listing 111, 113 (FIG. 12A) and 125 (FIG. 13) by way of authorizing such communication through one or more of the buyer's social media accounts. After filling out the information in the notification page, the buyer may depress the next button 142. If the user or buyer does not want to change default notification settings to notify the buyer's social media contacts or personal contacts or be notified of any activities of the Power Deal listing, the buyer can depress the skip for now button 144.

Upon depressing the next button 142 or skip for now button 144, the buyer is led to the invite friends page shown in FIG. 21. In this page, a personal invite link 146 may be cut and pasted into an e-mail, text message, or update status of the buyer's social media account. Alternatively, the buyer may send the personal invite link or information on the Power Deal listing 111, 113 (FIG. 12A) and 125 (FIG. 13) by allowing the Power Buy System to communicate with the buyer's social media account(s) by way of invite via social section 147 The Power Buy System also allows the user to depress one or more link 148 which will allow buyer to import their acquaintances' email from email provider such as Gmail, Yahoo, Outlook, AOL, etc. and enter e-mail message with pre-scripted information about the personal invite link and the Power Deal listing 111 and 113 (FIG. 12A). The buyer may fill out the send to e-mail addresses as desired. Alternatively, the invite friends page is capable of e-mailing or text messaging the buyer's friends or contacts directly.

The Power Buy System shown in the figures and described herein allows sellers to sell a higher volume of items through the help of buyers who reach out to the buyer's contacts and the contacts of the buyer's contacts. This is done by the seller providing various Power Deal listings 111, 113 (FIG. 12A) and 125 (FIG. 13) wherein a Power Deal item is sold to committed buyers at a first-tier lower price if a first-tier threshold number of units of an even further higher number of units can be sold, a second tier even lower price if a second tier even higher threshold number of units of the item can be sold to committed buyers, a third tier even further lower price if a third tier threshold number of units of the item can be sold to committed buyers, and so on.

On the seller's part, the seller offers a Power Deal listing 32 (FIG. 2) wherein the Power Price 40 (FIG. 3) is incrementally lowered below the System's Current Power Price 46 (FIG. 3) which is lower than a Buy Now Price 36 (FIG. 3) as Quantity Demanded for the item incrementally increases from the buyer collective. A more aggressive pricing structure entices buyers who want to purchase the item at a lower price and/or receive other point benefits from the Power Buy System. The buyer reaches out to the buyer's social contacts either through social media accounts of the buyer or directly by way of e-mail or text message trying to convince these contacts to commit to buying the item. As the number of committed buyers increase and therefore the Quantity Demanded for the item of the Power Deal listing 111, 113 (FIG. 12A) and 125 (FIG. 13) increases this will motivate more sellers to join the Power Deal to compete for Quantity Demanded and lower the Power Price further.

Other sellers may view the Power Deal listing 32 (FIG. 2) and offer a lower Power Price 40 (FIG. 3) than the System's Current Power Price (SCPP) 46 (FIG. 3) thereby further driving down the System's Current Power Price 46 (FIG. 3) for the Power Deal listing 32 (FIG. 2). This in turn excites the committed buyer(s) and potential buyers (i.e., buyers that follow a Power Deal listing) and motivates the buyers to tell their friends about the Power Deal listing 111, 113 (FIG. 12A) and 125 (FIG. 13). Committed and potential buyers are those following the Power Deal listing 111, 113 (FIG. 12A) and 125 (FIG. 13) and buyers committed to buying the item in the Power Deal listing 111, 113 (FIG. 12A) and 125 (FIG. 13). If a seller Price Down the Power Price 40 (FIG. 3) for that Power Deal listing, more buyers would join in the Power Deal listing 111, 113 (FIG. 12A) and 125 (FIG. 13) due to the lower sell price and this cycle rewards both the sellers and the buyers by way of volume sales for the sellers and lower pricing for the buyers.

The seller's website may be reached by entering a seller's subdomain 3. In particular, the seller's sub-domain may be https://sellerportal.[ourdomain].com. The seller must have an account with the Power Buy System and login to the seller management to create or update item for Buy Now listing and/or a potential Power Deal listing 32 (FIG. 2) upon the activation of the first buyer who commits to the Power Deal. The seller may sign up for a free basic account or paid subscription account. In the basic account, the seller can only Price Down below System's Current Power Price (SCPP) by manually clicking on the Price Down button 44 (FIG. 3). With the paid subscription account, the seller may set up rules to automatically Price Down below the System's Current Power Price (SCPP) 46 (FIG. 3) as shown in the Price Down options in FIG. 11.

In operation, a plurality of sellers may set up potential Power Deal 63 (FIG. 2) for a particular item. The Power Deal listings 32 (FIG. 2) may consist of zero or more progressively lower Power Prices corresponding to progressively higher item units to be sold. When a Power Deal is created, it might have zero or more committed sellers set up through the seller's website. The Seller's Current Power Price 40 (FIG. 3) (i.e., MCPP) is the current lowest Power Price 40 of the specific seller or merchant for this item at that time for a particular buyer demand level. After determining the Seller's Current Power Price 40 (FIG. 3), the Power Buy System will compare the System's Current Power Price 46 (FIG. 3) to the Seller's Current Power Price 40 (FIG. 3). If the Seller's Current Power Price 40 is less than the System's Current Power Price, the Power Buy System will update the System's Current Power Price to the Seller's Current Power Price 40. The System's Current Power Price is the current lowest Power Price for this item at a system level (i.e., comparing all item deal listings for that item).

If the seller has a free basic account, the seller of the basic account may outbid other sellers by manually clicking on a Price Down button 44 (FIG. 3) in order to be the first in line to sell the item to the committed buyers associated with the Power Deal. If the seller has a paid subscription account, the seller may set up automatic Price Down options for their items having Power Deal listings as shown in the Price Down options in FIG. 11. As such, when a seller manually Prices Down a Power Price 40 (FIG. 3) of the current Power Deal listing 32 (FIG. 2), those sellers with paid subscription account may automatically Price Down below the manually Priced Down Power Price. Auto Price Down process may only be triggered when a seller clicks on Priced Down button or Joined Power Deal button. Auto Price Down process does not compete with Power Price from another auto Price Down.

Referring now to FIG. 22, two Power Deal listings 32a, 32b from first and second sellers for a particular item are shown. These Power Deal listings 32a, b may be uploaded to the Power Buy System by way of an API (i.e., application program interface) or manually entered as discussed above. The buyer may view each of these Power Deal listings 111, 113 (FIG. 12A) and 125 (FIG. 13) and join a preferred Power Deal listing 111, 113 (FIG. 12A) and 125 (FIG. 13) as described above. If the buyer Quantity Demanded of the Power Deal meets a minimum quantity of items to enter the tier two level, then the seller's Power Price will be set at the tier two Power Unit Price+Standing Shipping+Handling Fee. The buyers may also actively aggregate additional buyers through social media or directly to increase Power Deal Quantity Demanded. The seller will not automatically join the Power Deal if the buyer is not able to aggregate enough Power Deal Quantity Demanded to meet the minimum number of units to enter tier two.

In the example shown in FIG. 22, if the buyer joins the Power Deal listing 32a set up by the first seller, then the buyer is committing to purchasing the item at $205 or lower per unit. However, the seller has not committed to selling the unit at $205 unless the seller can move more units defined by the Power Deal listing 32a. At this point, the buyer has not purchased the item at the current power price 40 (FIG. 3) of $205. The buyer may contact the buyer's contacts through social media accounts or directly by way of text message or e-mail to advise the buyer's social media contacts of the Power Deal listing 32a. As more buyers commit to purchasing the item, the Power Deal Quantity Demanded from the buyer collective increases. In particular, if there are a sufficient number of Power Buyers to purchase 100 units, then those committed buyers will buy the item at $205 per unit+Standard Shipping+Handling Fee. At this time, a different seller may join in the Power Deal listing 32a by pricing down the Power Price 40 (FIG. 3) to below the System's Current Power Price 46 (FIG. 3) which is $205 at this time. If another seller prices down the Power Price 40 (FIG. 3) to $204, then the seller or new seller will be able to sell 100 units to the buyer collective at $204+Standard Shipping+Handling Fee. The first Seller is no longer the winner of the Power Deal. By lowering the current Power Price 40 (FIG. 3), the current buyers may be notified of the lower Power Price 40 (FIG. 3) and be motivated to contact their social network to aggregate additional buyers to further increase buyer demand and hopefully drive down the System's Current Power Price 46 (FIG. 3). As the buyer collective increases, the Quantity Demanded from committed buyers increases, then the System's Current Power Price may be further lowered as more sellers are motivated to win the Power Deal to move more items. By way of example, if the buyer collective commits to buying 151 units, then the Power Buy System tells the buyer collective that the System's Current Power Price 46 (FIG. 3) is $203+Standard Shipping+Handling Fee. The Power Buy System also notifies sellers that buyer demand is increasing and that more items may be sold. If the first seller has a paid subscription account, then the automatic Price Down settings may incrementally Price Down the current Power Price 40 (FIG. 3) from the System's Current Power Price (SCPP) 46 (FIG. 3) by the preset increment defined by first seller in order to win the Power Deal 32 (FIG. 2) and be able to sell the item to the buyer collective. If the first seller has a basic account, then the first seller must manually Price Down the Current Power Price 40 (FIG. 3) below the System's Current Power Price 46 (FIG. 3) by clicking on the link or Price Down button 44 (FIG. 3). As the end of the Power Deal listing 32 (FIG. 2) approaches, sellers will want to Price Down the current Power Price 40 (FIG. 3) in order to win the ability to sell the item to the buyer collective and sell a large quantity of item. In turn, the lower prices attract more buyers until an optimal lowest price is achieved for the current Quantity Demanded from the buyer collective.

Figure 23B:
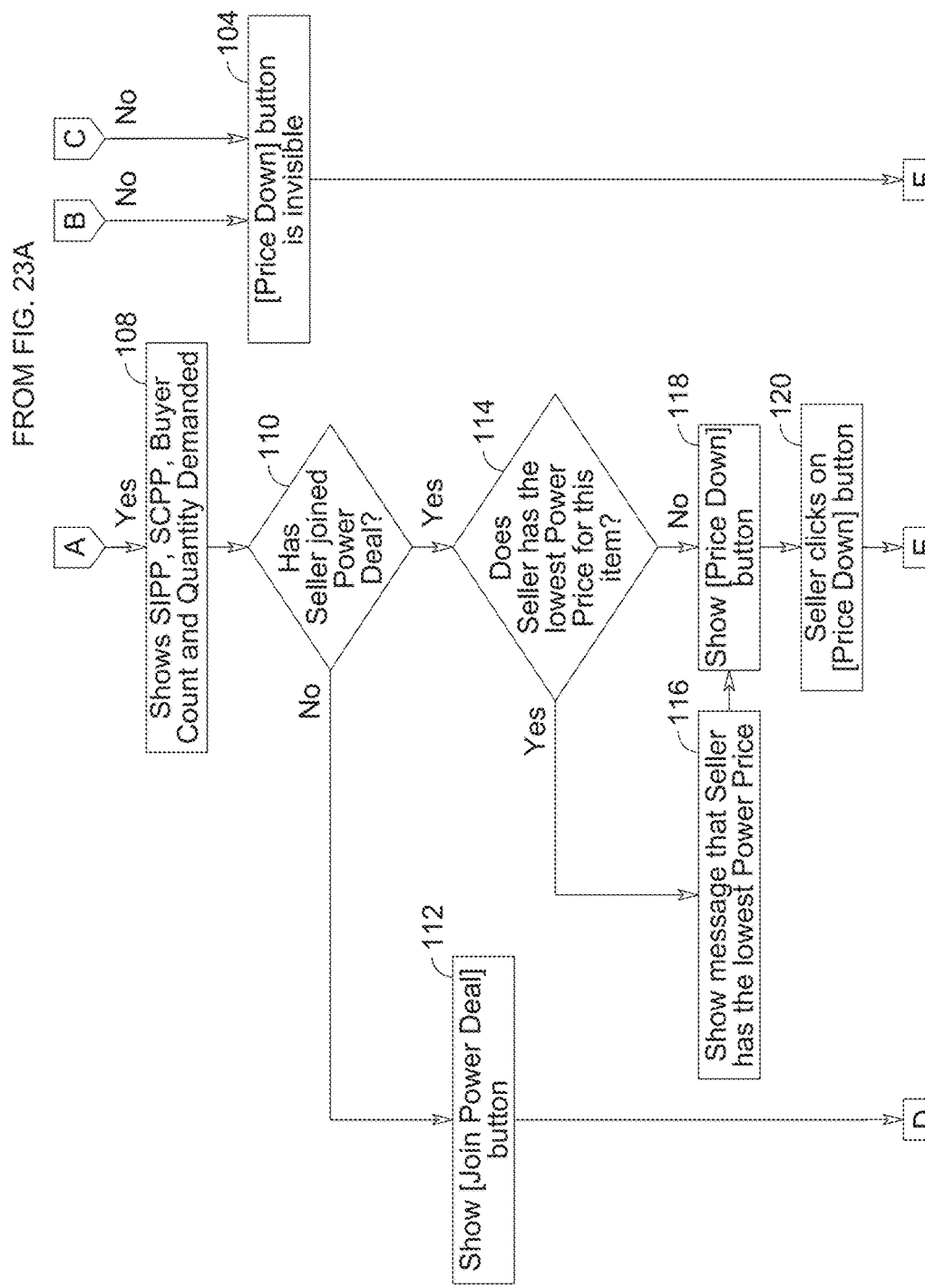
Figure 23C:
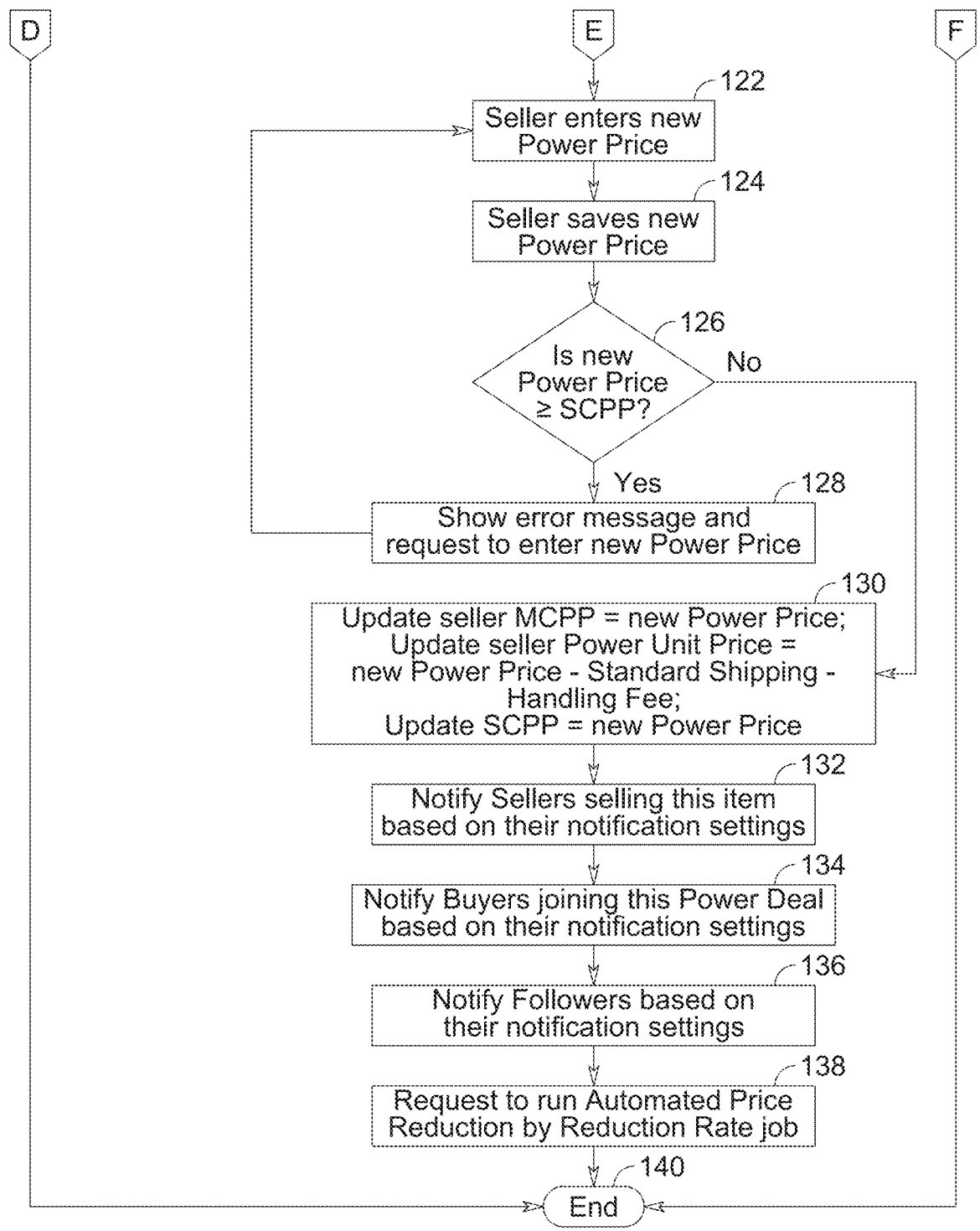

Referring now to FIGS. 3, 11, 23A-C referenced as Price Down process, a flowchart of how the Power Buy System processes a Price Down which is manually activated by clicking on the Price Down button 44 (FIG. 3) on the seller's website (not shown) or the buyer's website 100 (FIG. 23A) when the seller is logged in is shown in FIG. 3. In particular, if the seller does not sell this item 102 (FIG. 23A), Price Down button is not shown 104 (FIG. 23B) and the process terminates 140 (FIG. 23C). Otherwise, the process determines 106 if the Power Deal exists for this item. If no, then Price Down button is not shown 104 (FIG. 23B) and the process terminates 140 (FIG. 23C). If yes and the seller has configured the auto Price Down option (FIG. 11), then the process may show all configured tiers (i.e., price and quantity) for all sellers of the item having their own Power Deals. The process also shows the System's Initial Power Price (SIPP), System's Current Power Price (SCPP), count of joining buyers and Quantity Demanded 108 (FIG. 23B). The process determines if the seller has joined the Power Deal 110 (FIG. 23B). If no, the process shows the Join Power Deal button 112 (FIG. 23B) and the process terminates 140 (FIG. 23C). If yes and seller has the lowest Power Price for this item 114 (FIG. 23B) then a message is shown that seller has the lowest Power Price 116 (FIG. 23B). It shows Price Down button 118 (FIG. 23B). For an active Power Deal listing, a seller may click 120 (FIG. 23B) on the Price Down button or link 44 (FIG. 3) to mark the Price Down so that the seller is the current lowest bidder of the Power Deal. The seller enters a new Power Price 122 (FIG. 23C) in field 40 (FIG. 3). The seller attempts to save 124 (FIG. 23C) the new Power Price 122 (FIG. 23C) by clicking on the Confirm Update button 51 (FIG. 3). The process now calculates or determines if the new Power Price 122 (FIG. 23C) is greater than or equal to the System's Current Power Price (SCPP) 126 (FIG. 23C). If the answer is yes then the process shows 128 (FIG. 23C) an error message and requests the seller to re-enter a new Power Price 122 (FIG. 23C). If the answer is no, then the process updates 130 (FIG. 23C) the Seller's Current Power Price (MCPP) and System's Current Power Price (SCPP) at the new Power Price 122 (FIG. 23C) and Power Unit Price=new Power Price−Standard Shipping−Handling Fee. The process notifies 132 (FIG. 23C) other sellers selling this item based on their notification settings, notifies 134 (FIG. 23C) buyers joining this Power Deal based on their notification settings and notifies 136 (FIG. 23C) followers based on their notification settings. The process then triggers a request to run an automate Price Down by Reduction Rate job 138 (FIG. 23C). The process terminates 140 (FIG. 23C).

Figure 24A:
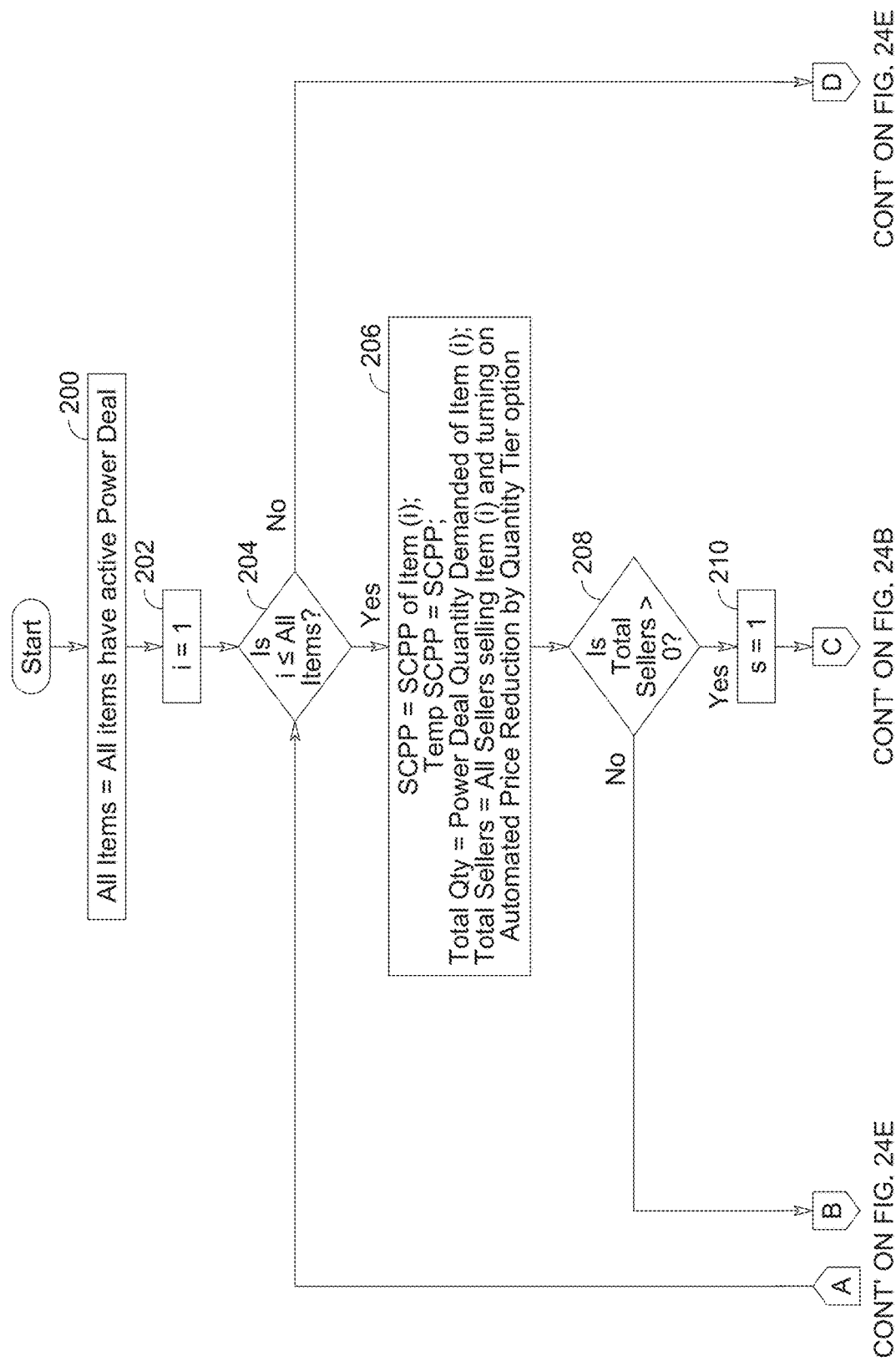
Figure 24C:
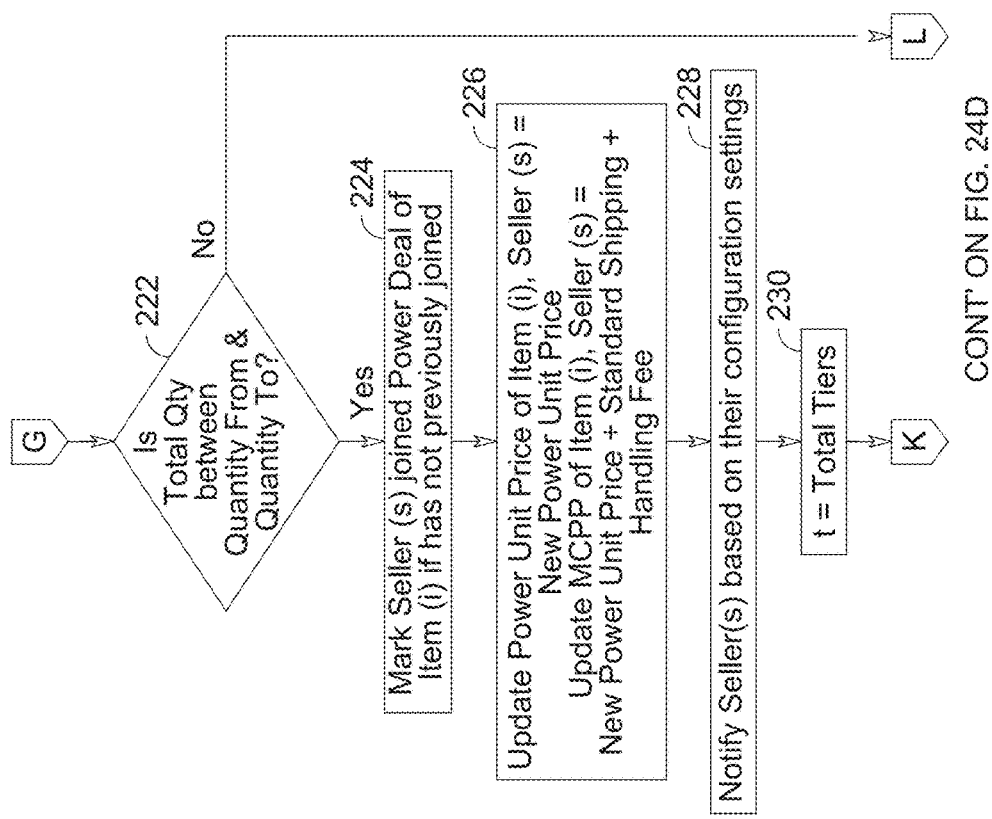
Figure 24D:
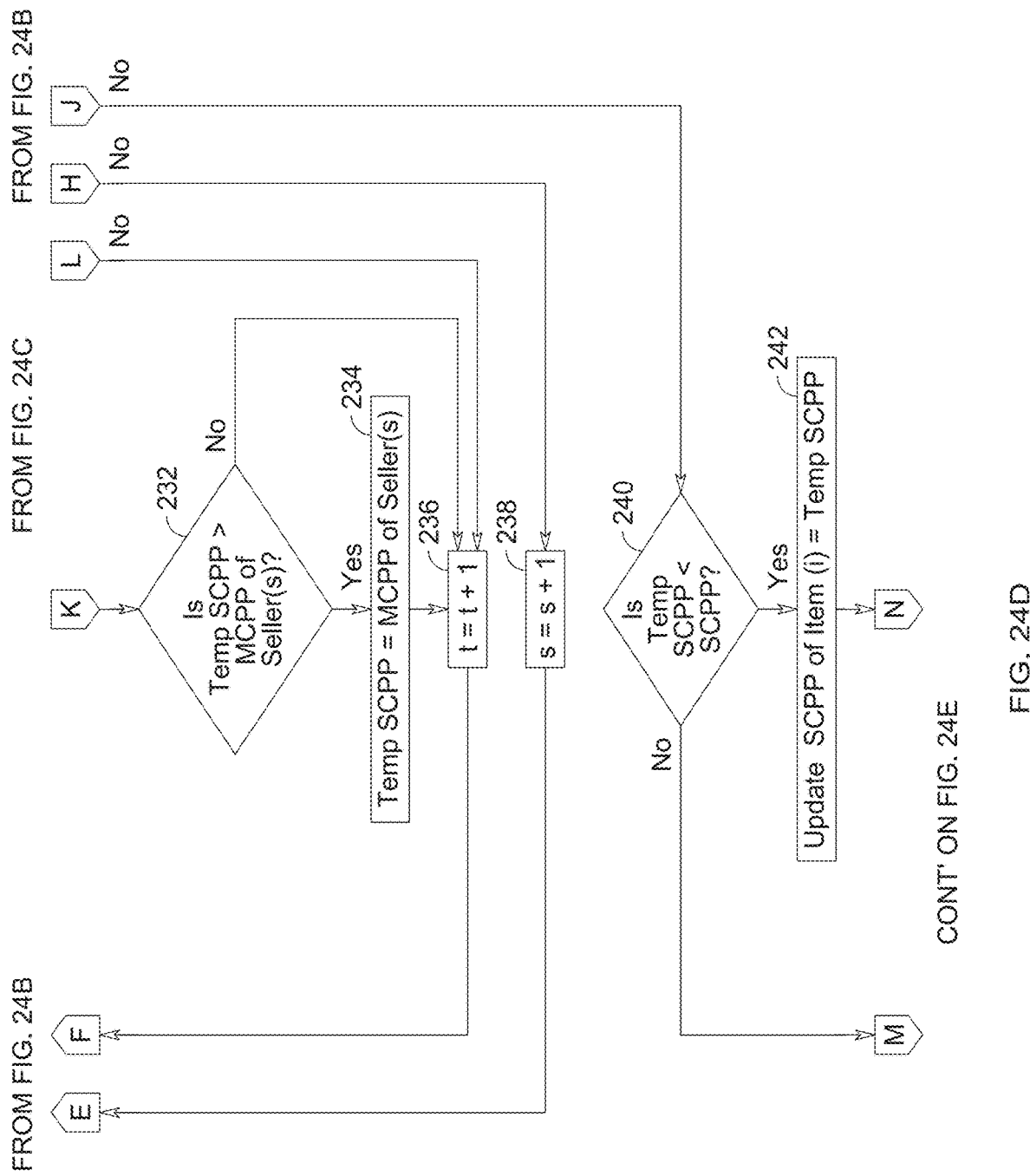
Figure 24E:
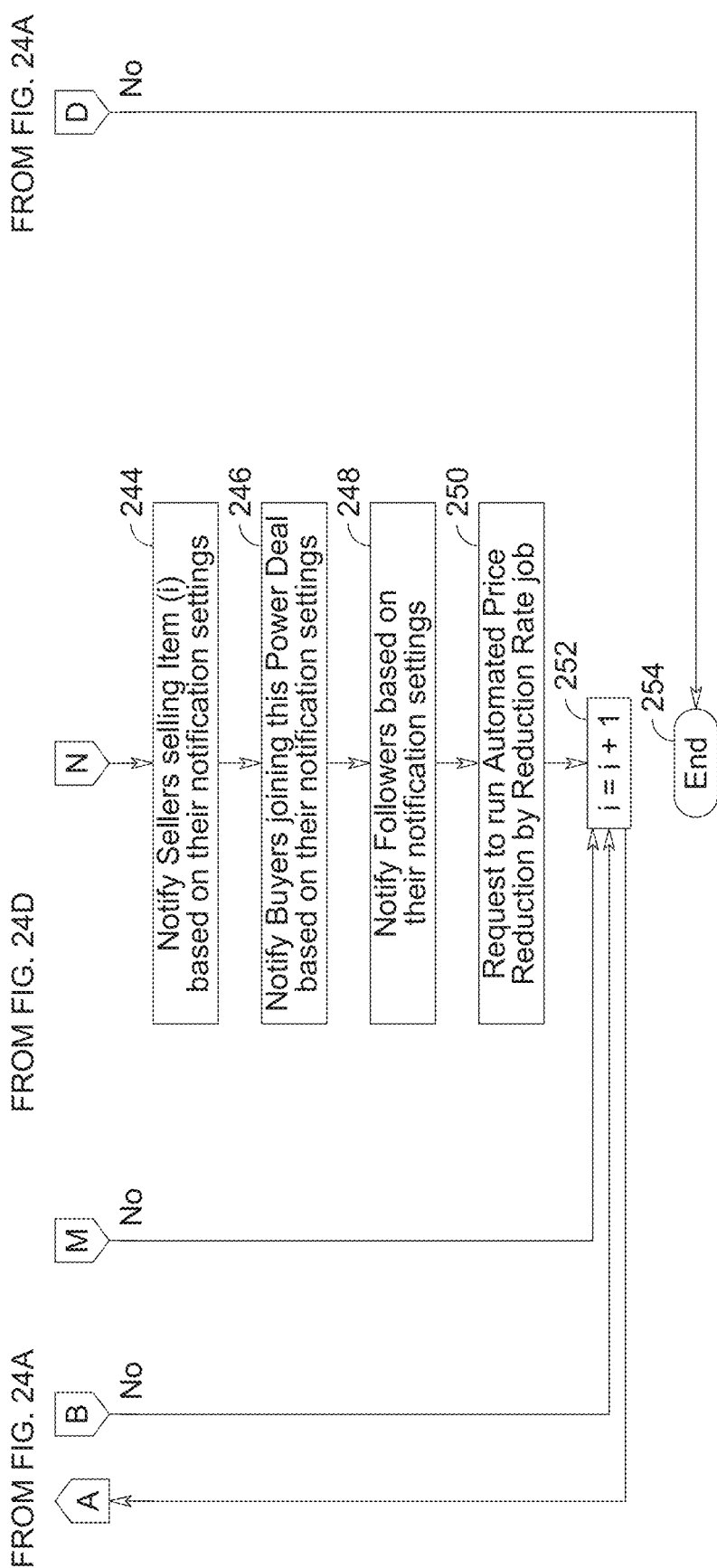

Referring now to FIGS. 11, 24A-E, a flowchart depicting the process (i.e. a computer automation job) of the Power Buy System automatically calculates Price Down based on Automated Price Reduction by Quantity Tier option. The process browses 200 (FIG. 24A) All Items with an active Power Deal. The process selects the first item and set i to one (1) as the current item 202 (FIG. 24A). The process determines 204 (FIG. 24A) if not All Items are processed. If no, then the process terminates 254 (FIG. 24E). If yes, then the process retrieves 206 (FIG. 24A) the data for Item (i). SCPP and Temp SCPP are set to System's Current Power Price (SCPP) of Item (i). Total Qty is set to the Power Deal Quantity Demanded of Item (i). Total Sellers is set to all sellers selling Item (i) with paid subscription and selected the automated Price Down Reduction by Quantity Tier option. The process determines 208 (FIG. 24A) if Total Sellers is greater than zero. If no, then the process fetches the next item (i) 252 (FIG. 24E) and loops back to decision 204 (FIG. 24A). If yes, then the process selects the first seller and set s to one (1) as the current seller 210 (FIG. 24A). If not all Total Sellers are processed 212 (FIG. 24B), Total Tiers 214 (FIG. 24B) is set to the list of Automated Price Down Reduction by Quantity Tier option of Item (i) Seller (s). The process selects the first tier and set t to one (1) as the current tier 216 (FIG. 24B). The process determines 218 (FIG. 24B) if not All Tiers are processed. If no, the process fetches the next seller (s) 238 (FIG. 24D) and loops back to decision 212 (FIG. 24B). If yes, then the process retrieves 220 (FIG. 24B) the data for tier (t). Quantity From is set to Quantity From of Item (i), Seller (s) and Tier (t). Quantity To is set to Quantity To of Item (i), Seller (s) and Tier (t). New Power Unit Price is set to Power Unit Price of Item (i), Seller (s) and Tier (t). Standard Shipping is set to Standard Shipping of Item (i), Seller (s) and Tier (t). Handling Fee is set to Handling Fee of Item (i), Seller (s) and Tier (t). The process determines 222 (FIG. 24C) if the Total Qty is between Quantity From and Quantity To. If no, the process fetches the next tier (t) 236 (FIG. 24D) and loops back to decision 218 (FIG. 24B). If yes, then the process marks 224 (FIG. 24C) Seller (s) joined Power Deal of Item (i) if has not previously joined. The process updates 226 (FIG. 24C) Power Unit Price of Item (i), Seller (s) to be new Power Unit Price and updates current Power Price (MCPP) of Item (i), Seller (s) to be new Power Unit Price+Standard Shipping+Handling Fee. The process notifies the Seller (s) of the updated Power Unit Price and MCPP based on their configuration settings 228 (FIG. 24C). The process sets the current tier (t) to Total Tiers to end the Tier loop 230 (FIG. 24C). Moreover, the process determines 232 (FIG. 24D) if temp SCPP is greater than Power Price (MCPP) of Seller (s). If no, the process fetches the next tier (t) 236 (FIG. 24D) and loops back to decision 218 (FIG. 24B). If yes, then temp SCPP is set to Power Price (MCPP) of Seller (s) 234 (FIG. 24D). The process fetches the next tier (t) 236 (FIG. 24D) and loops back to decision 218 (FIG. 24B). If All Tiers are processed 218 (FIG. 24B), then the process fetches the next seller (s) 238 (FIG. 24D) and loops back to decision 212 (FIG. 24B). If all Total Sellers are processed 212 (FIG. 24B), then the process determines 240 (FIG. 24D) if temp SCPP is less than SCPP. If no, the process fetches the next item (i) 252 (FIG. 24E) and loops back to decision 204 (FIG. 24A). If yes, then the process updates SCPP of Item (i) to be temp SCPP 242 (FIG. 24D). The process notifies all sellers selling Item (i) 244 (FIG. 24E), notifies buyers joining this Power Deal based on their notification settings 246 (FIG. 24E) and notifies followers based on their notification settings 248 (FIG. 24E). The process then triggers a request to run an automate Price Down by Reduction Rate job 250 (FIG. 24E). The process fetches the next item (i) 252 (FIG. 24E) and loops back to decision 204 (FIG. 24A).

Referring now to FIGS. 11 and 25A-E, a flowchart depicts the process (i.e. a computer automation job) of automatically calculating Price Down based on a Price Down by Reduction Rate option. The seller checks the checkbox 81 (FIG. 11) to join Power Deal. The seller also selects radio button 85 (FIG. 11) for automated Price Reduction by Reduction Rate. Once Seller selects radio button 85, they can select checkbox 80 (FIG. 11) for the automatically join Power Deal action if ordered quantity meets or exceeds Threshold Quantity defined at 78 (FIG. 11). When System's Current Power Price (SCPP) was marked by Price Down button or Join Power Deal button, the sellers with selected the radio button 85 (FIG. 11) automatically Price Down on MCPP and SCPP as shown in the flowchart shown in FIG. 25A.

Figure 25E:
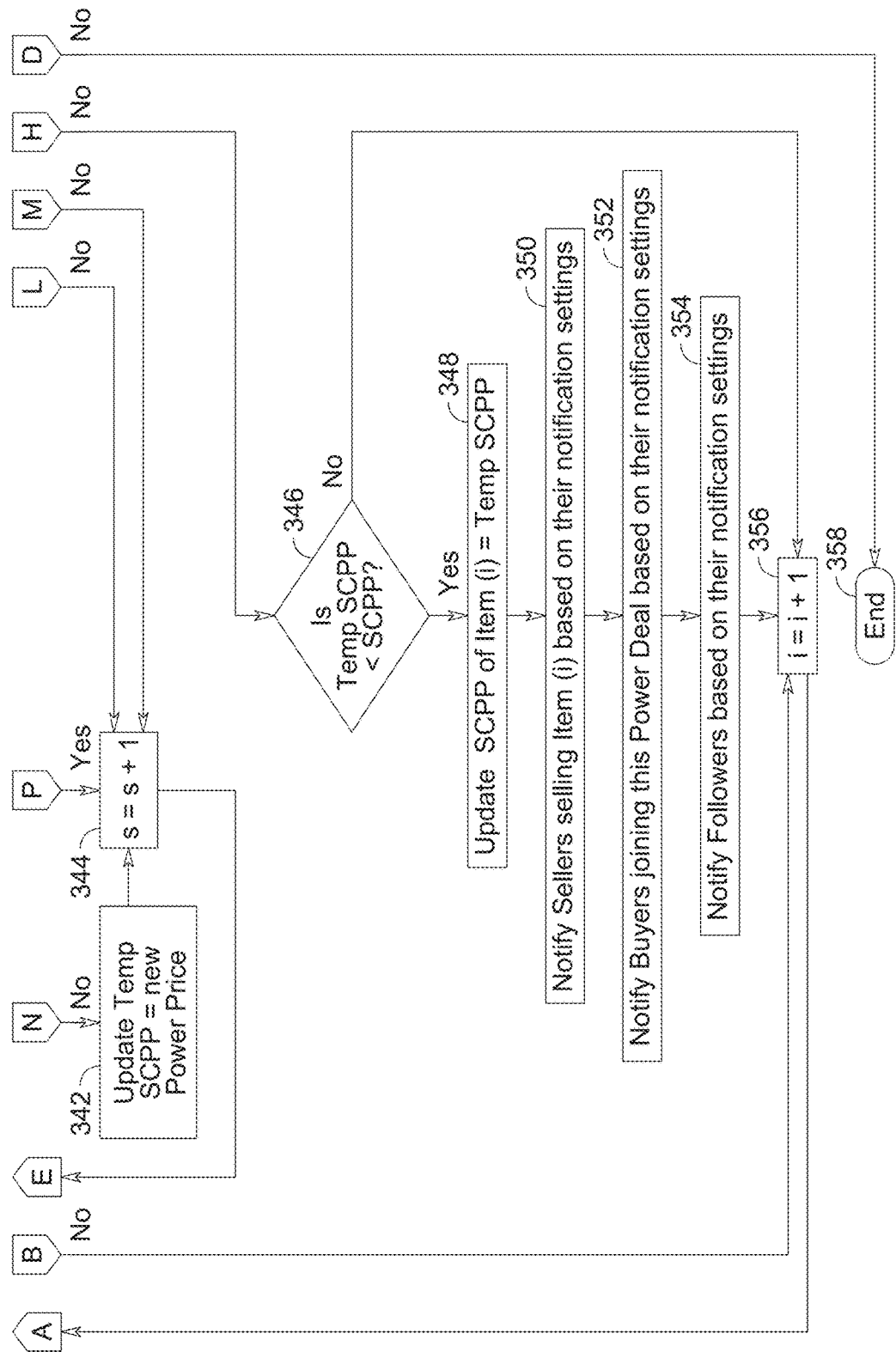

In particular, the process browses 300 (FIG. 25A) All Items with active Power Deal. The process selects the first item and sets i to one (1) as the current item 302 (FIG. 25A). The process determines 304 (FIG. 25A) if not All Items are processed. If no, then the process terminates 358 (FIG. 25E). If yes, then the process retrieves 308 (FIG. 25A) the data for Item (i). SCPP and Temp SCPP are set to System's Current Power Price (SCPP) of Item (i). Total Qty is set to the Power Deal Quantity Demanded of Item (i). Total Sellers is set to all sellers selling Item (i) with paid subscription and turning on automated Price Down Reduction by Reduction Rate option. The process determines 310 (FIG. 25A) if Total Sellers is greater than zero. If no, then the process fetches the next item (i) 356 (FIG. 25E) and loops back to decision 304 (FIG. 25A). If yes, then the process selects the first seller and sets s to one (1) as the current seller 312 (FIG. 25A). If not all Total Sellers are processed 314 (FIG. 25B), the process retrieves 316 (FIG. 25C) the data for Item (i), Seller (s). Floor Price is set to Floor Price+Standard Shipping+Handling Fee of Item (i), Seller (s). Reduction Rate is set to Reduction Rate of Item (i), Seller (s). MCPP is set to MCPP of Item (i), Seller (s). Threshold Qty is set to Power Deal joining Threshold Qty of Item (i), Seller (s). Standard Shipping is set to Standard Shipping of Item (i), Seller (s). Handling Fee is set to Handling Fee of Item (i), Seller (s). The process determines 318 (FIG. 25C) if Seller (s) has joined the Power Deal. If no, the process determines 320 (FIG. 25C) if Automatically Join Power Deal option was turned on for Item (i), Seller (s) and Total Qty is greater than or equal to Threshold Qty. If no, the process fetches the next seller (s) 344 (FIG. 25E) and loops back to decision 314 (FIG. 25B). If yes, the process determines 322 if MCPP is greater than or equal to Floor Price. If no, it means that there is no room for Seller (s) to go lower the Power Price, the process fetches the next seller (s) 344 (FIG. 25E) and loops back to decision 314 (FIG. 25B). If yes, the process marks Seller (s) joined Power Deal 324 (FIG. 25C) of Item (i). If yes to 318 (FIG. 25B) or 324 (FIG. 25C), the process determines 326 (FIG. 25C) if System's Current Power Price (SCPP) was manually marked by Price Down button or Join Power Deal button. If yes, new Power Price is set to SCPP—Reduction Rate 328 (FIG. 25D). If no, new Power Price is set to SCPP 330 (FIG. 25D). Both step 328 (FIG. 25D) and 330 (FIG. 25D) continue on to determine 332 (FIG. 25D) if new Power Price is greater than or equal to Floor Price.

If no, new Power Price is set to Floor Price 334 (FIG. 25D) then the process continues to step 336 (FIG. 25D). If new Power Price is greater than or equal to Floor Price, then the process updates 336 (FIG. 25D) Power Unit Price (MCPP) of Item (i), Seller (s) to be new Power Price—Standard Shipping—Handling Fee and updates Seller's Current Power Price (MCPP) of Item (i), Seller (s) to be new Power Price. The process notifies the Seller (s) of the updated Power Unit Price and MCPP based on configuration settings 338 (FIG. 25D). The process also determines 340 (FIG. 25D) if new Power Price is greater than or equal to System's Current Power Price (SCPP). If yes, then the process fetches the next seller (s) 344 (FIG. 25E) and loops back to decision 314 (FIG. 25B). If no, Temp SCPP is set to new Power Price 342 (FIG. 25E).

If all Total Sellers are processed 314 (FIG. 25B), then the process determines 346 (FIG. 25E) if temp SCPP is less than SCPP. If no, the process fetches the next item (i) 356 (FIG. 25E) and loops back to decision 304 (FIG. 25A). If yes, then the process updates SCPP of Item (i) to be temp SCPP 348 (FIG. 25E). The process notifies all sellers selling Item (i) 350 (FIG. 25E), notifies buyers joining this Power Deal based on their notification settings 352 (FIG. 25E) and notifies followers based on their notification settings 354 (FIG. 25E). The process continues to fetch the next item (i) 356 (FIG. 25E) and loops back to decision 304 (FIG. 25A).

Figure 15:
FIG. 15 illustrate a screen for submitting Power Buy with Shipping information and Billing information.
Figure 26B:
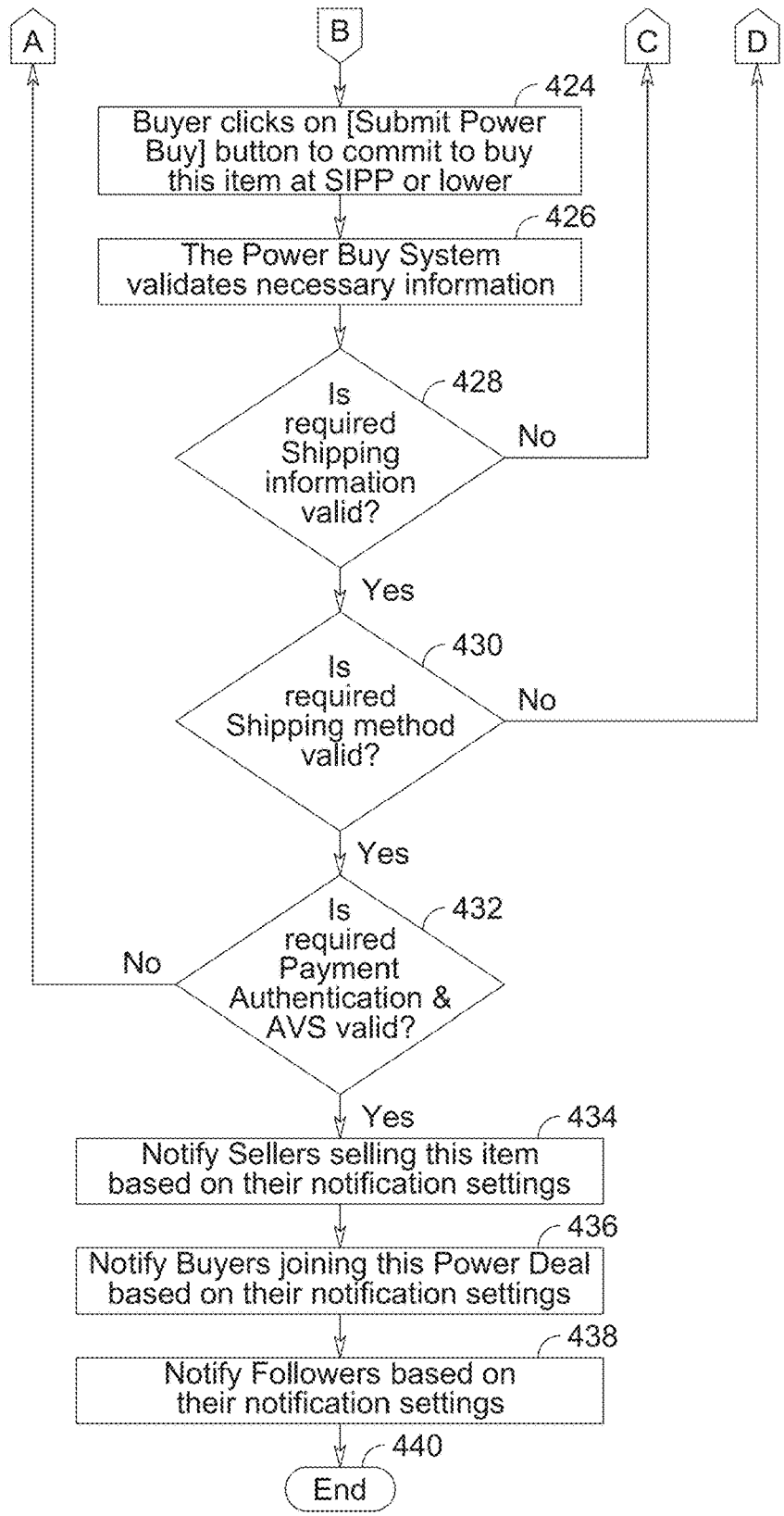

Referring now to FIGS. 14, 15, 33, 26A and 26B referenced as Power Buy process, when the buyer clicks 400 (FIG. 26A) on a Power Buy button 129 (FIG. 14) with active Power Deal or a Power Buy button 135 (FIG. 33) with new Power Deal, the process determines whether the buyer is logged into the Power Buy System 402 (FIG. 26A). If not, then the process requests the buyer to login 404 (FIG. 26A). When the buyer is logged into the system, the process shows a web page for the buyer to enter their Power Buy order information as shown in FIG. 15. The process determines 406 (FIG. 26A) if the buyer is the first initiator of this Power Deal. If so, then the Power Buy system will show screen FIG. 35 allows the buyer may initiate the Power Deal 408 (FIG. 26A) and specify 410 (FIG. 26A) the duration of the Power Deal. The buyer also enters the item quantity that the buyer wants to buy in relation to the Power Buy 412 (FIG. 26A). The buyer enters a shipping information 414 (FIG. 26A). The buyer chooses a shipping method 416 (FIG. 26A). The buyer chooses the payment method 418 (FIG. 26A). The buyer enters payment information 420 (FIG. 26A). The buyer requires to click on a check box to agree on Terms and Conditions of the Power Deal 422 (FIG. 26A). The buyer then clicks 424 (FIG. 26B) on Submit Power Buy button 145 (FIG. 15) to commit to buy this item at System's Initial Power Price (SIPP) or lower. The process validates the necessary information 426 (FIG. 26B). If the shipping information is not valid or missing 428 (FIG. 26B), then the buyer is sent back to step 414 (FIG. 26A). If the shipping method is not valid or missing 430 (FIG. 26B) then the buyer is sent back to step number 416 (FIG. 26A). If the payment method is not valid or there are issues with the payment authorization and Address Verification System (AVS) 432 (FIG. 26B), then the buyer is sent back to step 418 (FIG. 26A). If the necessary information is validated, then the process notifies sellers selling this item based on their notification settings 434 (FIG. 26B), notifies buyers joining this Power Deal based on their notification settings 436 (FIG. 26B) and notifies followers based on their notification settings 438 (FIG. 26B). The process terminates 440 (FIG. 26B).

Figure 16:
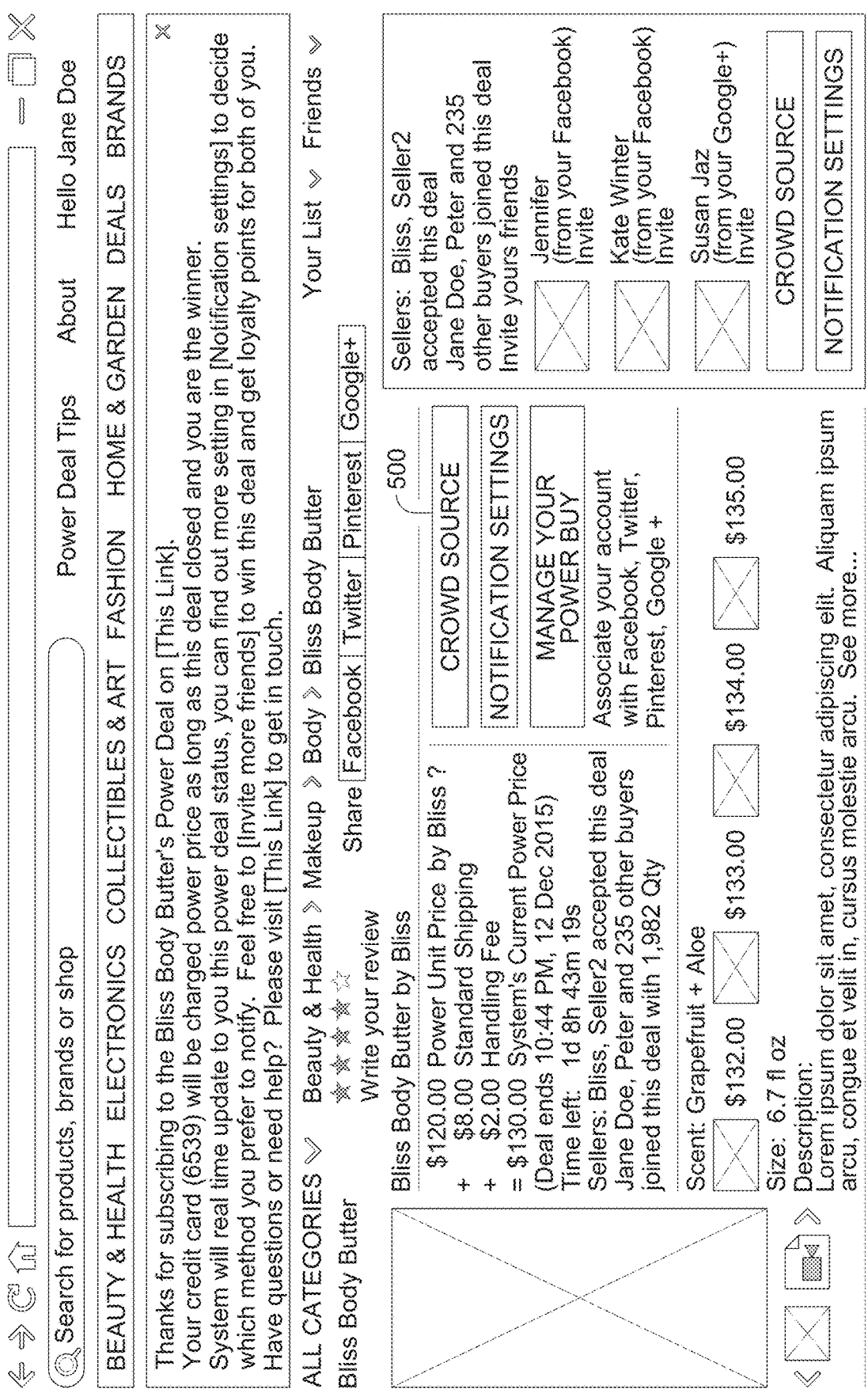
FIG. 16 illustrates a crowd source button.
Figure 17:
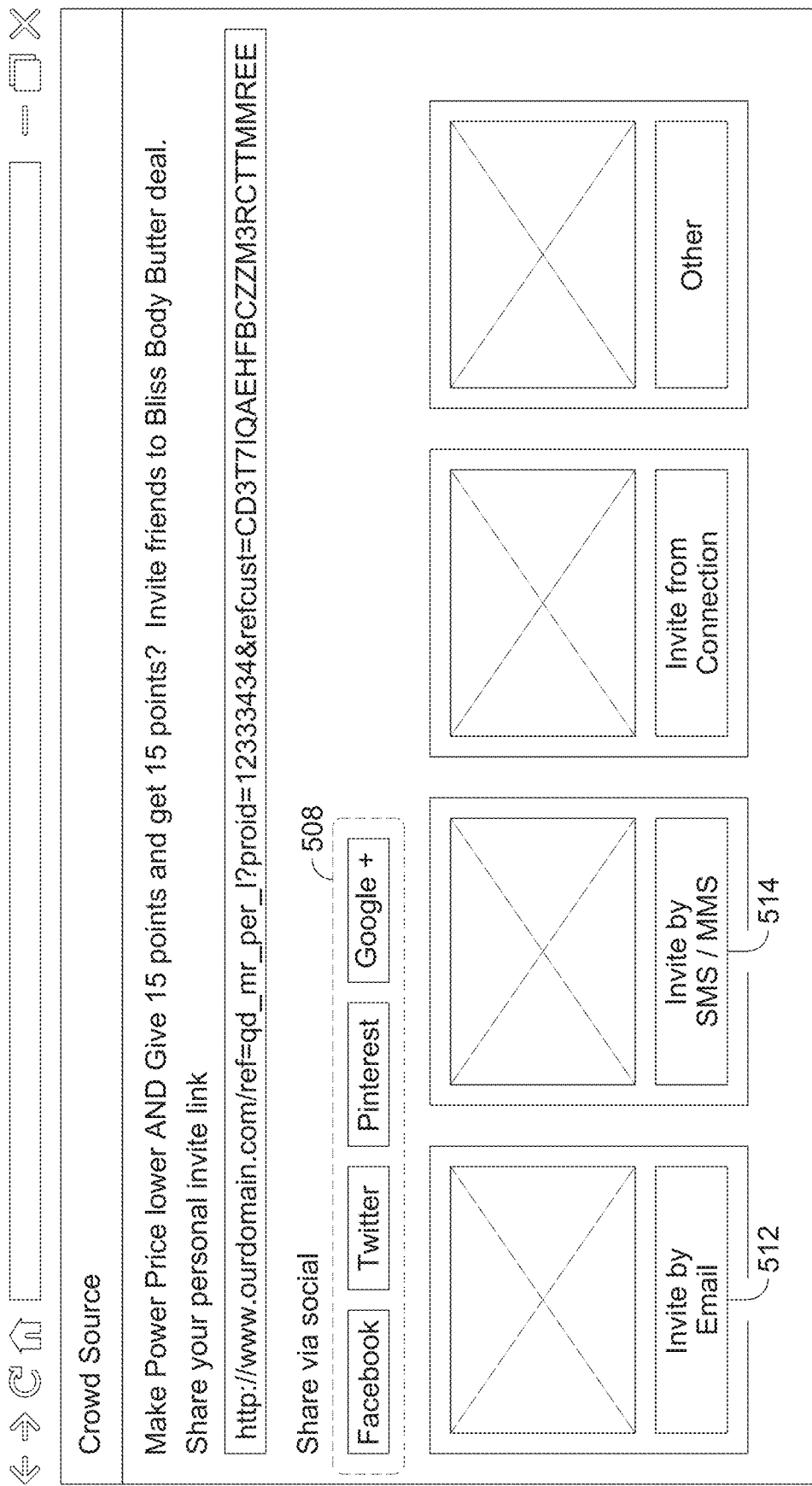
FIG. 17 illustrates a screen for crowd sourcing via social media.
Figure 19:
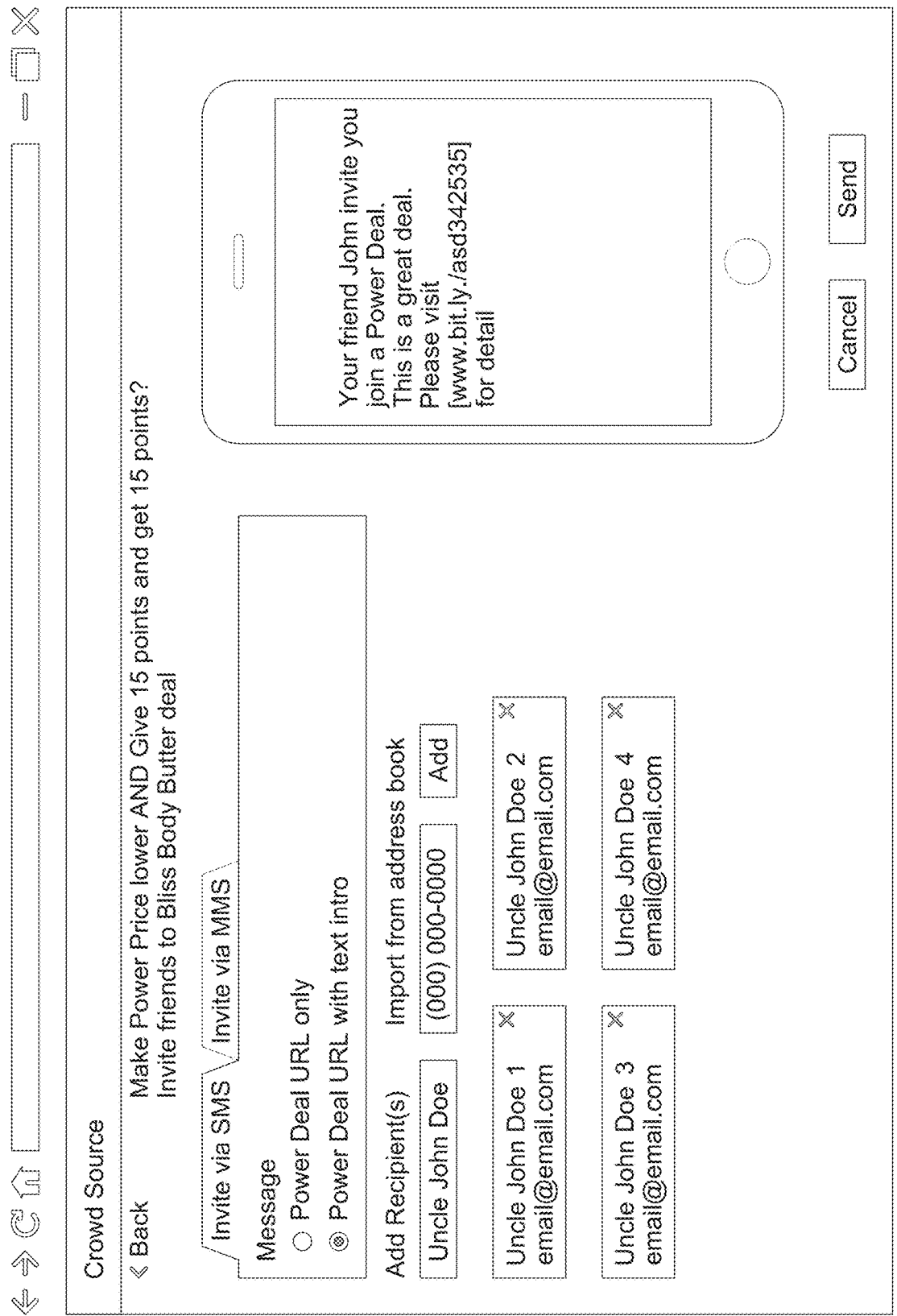
FIG. 19 illustrates a screen for crowd sourcing via text messaging.
Figure 27A:
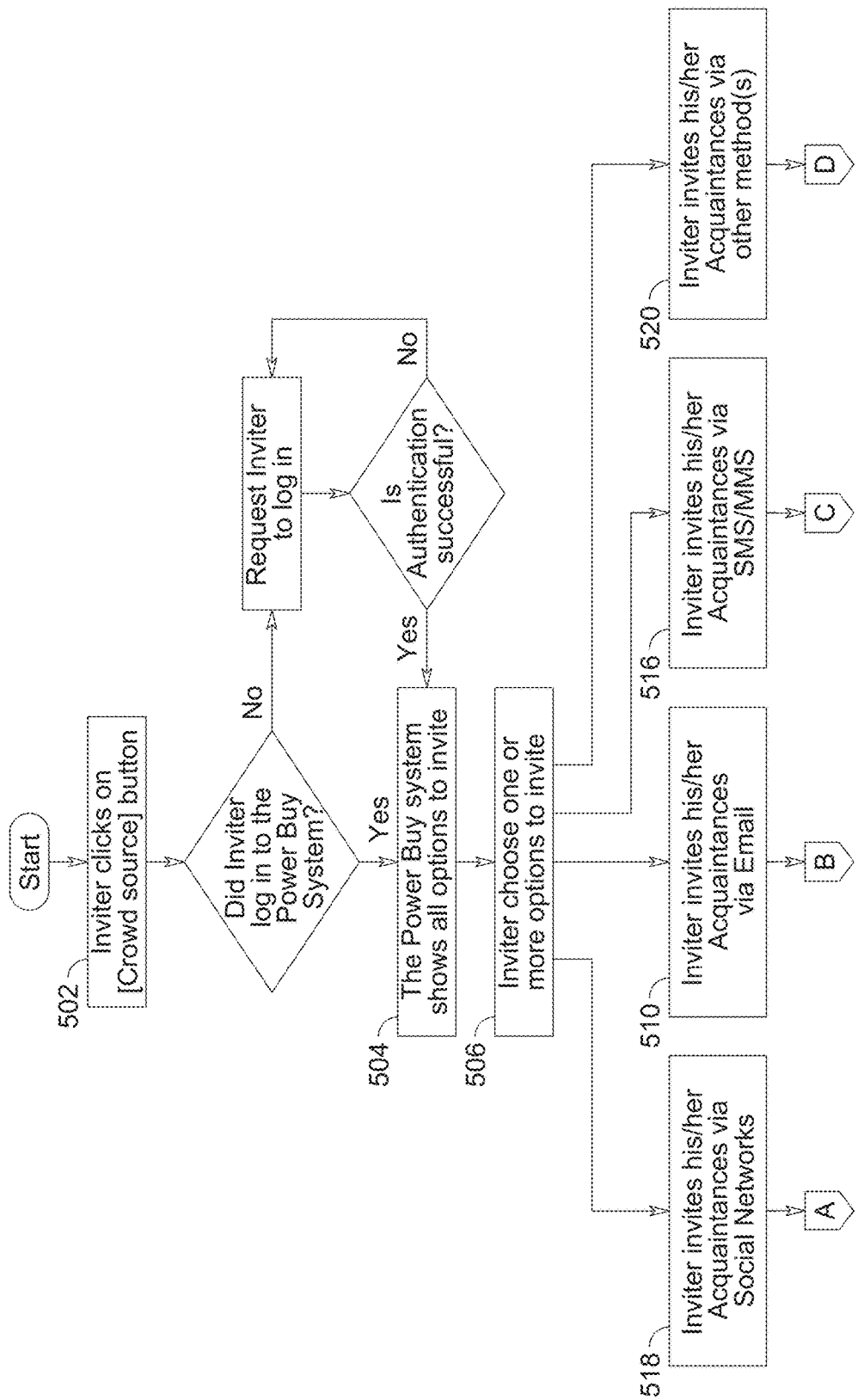
FIGS. 27A-B illustrate a crowd source process when the crowd source button shown in FIG. 16 is depressed.
Figure 27B:
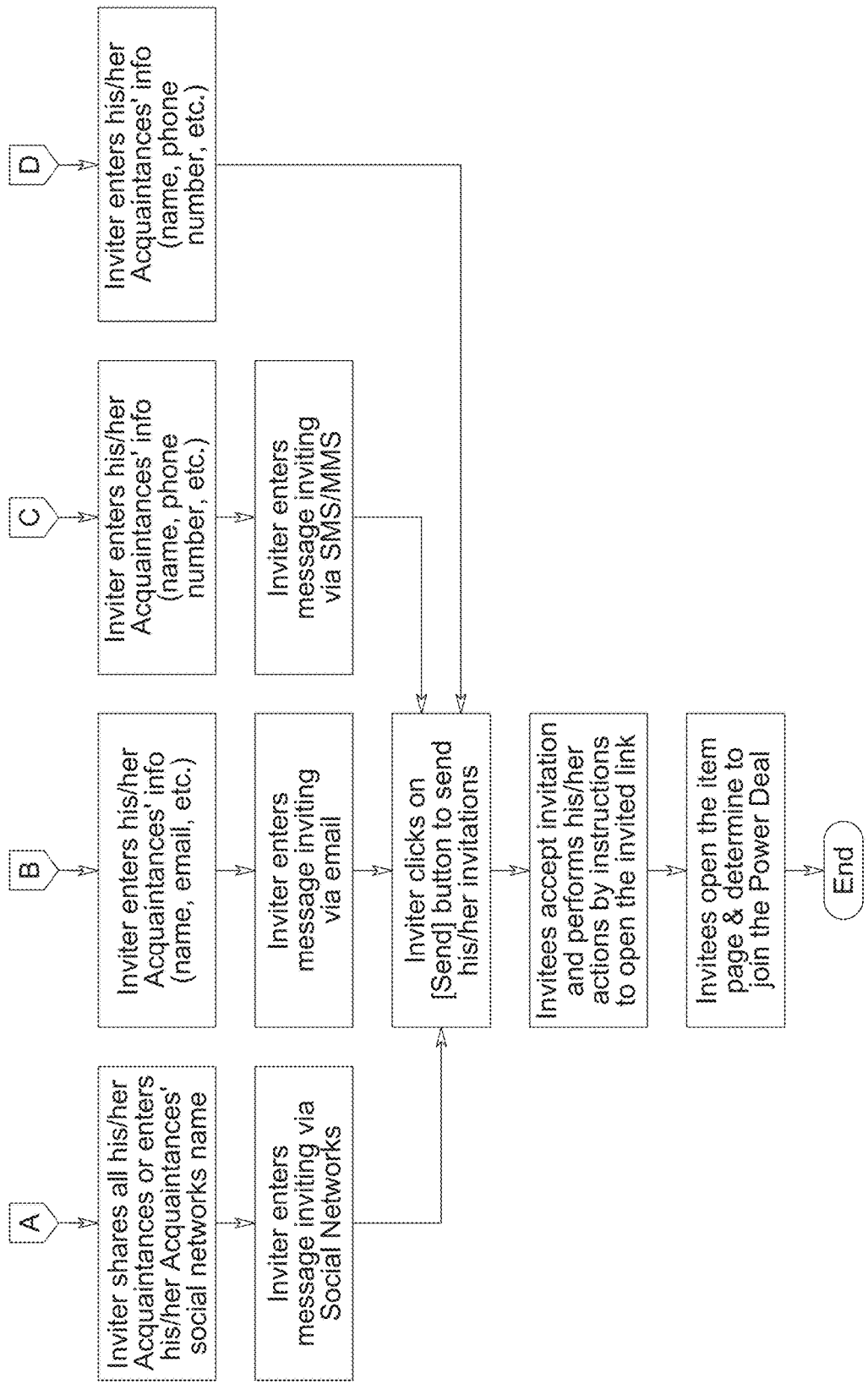

Referring now to FIGS. 16, 27A-B referenced as Crowd Source process, the inviter who initiates the Power Deal or who joins the Power Deal is presented with the webpage shown in FIG. 16. Inviter may be buyer, seller, follower or any user of Power Buy System. On this webpage, inviter can click on the Crowd Source button 500 (FIG. 16) which initiates the steps shown in FIG. 27A. When the inviter, who initiates the Power Deal or has joined the Power Deal, clicks 502 (FIG. 27A) on the Crowd Source button 500 (FIG. 16), the process determines if the inviter is logged into the Power Buy System. Once the inviter is logged into the system, the inviter is shown or presented with a number of options in order to communicate the Power Deal listing with or to the social media contacts or personal contacts of the inviter 504 (FIG. 27A) as shown in FIG. 17. The inviter chooses one or more options to invite his or her contacts to view the Power Deal listing 506 (FIG. 27A). The inviter can choose to share the Power Buy listing via social media 508 (FIG. 17). After clicking one of the icons 508, the inviter shares all his/her acquaintances or enters his/her acquaintances' social networks name with an inviting message via social networks 518 (FIG. 27A). If the inviter invites acquaintances via e-mail 510 (FIG. 27A) by clicking Invite by email button 512 (FIG. 17), the inviter is presented with the webpage shown in FIG. 18 and fills out the information presented to send a personal message. The inviter can also send or share the Power Deal listing by way of SMS or MMS 516 (FIG. 27A) by clicking on Invite by SMS/MMS button 514 (FIG. 17) and the inviter will be presented with the webpage shown in FIG. 19. The inviter can also send or share the Power Deal listing by way of other methods 520 (FIG. 27A). Based on some criteria but not limited to user's purchasing history, user's Power Deal joining history, user's viewing history, user's following history and user's preference, the process analyzes and provides suggestions to make friend, to join Power Deal together among users within the Power Buy System.

Figure 28:
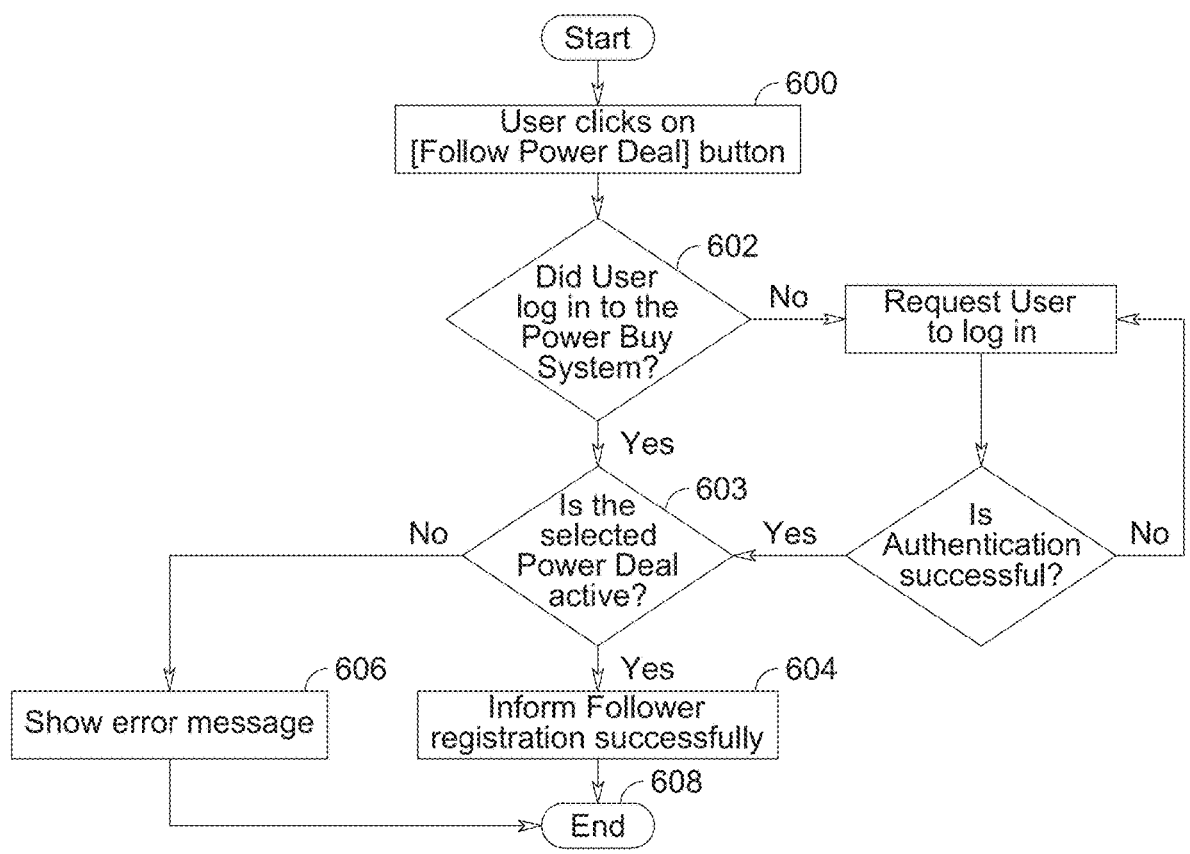
FIG. 28 illustrates a Follow Power Deal process when the Follow Power Deal button shown in FIG. 14 is depressed.

Referring now to FIGS. 14 and 28 referenced as Follow Power Deal process, the user can click 600 (FIG. 28) on the Follow Power Deal button 131 (FIG. 14) indicated as follow Power Deal. In this instance, the process checks whether the user is logged into the Power Buy System 602 (FIG. 28) and if not, then the process directs the user to log into the system. Upon clicking the Follow Power Deal button 131 (FIG. 14), the process determines if the selected Power Deal is active 603 (FIG. 28). If yes, then the process completes step Inform Follower registration successfully 604 (FIG. 28). If no, then the process shows an error message 606 (FIG. 28). The process terminates 608 (FIG. 28).

Figure 29:
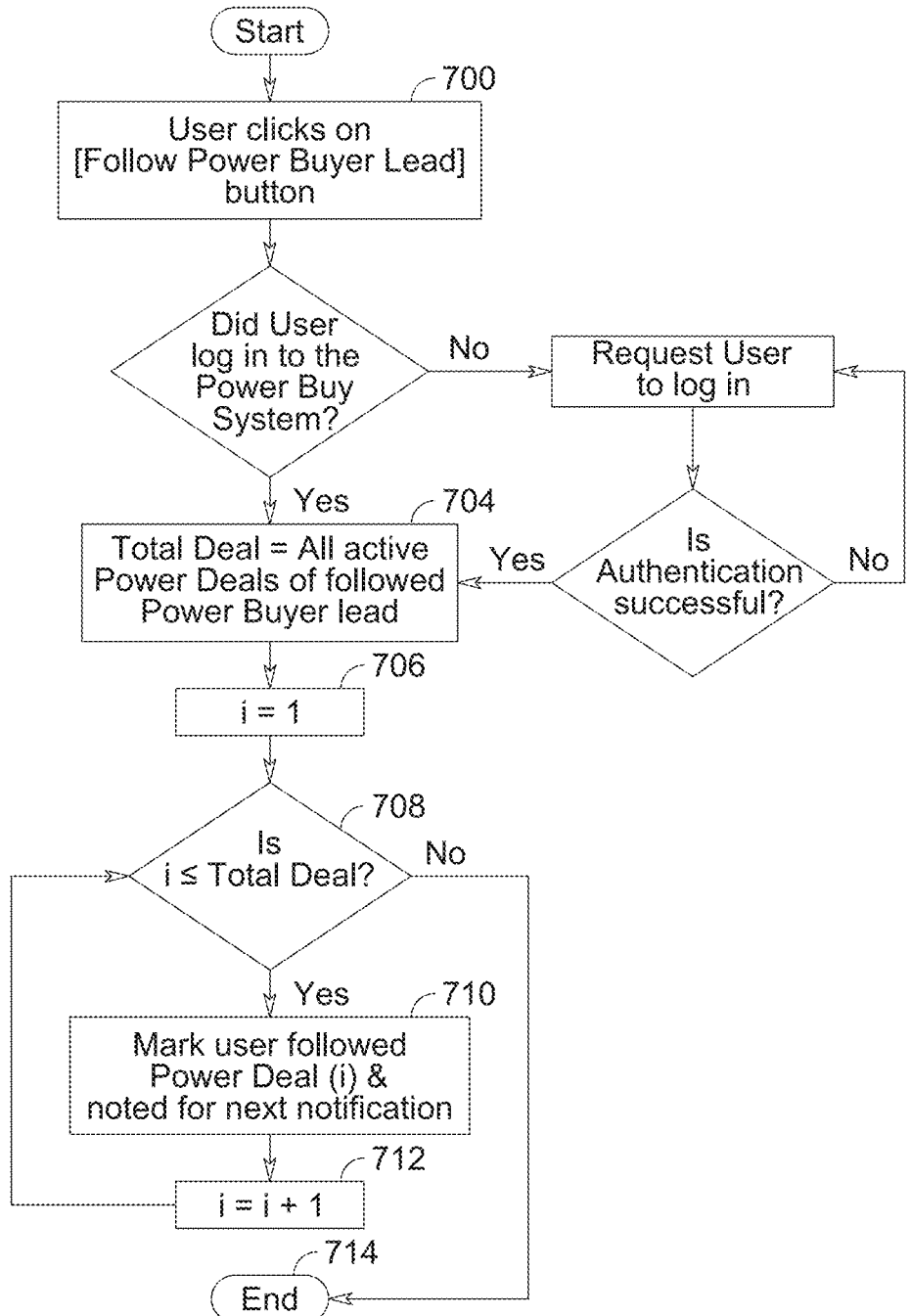
FIG. 29 illustrates a Follow Power Buy Lead process when the Follow Power Buy Lead button (i.e., link) is depressed.
Figure 30A:
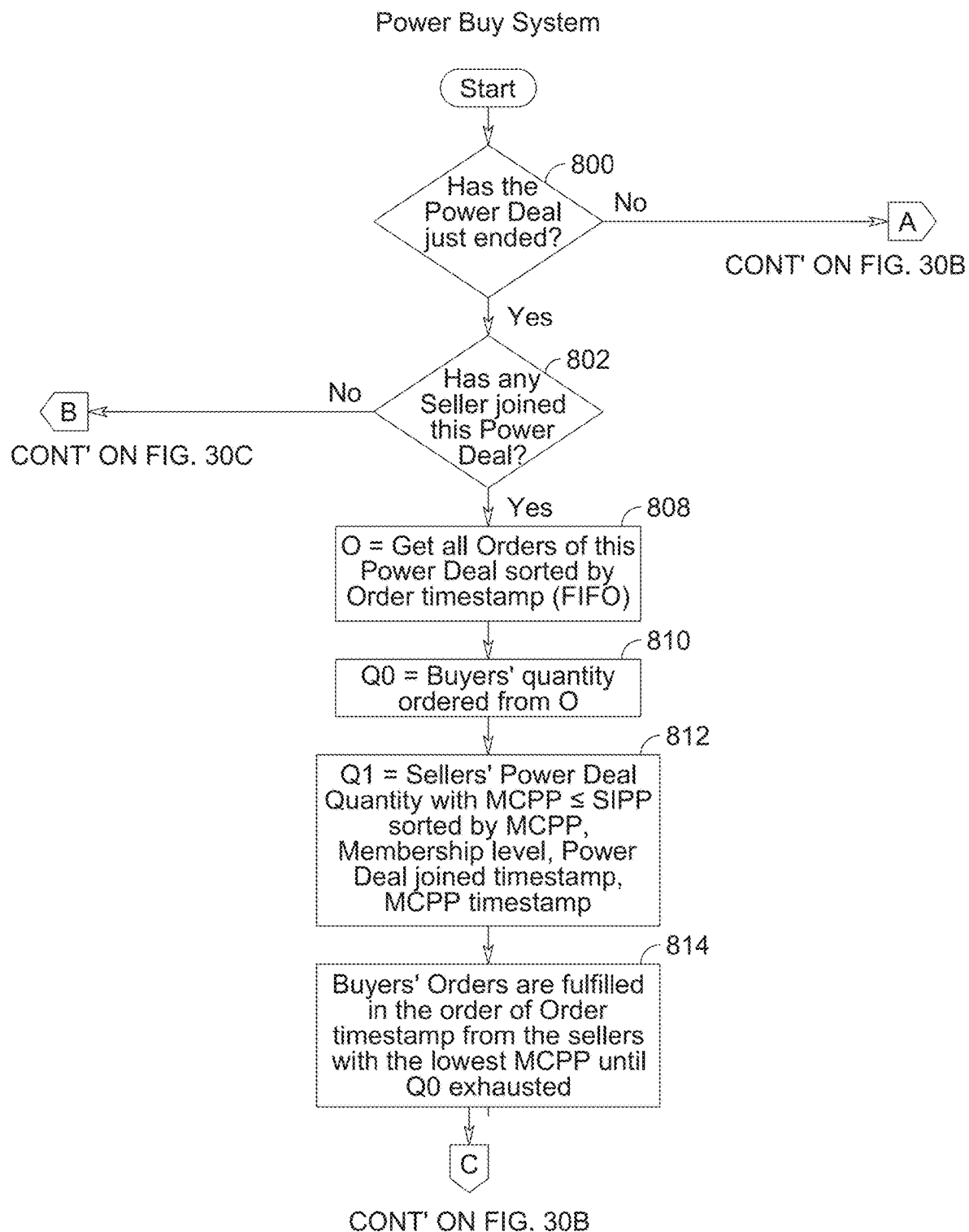
FIGS. 30A-D illustrate a process of determining winning buyers and winning sellers.

Referring now to FIGS. 12A and 29 referenced as Follow Power Buy Lead process, the user can click 700 (FIG. 29) on a follow Power Buyer Lead 702 (FIG. 12B). The process then determines whether the user is logged into the Power Buy System. If not, the process guides the user through the login process. Upon login, the process browses 704 (FIG. 29) all active Power Deals of the followed Power Buyer Lead referenced as Total Deal. The process selects the first Power Deal and sets i to one (1) as the current Power Deal 706 (FIG. 29). The process determines if not all Total Deal are processed 708 (FIG. 29). If no, then the process terminates 714 (FIG. 29). If yes, then the process marks user followed Power Deal (i) and noted for next notification 710 (FIG. 29). The process fetches the next Power Deal (i) 712 (FIG. 29) and loops back to decision 708 (FIG. 29).

Figure 30B:
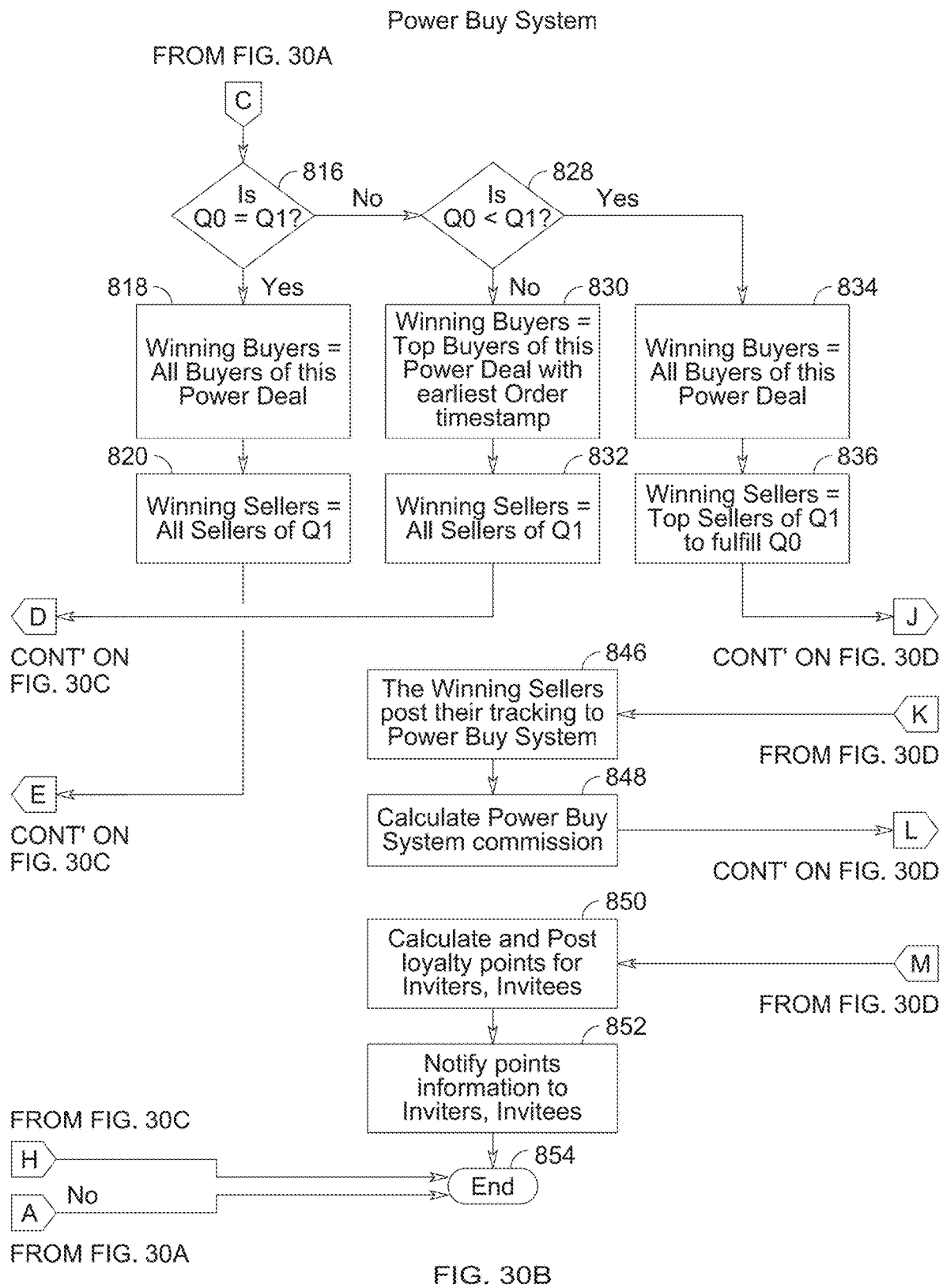
Figure 30C:
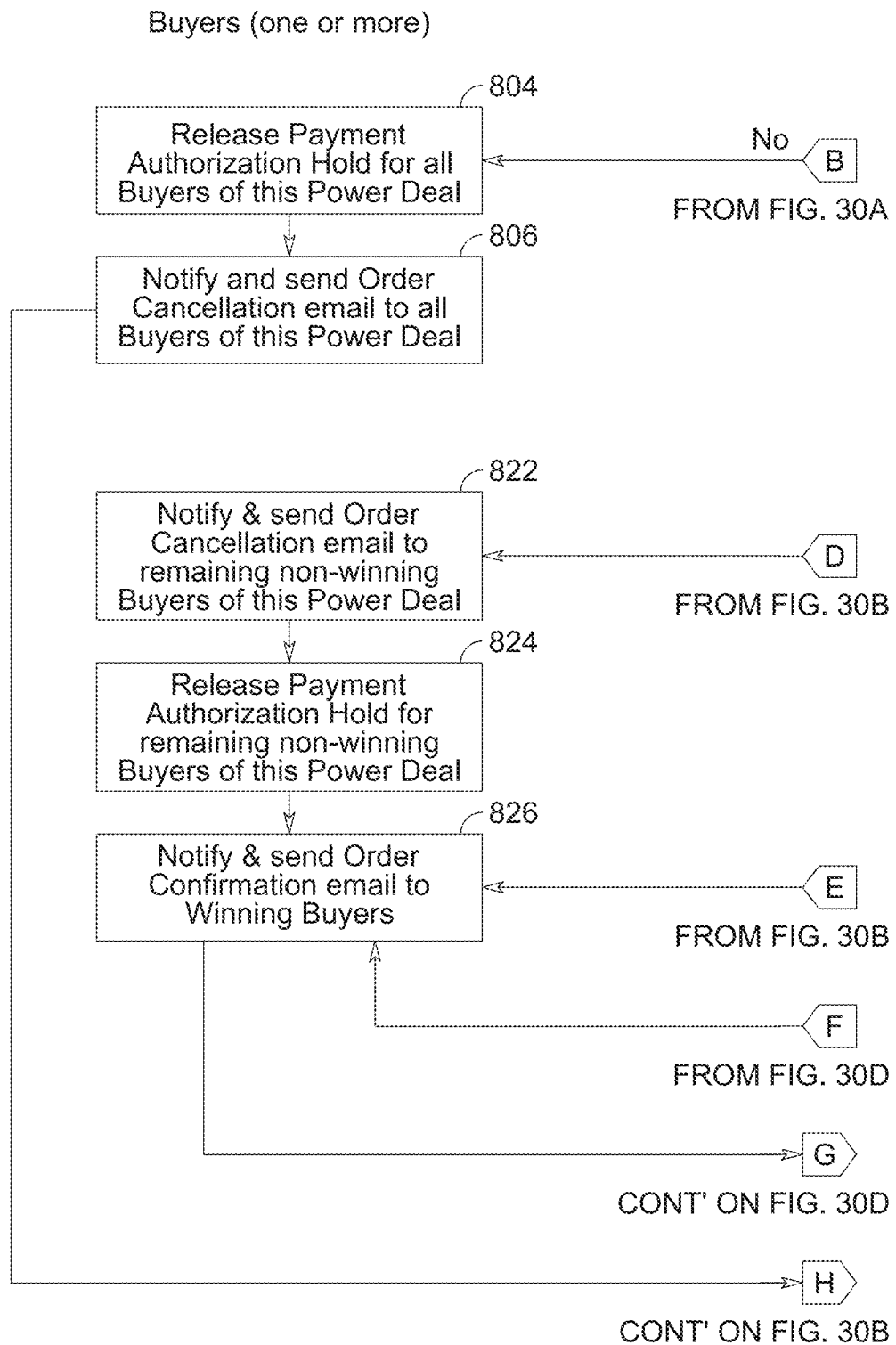

Referring now to FIGS. 30A-D, a flowchart depicting the process (i.e. a computer automation job) of determining of the Winning Sellers, non-winning Sellers, Winning Buyers and non-winning Buyers of the ending Power Deal. All Power Deals in the Power Buy system will be processed using this flow. The process determines if the Power Deal has ended 800 (FIG. 30A). If no, the process terminates 854 (FIG. 30B). If yes, the process determines if any seller has joined the Power Deal 802 (FIG. 30A). If no seller has joined the Power Deal, then the process issues a release of payment authorization hold 804 (FIG. 30C) for all joined Buyers of this Power Deal, notifies and sends order cancellation email to all joined buyers of this Power Deal 806 (FIG. 30C). The process terminates 854 (FIG. 30B). If sellers have joined the Power Deal, the process retrieves all submitted orders of this ended Power Deal sorted by order timestamp (First in First Out) referenced as O 808 (FIG. 30A). Q0 is set to be Buyers' quantity ordered 810 (FIG. 30A) from O in step 808 (FIG. 30A). Q1 is set to be Sellers' Power Deal Quantity with Seller's Current Power Price (MCPP) less than or equal to System's Initial Power Price (SIPP) sorted by MCPP (lowest Power Price first), membership level (paid subscription first), Power Deal joined timestamp (earliest joined timestamp first), MCPP timestamp (earliest Price Down timestamp first) 812 (FIG. 30A). Buyers' orders are fulfilled in the order of order timestamp (oldest orders fulfilled first) from the sellers with the Power Price between SCPP and SIPP (lowest Power Price sellers fulfilled first) until Q0 exhausted 814 (FIG. 30A). Based on this logic, a buyer's order with quantity greater than one may be fulfilled by one or more sellers with various MCPP. On the other hand, a seller can fulfill one or more buyer's order with the same MCPP.

Figure 30D:
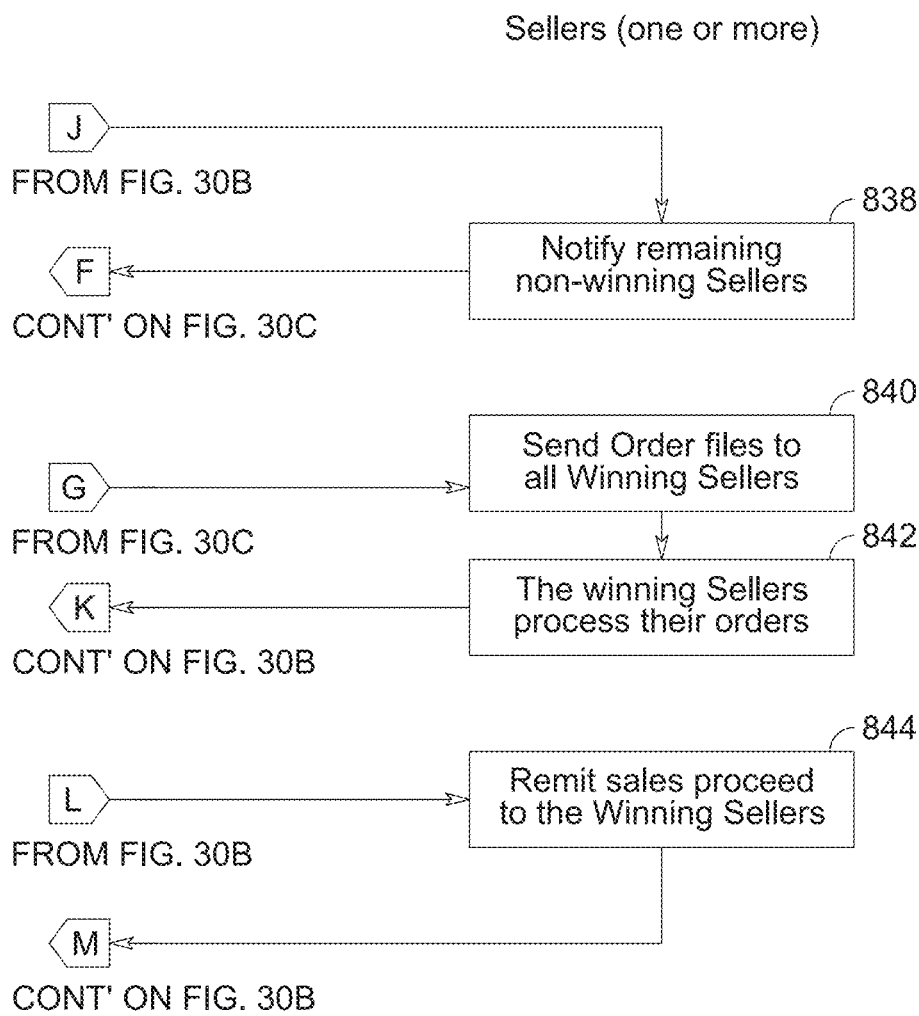

The process determines if Q0 is equal to Q1 816 (FIG. 30B). If so, it means Sellers met exactly Buyers' Quantity Demanded of this Power Deal. All Buyers of this Power Deal are winning Buyers 818 (FIG. 30B). All Sellers of Q1 are winning Sellers 820 (FIG. 30B). The process notifies and sends order confirmation email to winning Buyers 826 (FIG. 30C). The process sends order files of winning Buyers to winning Sellers 840 (FIG. 30D). The winning Sellers process their orders 842 (FIG. 30D). The winning Sellers post their shipment tracking to Power Buy System 846 (FIG. 30B). The process calculates Power Buy System Commission 848 (FIG. 30B). The process remits sales proceed minus commission to the winning Sellers 844 (FIG. 30D). The process calculates and posts loyalty points to the inviters and invitees 850. The process notifies point information to the inviters and invitees 852 (FIG. 30B). The process terminates 854 (FIG. 30B).

The process determines if Q0 is less than Q1 828 (FIG. 30B). If so, it means Sellers exceeded Buyers' Quantity Demanded of this Power Deal. All Buyers of this Power Deal are winning Buyers 834 (FIG. 30B). Top Sellers of Q1 (lowest MCPP first) fulfilled enough Q0 are winning Sellers 836 (FIG. 30B). The process notifies the remaining non-winning Sellers 838 (FIG. 30D). The process notifies and sends order confirmation email to winning Buyers 826 (FIG. 30C). The process sends order files of winning Buyers to winning Sellers 840 (FIG. 30D). The winning Sellers process their orders 842 (FIG. 30D). The winning Sellers post their shipment tracking to Power Buy System 846 (FIG. 30B). The process calculates Power Buy System Commission 848 (FIG. 30B). The process remits sales proceed minus commission to the winning Sellers 844 (FIG. 30D). The process calculates and posts loyalty points to the inviters and invitees 850 (FIG. 30B). The process notifies point information to the inviters and invitees 852 (FIG. 30B). The process terminates 854 (FIG. 30B).

If Q0 is greater than Q1, it means Sellers did not meet Buyers' Quantity Demanded of this Power Deal. Top Buyers with the earliest order timestamp of this Power Deal satisfied Q1 are winning Buyers 830 (FIG. 30B). All Sellers of Q1 are winning Sellers 832 (FIG. 30B). The process notifies and sends order cancellation email to the remaining non-winning Buyers of this Power Deal 822 (FIG. 30C). The process issues a release of payment authorization hold for the remaining non-winning Buyers of this Power Deal 824 (FIG. 30C). The process notifies and sends order confirmation email to winning Buyers 826 (FIG. 30C). The process sends order files of winning Buyers to winning Sellers 840 (FIG. 30D). The winning Sellers process their orders 842 (FIG. 30D). The winning Sellers post their shipment tracking to Power Buy System 846 (FIG. 30B). The process calculates Power Buy System Commission 848 (FIG. 30B). The process remits sales proceed minus commission to the winning Sellers 844 (FIG. 30D). The process calculates and posts loyalty points to the inviters and invitees 850 (FIG. 30B). The process notifies point information to the inviters and invitees 852 (FIG. 30B). The process terminates 854 (FIG. 30B).

Figure 31A:
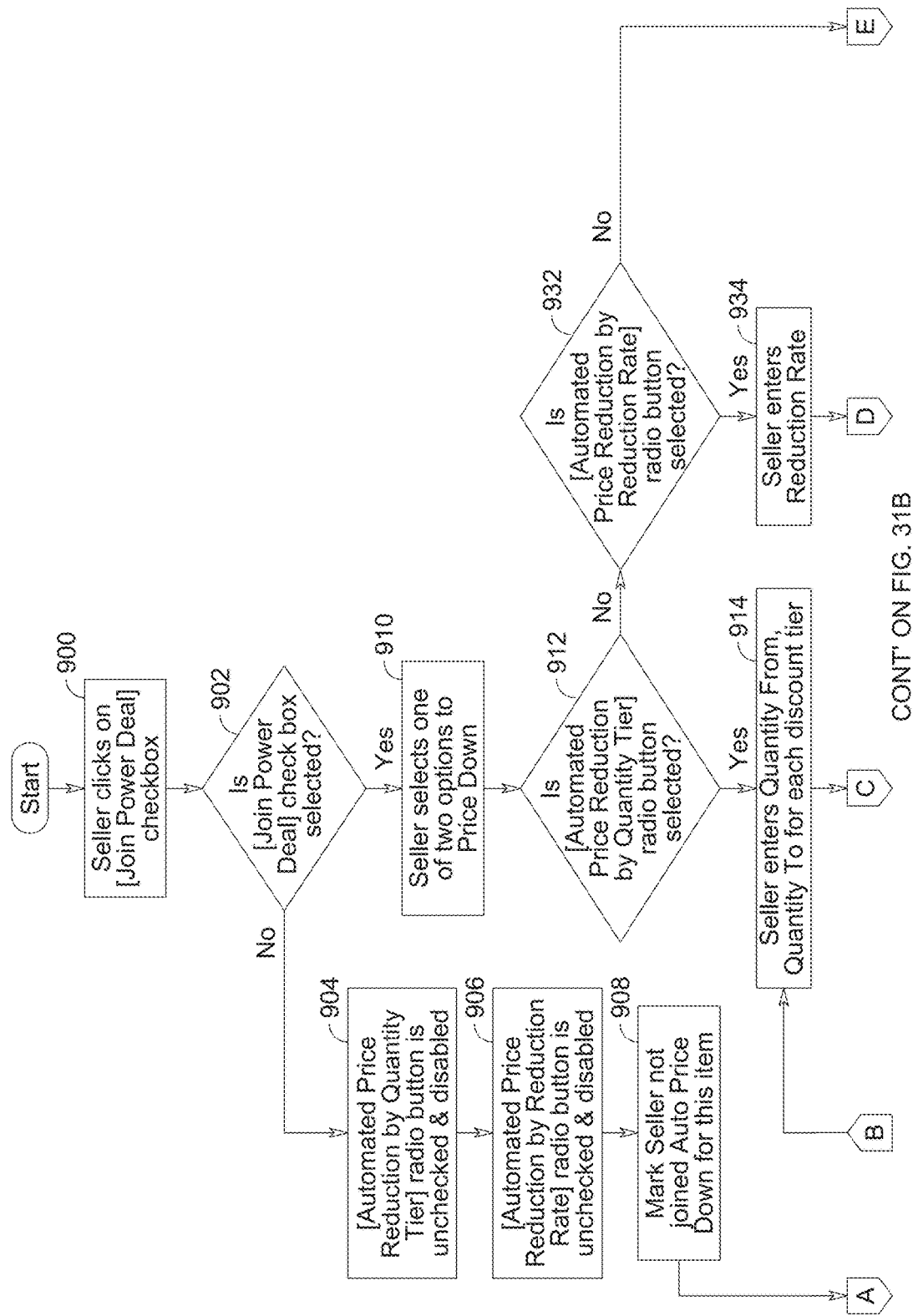
FIGS. 31A-B illustrate an Auto Price Down process.
Figure 31B:
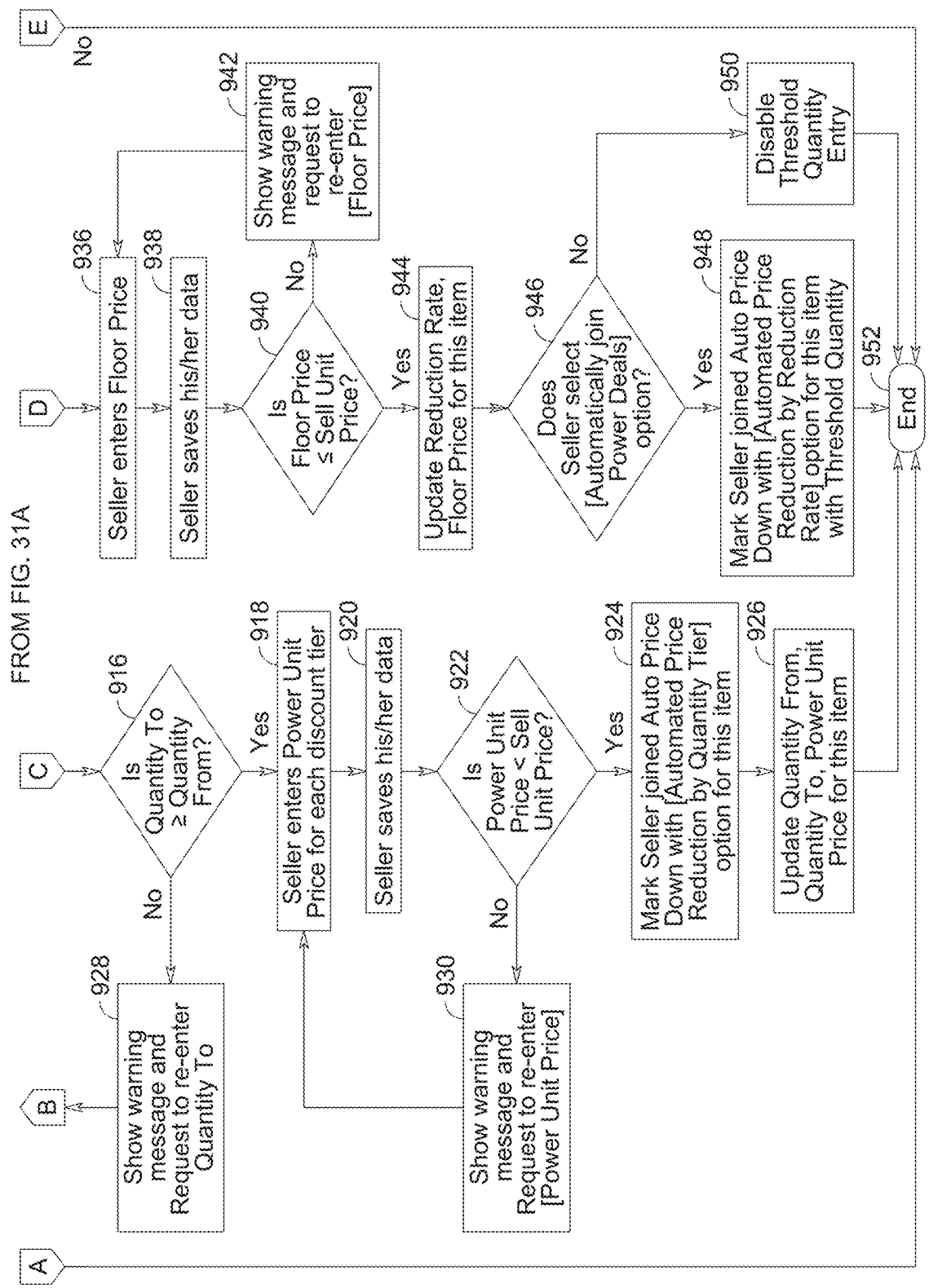

Referring now to FIGS. 11, 31A, B referenced as Auto Price Down process, when the seller checks the Join Power Deal checkbox 81 shown in FIG. 11 to join Power Deal 900 shown in FIG. 31A, the process then determines if the Join Power Deal checkbox 81 (FIG. 11) is checked 902 (FIG. 31A). If no, then the Automated Price Reduction by Quantity Tier radio button 83 is unselected and disabled 904 (FIG. 31A). Also, the Automated Price Reduction by Reduction Rate radio button is unselected and disabled 906 (FIG. 31A). The process also marks the seller not joined auto Price Down for this item 908 (FIG. 31A). The process terminates 952 (FIG. 31B).

If the Join Power Deal checkbox 81 (FIG. 11) is checked, then the seller may choose one of two options to Price Down this Power Deal 910 (FIG. 31A). The two options are Automated Price Reduction by Quantity Tier or Automated Price Reduction by Reduction Rate. If the Automated Price Reduction by Quantity Tier radio button 83 (FIG. 11) is selected 912 (FIG. 31A), then the seller enters Quantity From, Quantity To for each discount tier 914 (FIG. 31A). The process then determines if Quantity To is greater than or equal to Quantity From 916 (FIG. 31B). If yes, then the seller enters Power Unit Price for each discount tier 918 (FIG. 31B) and saves his/her data 920 (FIG. 31B). The process then determines if the Power Unit Price is less than the Sell Unit Price 922 (FIG. 31B). If no, then the process marks the seller joined Auto Price Down by Quantity Tier for this item 924 (FIG. 31B). The process updates Quantity From, Quantity To and Power Unit Price for this item 926 (FIG. 31B). The process terminates 952 (FIG. 31B).

Back at decision 916 (FIG. 31B), if the Quantity To is not greater than or equal to Quantity From, then the process shows 928 (FIG. 31B) a warning message, requests the seller to re-enter Quantity To and loops back to step 914 (FIG. 31A). Back at decision 922, if the Power Unit Price is not less than Sell Unit Price, then the process shows 930 (FIG. 31B) a warning message, requests the seller to re-enter Power Unit Price and loops back to step 918 (FIG. 31B).

Back at decision 912 (FIG. 31A), if the Automated Price Reduction by Quantity Tier radio button is not selected but the Automated Price Reduction by Reduction Rate radio button 85 (FIG. 11) is selected 932 (FIG. 31A), then the seller enters Reduction Rate 934 (FIG. 31A), enters Floor Price 936 (FIG. 31B) and saves his/her data 938 (FIG. 31A). The process then determines if the Floor Price is less than or equal to Sell Unit Price 940 (FIG. 31B). If yes, then the process updates Reduction Rate and Floor Price for this item 944 (FIG. 31B). The process then determines if the seller selects automatically join Power Deals option 946 (FIG. 31B). If yes, then the process marks the seller joined Auto Price Down by Reduction Rate with threshold quantity for this item 948 (FIG. 31B). The process terminates 952 (FIG. 31B).

Back at decision 932 (FIG. 31A), if the Automated Price Reduction by Reduction Rate radio button 85 (FIG. 11) is not selected, the process terminates 952 (FIG. 31B). Back at decision 940 (FIG. 31B), if the Floor Price is not less than or equal to Sell Unit Price, then the process shows 942 (FIG. 31B) a warning message, requests the seller to re-enter Floor Price and loops back to step 936 (FIG. 31A). Back at decision 946 (FIG. 31B), if the seller does not select automatically join Power Deals option, the process disable 950 (FIG. 31B) the threshold quantity entry 78 (FIG. 11). The process terminates 952 (FIG. 31B).

Figure 32A:
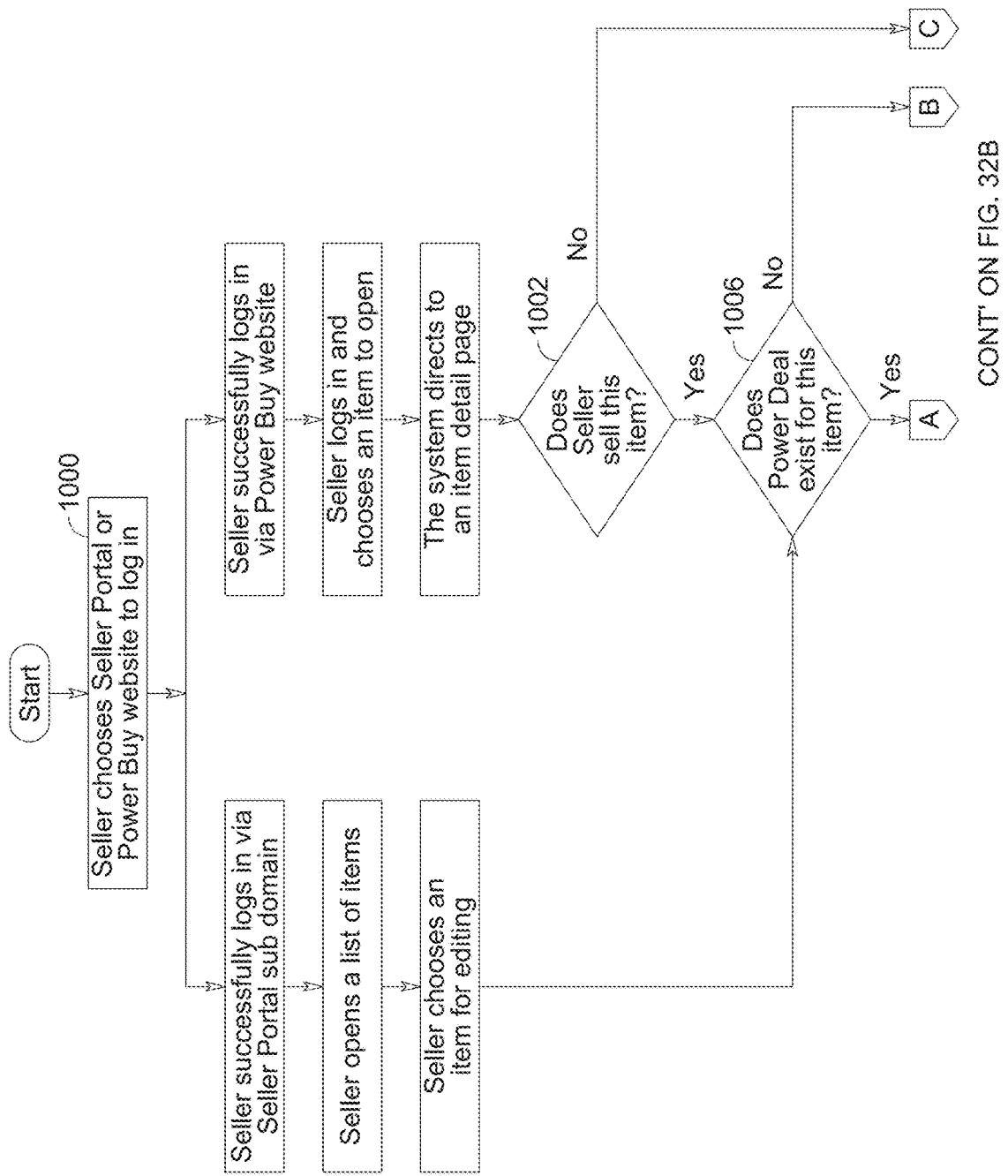
FIGS. 32A-C illustrate a Join Power Deal process.
Figure 32B:
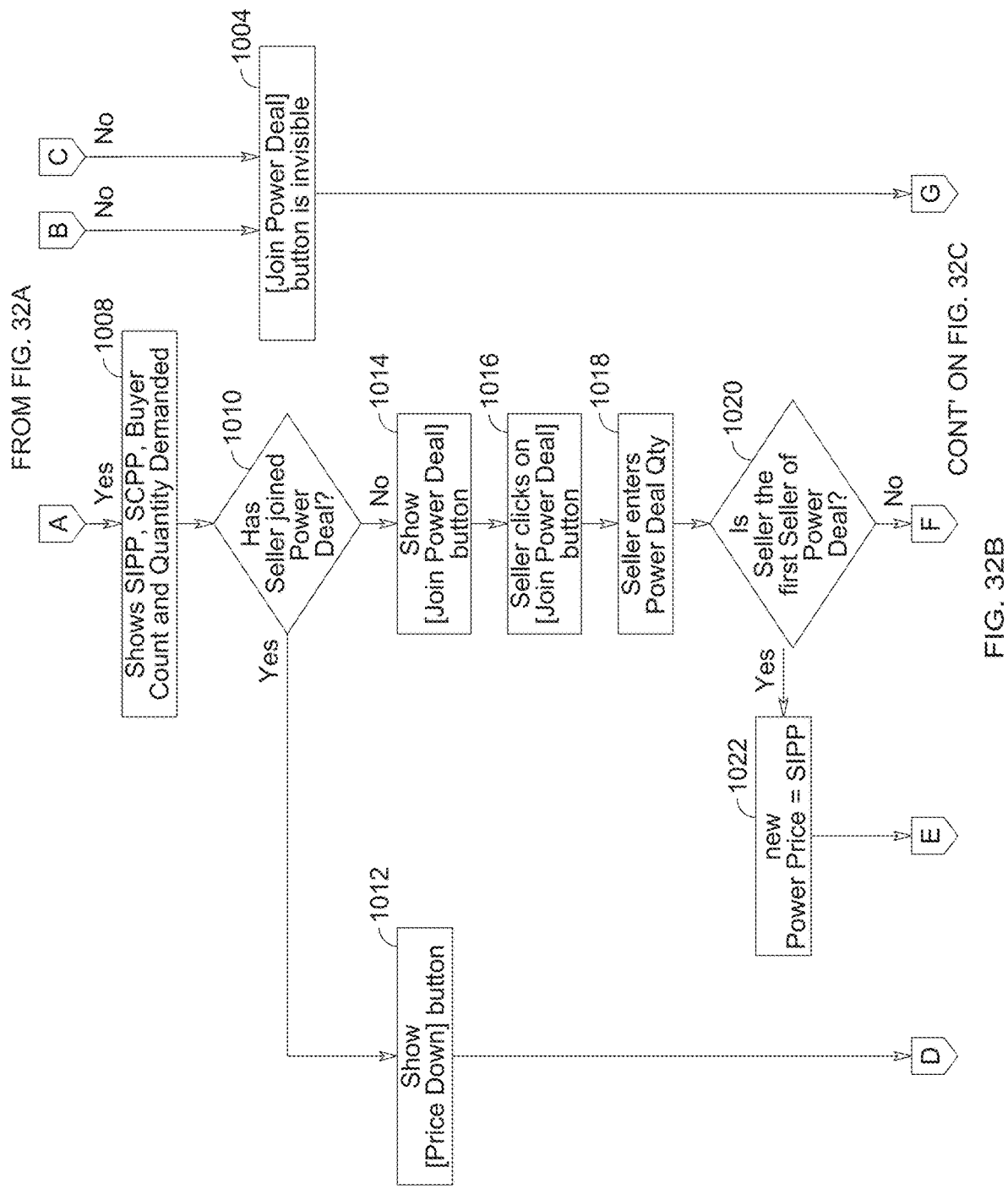
Figure 32C:
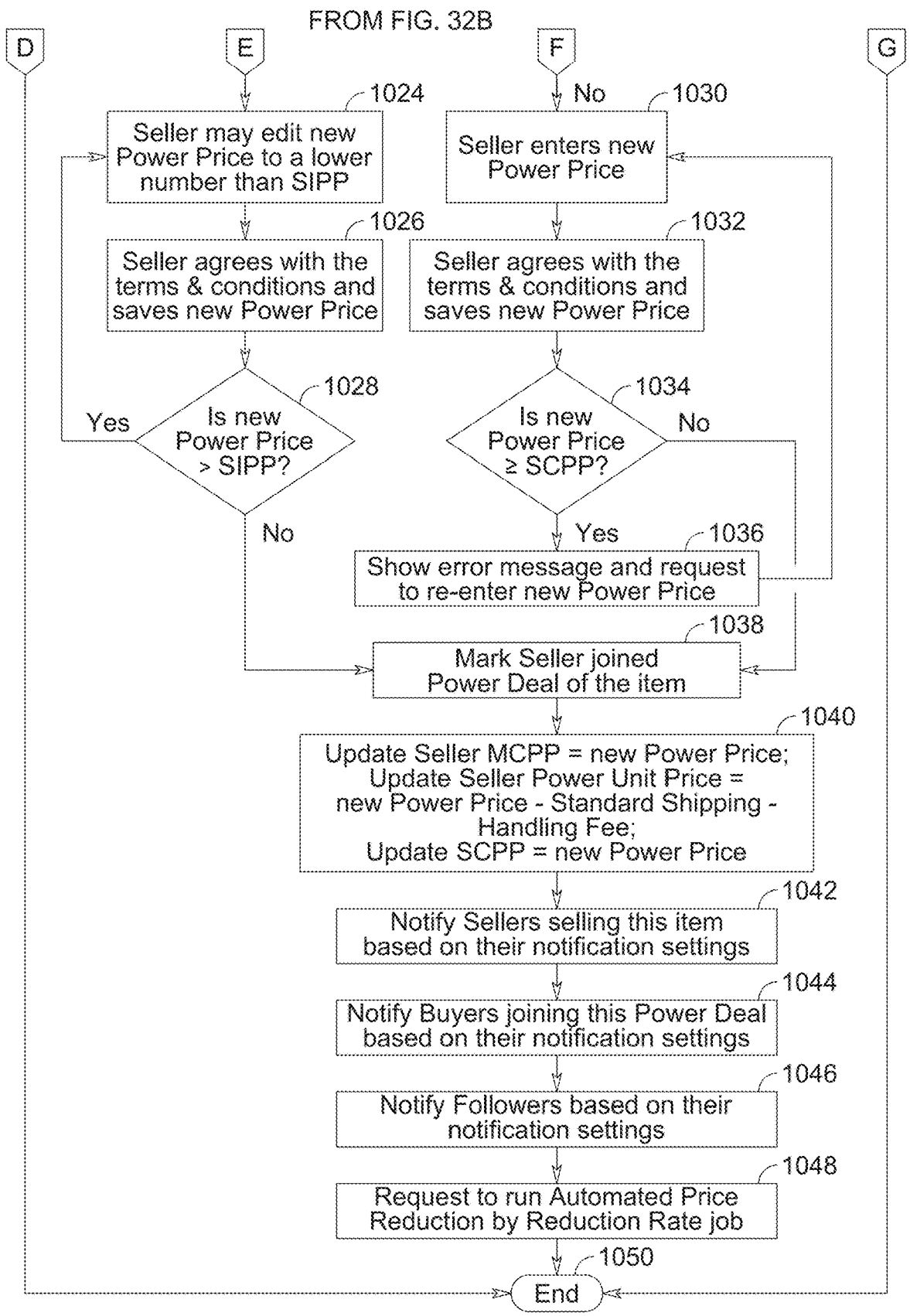
Figure 34:
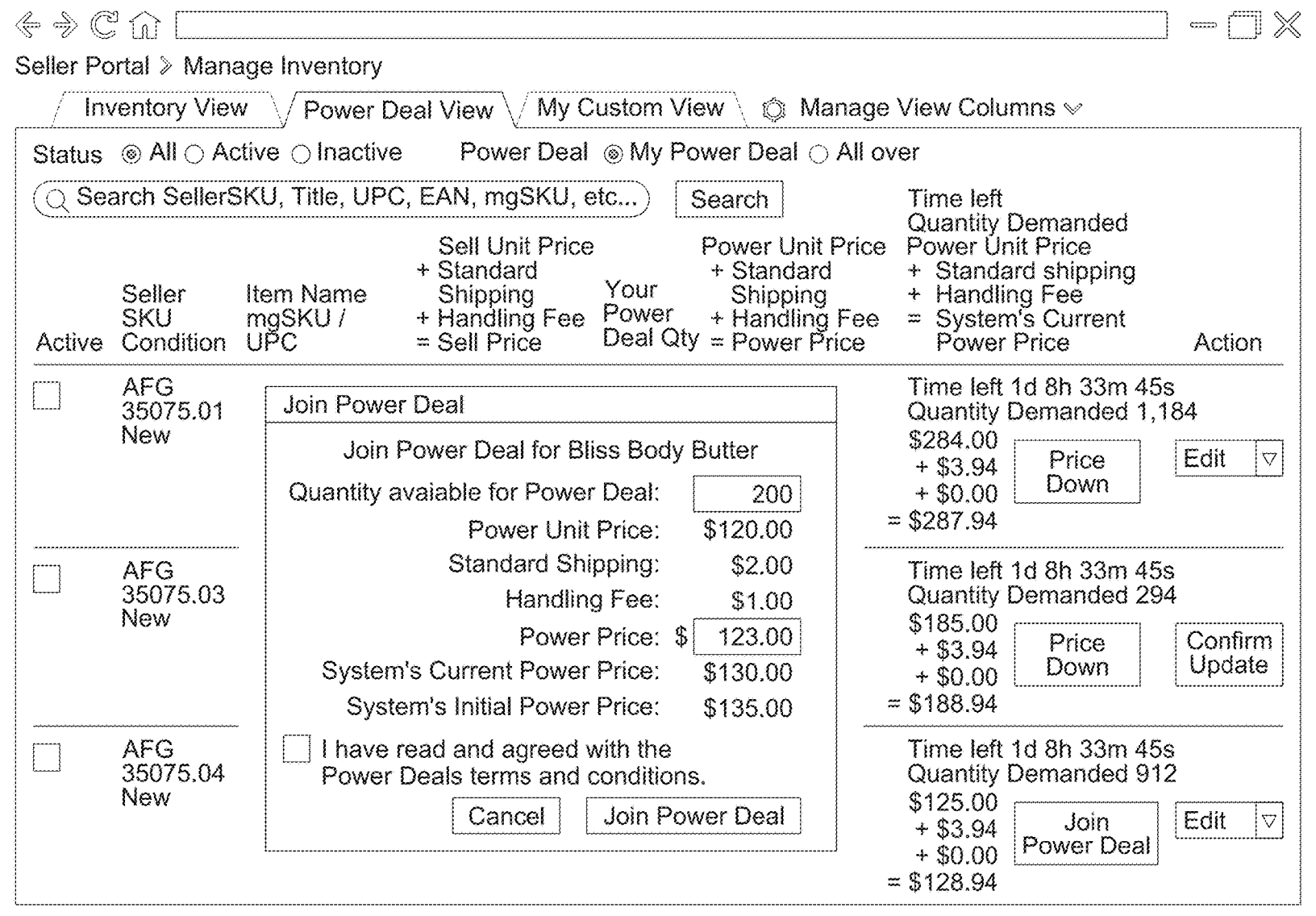

Referring now to FIG. 3, 14, 32A-C and 34 referenced as Join Power Deal process, the seller may chooses the Seller Portal or Power Buy website to login 1000 (FIG. 32A). If the seller is logged into the Power Buy website, the seller may view an item. The process determines if the seller sells this item 1002 (FIG. 32A). If yes, (whether viewing from Seller Portal or Power Buy website), the process determines if Power Deal exists for this item 1006 (FIG. 32A). If the item does have the Power Deal activated, then the process shows Systems' Initial Power Price (SIPP) 43 (FIG. 14), System's Current Power Price (SCPP) 45 (FIG. 14), count of joining buyers and Quantity Demanded 42 (FIG. 3) 1008 (FIG. 32B). If the seller does not sell this item 1002 (FIG. 32A) or the Power Deal does not exist for this item 1006 (FIG. 32A), then the process hides the Join Power Deal button 1004 (FIG. 32B). The process terminates 1050 (FIG. 32C). The process then determines if the seller has joined the Power Deal 1010 (FIG. 32B). If no, then the process shows the Join Power Deal button 1014 (FIG. 32B). As the seller clicks on the Join Power Deal button 1016 (FIG. 32B), the process shows a web page for the seller to enter Power Deal information as shown in FIG. 34. The seller enters Power Deal Quantity 1018 (FIG. 32B). The process determines if seller is the first seller of the Power Deal 1020 (FIG. 32B). If no, seller enters new Power Price 1030 (FIG. 32C). The seller agrees with the terms and conditions of the Power Deal and saves new Power Price 1032 (FIG. 32C). The process then determines if the new Power Price is greater than or equal to System's Current Power Price (SCPP) 1034 (FIG. 32C). If yes, the process shows an error message, requests the seller to re-enter new Power Price 1036 (FIG. 32C) and loops back to step 1030 (FIG. 32C). At decision 1034 (FIG. 32C), if new Power Price is not greater than or equal to SCPP, then the process marks the seller joined the Power Deal of this item 1038 (FIG. 32C). The process updates Seller's Current Power Price (MCPP) and System's Current Power Price (SCPP) to be new Power Price and updates Seller's Power Unit Price to be new Power Price minus Standard Shipping minus Handling Fee 1040 (FIG. 32C). The process notifies sellers selling this item based on their notification settings 1042 (FIG. 32C), notifies buyers joining this Power Deal based on their notification settings 1044 (FIG. 32C) and notifies followers based on their notification settings 1046 (FIG. 32C). The process requests to run Automated Price Reduction by Reduction Rate job 1048 (FIG. 32C). The process terminates 1050 (FIG. 32C).

Back at decision 1010 (FIG. 32B), if the seller has joined the Power Deal, then the process shows the Price Down button 1012 (FIG. 32B) and the process terminates 1050 (FIG. 32C). Back at decision 1018 (FIG. 32B), if the seller is the first seller of the Power Deal, new Power Price is set to System's Initial Power Price (SIPP) 1022 (FIG. 32B). Seller may edit new Power Price to a lower number than SIPP 1024 (FIG. 32C). Seller agrees with the terms and conditions of the Power Deal and saves new Power Price 1026 (FIG. 32C). The process determines if new Power Price is greater than or equal to SIPP 1028 (FIG. 32C). If no, the process continues to step 1036 (FIG. 32C) to mark seller joined Power Deal of this item (FIG. 32A). If yes, the process loops back to step 1024 (FIG. 32C) for the seller to re-enter new Power Price.

Glossary:

Item refers to and is not limited to a product, service, gift certificate, voucher, coupon, deal.

Power Deal is initiated by the first buyer who specifies its duration and commits to purchase the item offered by zero ore more sellers at the System's Initial Power Price or lower. Once a Power Deal is created, more buyers and sellers will join the deal. If no seller has joined Power Deal when the Power Deal ends, there will be no winner. Otherwise, the Power Buy System will determine winning Buyers and winning Sellers.

Power Buyer is a user of the Power Buy Systems that joins a Power Deal.

Power Buyer Lead is a group of Power Buyers with the most successful rate of winning Power Deal at the lowest winning price and the most volume.

Quantity Demanded is the aggregate quantity committed of Power Buyers in a Power Deal.

Crowd Source describes user's actions of Power Buy Systems to invite and aggregate other interested buyers to join a Power Deal to increase Quantity Demanded through their network of contacts via but not limited to Social Media, email, SMS/MMS to attract the sellers to further lower their Power Price.

Power Buy describes an action of one or more buyers joining a Power Deal to purchase the item at the System's Initial Power Price or lower.

Join Power Deal describes the action of sellers joining a Power Deal to commit to sell the item to the committed buyers at a Power Price lower than the System's Current Power Price.

Price Down describes the action of sellers to set their Seller's Current Power Price (MCPP) to be lower than a System's Current Power Price (SCPP) in an attempt to win the Power Deal.

Auto Price Down describes the action of Power Buy System's automation job to Price Down Power Price based on seller's setting for Power Deal. This feature is exclusive for a paid subscription by a seller. Options to Auto Price Down include and is not limited to Auto Price Down by Quantity Tier, Auto Price Down by Reduction Rate.

Reduction Rate is an incremental amount the Power Price will be lowered each time via an Auto Price Down by Reduction Rate option.

Floor Price is the lowest possible Power Unit Price of a Power Deal via an Auto Price Down by Reduction Rate option.

Sell Unit Price is the item unit price offered with a Buy Now button.

Buy Now price or Sell Price is the lowest price, including a Sell Unit Price, Standard Shipping and Handling Fee, offered among sellers outside of a Power Deal.

Power Unit Price is the item unit price offered by some specific seller for a Power Deal with a Power Buy button.

Power Price or Seller/Merchant's Current Power Price (MCPP) is the current lowest Power Price of the seller/merchant including a Power Unit Price, Standard Shipping and Handling Fee.

System's Current Power Price (SCPP) is the current lowest Power Price among sellers joining the Power Deal.

System's Initial Power Price (SIPP) is the starting Power Price of a Power Deal which may be at least a threshold percentage (which is pre-defined based on but not limited to category, brand or any combination thereof) below the Buy Now price. By way of example and not limitation, the threshold percentage may be 10%, 15%, 20%, 30%, 40%, 50% or any percentage below the Buy Now price.

The Address Verification System (AVS) is a system used to verify the address of a person claiming to own a credit card by verifying the billing address of the credit card provided by the user with the address on file at the credit card company.

Short Message Service (SMS) is a text messaging service component of phone, Web, or mobile communication systems.

MMS extends text messaging to include longer text, graphics, photos, audio clips, video clips, or any combination of the above, within certain size limits.

mgSKU is Power Buy System SKU

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A computer implemented method for facilitating aggregation of demand for an item from internet users to attract additional suppliers to lower a price of the item and to attract additional buyers from a lowered power price, the method comprising:

storing, in a memory device, a system execution program including computer instructions;

storing, in a database, data records related to a plurality of suppliers, data records related a plurality of internet users, and data records related to configured deals;

establishing, in a server system coupled to the memory device and the database, a seller portal domain, a buyer domain, and an admin domain;

receiving, by the seller domain, a first configured deal from a first supplier, the first configured deal being offered, by the buyer domain, to the internet users for the item wherein the first configured deal indicates that a first power price for the item is less than a buy now price if a sufficient number of the internet users commits to purchasing a threshold number of units of the item, the first configured deal having a two tier pricing structure based on quantity;

receiving, by the buyer domain, a commitment from a first internet user to purchase the item at the first power price of the first configured deal which is less than the buy now price;

inviting, by the buyer domain, one or more internet users through social media accounts of the first internet user, email, text message or combinations thereof to the contacts of the first internet user to view the active first configured deal wherein the first internet user is linked to the one or more internet users through at least one of a social media account, text and email;

receiving, by the buyer domain, commitments from the one or more internet users associated with the first internet user to purchase the item at the first power price which is less than the buy now price so as to aggregate demand for the item at or above the threshold number of units;

receiving, by the admin domain, a second configured deal from a second supplier having a second power price which is lower than the first power price, the second configured deal having a two tier pricing structure based on quantity which is different from the two tier pricing structure of the first configured deal based on quantity of the second configured deal;

displaying, by the buyer domain, the second configured deal to the internet users committed to purchasing the item; and, inviting, by the admin domain, one or more internet users through social media accounts of the internet users committed to purchasing the item, email, text message or combinations thereof to the contacts of the internet users committed to purchasing the item to view and purchase the item based on the second configured deal.

2. The method of claim 1 further comprising the step of receiving, by the admin domain, a first Price Down commitment from a third supplier to supply the item at a price lower than the power price of the second configured deal.

3. The computer implemented method of claim 1 further comprising the step of processing, by the admin domain, winning internet users and winning suppliers based on offered prices (lowest power price fulfilled first) and quantity so that the item is sold to the internet users up to a first quantity at the lowest power price then the item is sold, to additional internet users at the next lowest power price up to a second quantity from two different suppliers.

4. The computer implemented method of claim 1 wherein the first configured deal is set up by the first supplier or the internet user using the seller domain.

5. A system comprising:

a processor; and a memory device including instructions that, when executed by the processor, cause the system to establish a seller portal domain, a buyer domain, and an admin domain, wherein:

the admin domain is programmed to receive a first configured deal from a first supplier, the buyer domain is programmed to offer the first configured deal to the internet users for an item, wherein the first configured deal indicates that a first power price for the item is less than a buy now price if a sufficient number of the internet users commits to purchasing a threshold number of units of the item, the first configured deal having a two tier pricing structure based on quantity, the buyer domain is programmed to receive a commitment from a first internet user to purchase the item at the first power price of the first configured deal which is less than the buy now price;
- the admin domain is programmed to invite one or more internet users through social media accounts of the first internet user, email, text message or combinations thereof to the contacts of the first internet user to view the active first configured deal wherein the first internet user is linked to the one or more internet users through at least one of a social media account, text and email; receive commitments from the one or more internet users associated with the first internet user to purchase the item at the first power price which is less than the buy now price so as to aggregate demand for the item at or above the threshold number of units; receive a second configured deal from a second supplier having a second power price which is lower than the first power price, the second configured deal having a two tier pricing structure based on quantity which is different from the two tier pricing structure of the first configured deal based on quantity of the second configured deal,
- the buyer domain is programmed to display the second configured deal to the internet users committed to purchasing the item, and
- the admin domain is programmed to invite one or more internet users through social media accounts of the internet users committed to purchasing the item, email, text message or combinations thereof to the contacts of the internet users committed to purchasing the item to view and purchase the item based on the second configured deal.

6. The system of claim 5 wherein the seller domain is further programmed to receive a first Price Down commitment from a third supplier to supply the item at a price lower than the power price of the second configured deal.

7. The system of claim 5 wherein the admin domain is further programmed to process winning internet users and winning suppliers based on offered prices (lowest power price fulfilled first) and quantity so that the item is sold to the internet users up to a first quantity at the lowest power price then the item is sold to additional internet users at the next lowest power price up to a second quantity from two different suppliers.

8. The system of claim 5 wherein the first configured deal is set up by the first supplier or the internet user using the seller domain.

9. A non-transitory computer-readable storage medium including instructions, the instructions when executed by a processor of a computing system causing the computing system to establish a seller portal domain, a buyer domain, and an admin domain, wherein:
- the admin domain is programmed to receive a first configured deal from a first supplier, the first configured deal being offered to the internet users for an item wherein the first configured deal indicates that a first power price for the item is less than a buy now price if a sufficient number of the internet users commits to purchasing a threshold number of units of the item, the first configured deal having a two tier pricing structure based on quantity;
- the buyer domain is programmed to receive a commitment from a first internet user to purchase the item at the first power price of the first configured deal which is less than the buy now price;
- the admin domain is programmed to invite one or more internet users through social media accounts of the first internet user, email, text message or combinations thereof to the contacts of the first internet user to view the active first configured deal wherein the first internet user is linked to the one or more internet users through at least one of a social media account, text and email;
- the buyer domain is programmed to receive commitments from the one or more internet users associated with the first internet user to purchase the item at the first power price which is less than the buy now price so as to aggregate demand for the item at or above the threshold number of units;
- the admin domain is programmed to receive a second configured deal from a second supplier having a second power price which is lower than the first power price, the second configured deal having a two tier pricing structure based on quantity which is different from the two tier pricing structure of the first configured deal based on quantity of the second configured deal;
- the buyer domain is programmed to display the second configured deal to the internet users committed to purchasing the item;
- the admin domain is programmed to invite one or more internet users through social media accounts of the internet users committed to purchasing the item, email, text message or combinations thereof to the contacts of the internet users committed to purchasing the item to view and purchase the item based on the second configured deal.

10. The non-transitory computer-readable storage medium of claim 9 wherein the admin domain is further programmed to receive a first Price Down commitment from a third supplier to supply the item at a price lower than the power price of the second configured deal.

11. The non-transitory computer-readable storage medium of claim 9 wherein the admin domain is further programmed to process winning internet users and winning suppliers based on offered prices (lowest power price fulfilled first) and quantity so that the items is sold to the internet users up to a first quantity at the lowest power price then the item is sold to additional internet users at the next lowest power price up to a second quantity from two different suppliers.

12. The non-transitory computer-readable storage medium of claim 9 wherein the first configured deal is set up by the first supplier or the internet user using the seller domain.

\* \* \* \* \*